United States Patent
Oike et al.

(10) Patent No.: US 7,812,301 B2
(45) Date of Patent: Oct. 12, 2010

(54) SOLID-STATE IMAGING DEVICE, METHOD OF DRIVING SOLID-STATE IMAGING DEVICE AND IMAGING APPARATUS

(75) Inventors: Yusuke Oike, Kanagawa (JP); Atsushi Toda, Kanagawa (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 12/103,378

(22) Filed: Apr. 15, 2008

(65) Prior Publication Data

US 2008/0258045 A1   Oct. 23, 2008

Related U.S. Application Data

(63) Continuation-in-part of application No. 11/551,776, filed on Oct. 23, 2006.

(30) Foreign Application Priority Data

Oct. 28, 2005  (JP) ............................. 2005-313755
Apr. 28, 2006  (JP) ............................. 2006-124699

(51) Int. Cl.
*H01L 27/00* (2006.01)
*H01J 40/14* (2006.01)
(52) U.S. Cl. ................................ 250/208.1; 250/214 R
(58) Field of Classification Search ............. 250/208.1, 250/214 R; 257/414, 431, 443, 290–293; 348/272, 281, 282, 294, 302–304
See application file for complete search history.

(56) References Cited

U.S. PATENT DOCUMENTS

| 7,414,233 B2* | 8/2008 | Asaba ..................... 250/208.1 |
| 7,456,882 B1* | 11/2008 | Hiyama et al. ............. 348/294 |
| 7,663,167 B2* | 2/2010 | Ladd .......................... 257/291 |
| 2008/0099807 A1* | 5/2008 | Kim et al. .................. 257/292 |

* cited by examiner

*Primary Examiner*—Que T Le
*Assistant Examiner*—Pascal M Bui-Pho
(74) *Attorney, Agent, or Firm*—Sonnenschein Nath & Rosenthal LLP

(57) ABSTRACT

A solid-state imaging device, includes: a pixel array area including an unit pixel having a photoelectric conversion element and a transfer gate; a first supply voltage control means for supplying a first control voltage to a control electrode of the transfer gate; a second supply voltage control means for sequentially supplying one or plural second control voltages having a voltage value different from the first control voltage to the control electrode; a third supply voltage control means for supplying a third control voltage having the same voltage value as the second control voltages once or plural times prior to one or plural supplies of the second control voltages; a first driving means for reading signal charges from the transfer gate when the first control voltage is supplied; and a second driving means for reading signal charges from the transfer gate once and more when the second control voltage is sequentially applied.

4 Claims, 65 Drawing Sheets

NORMAL READOUT

ALLOWING S/N TO BE HIGH AND
ALLOWING DYNAMIC RANGE TO BE WIDE

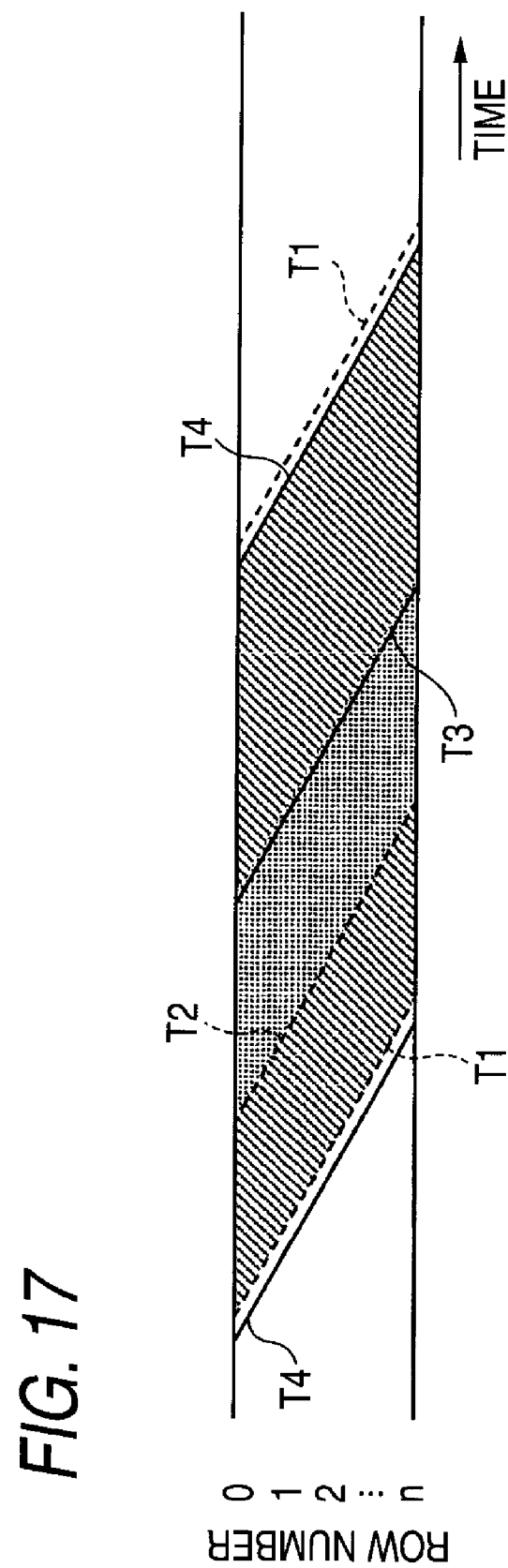

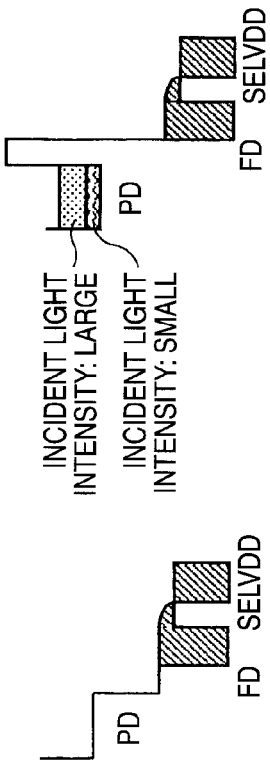
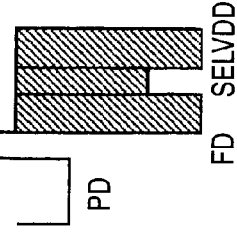
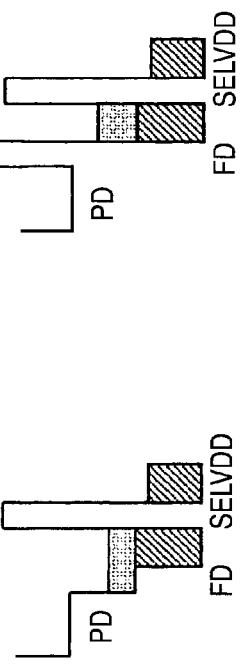

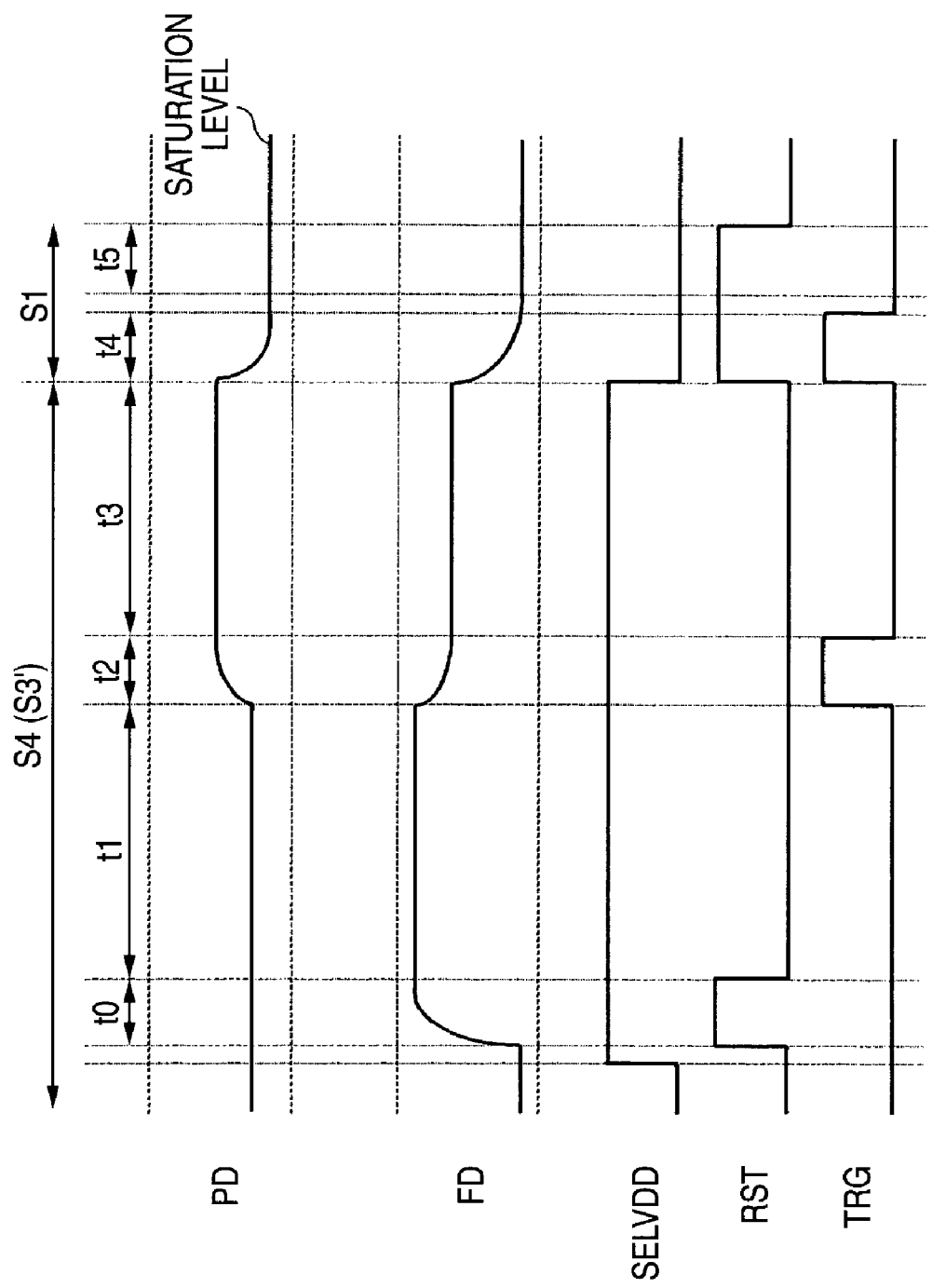

S2-t1

S2-t2

S3-t1

S3-t2

S1-t4

S1-t5

S2-t2

S3-t2

S4-t2

WHEN INCIDENT LIGHT IS WEAK

WHEN INCIDENT LIGHT IS STRONG

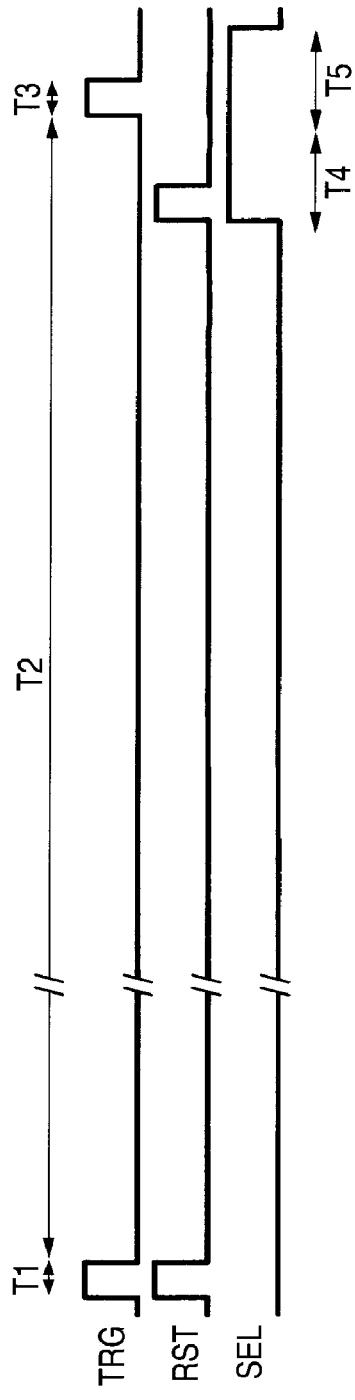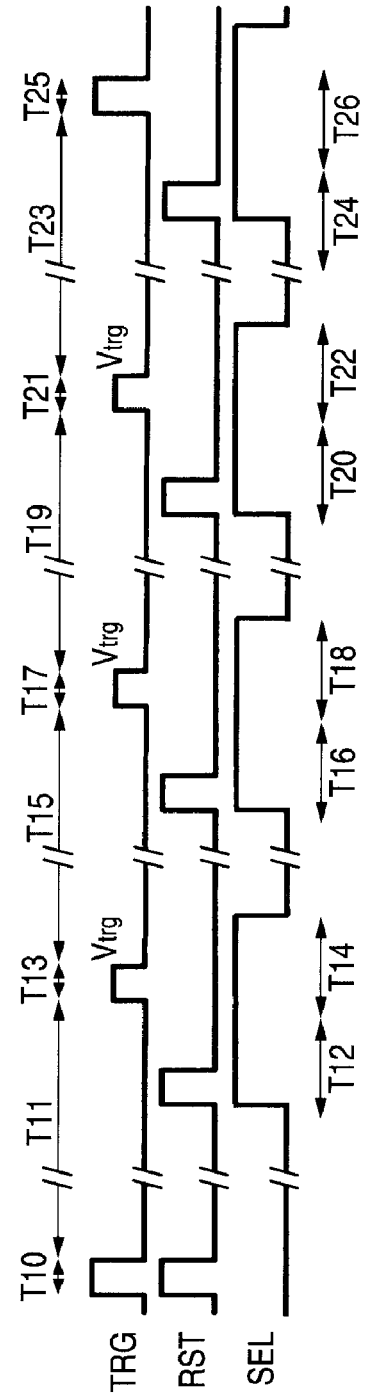

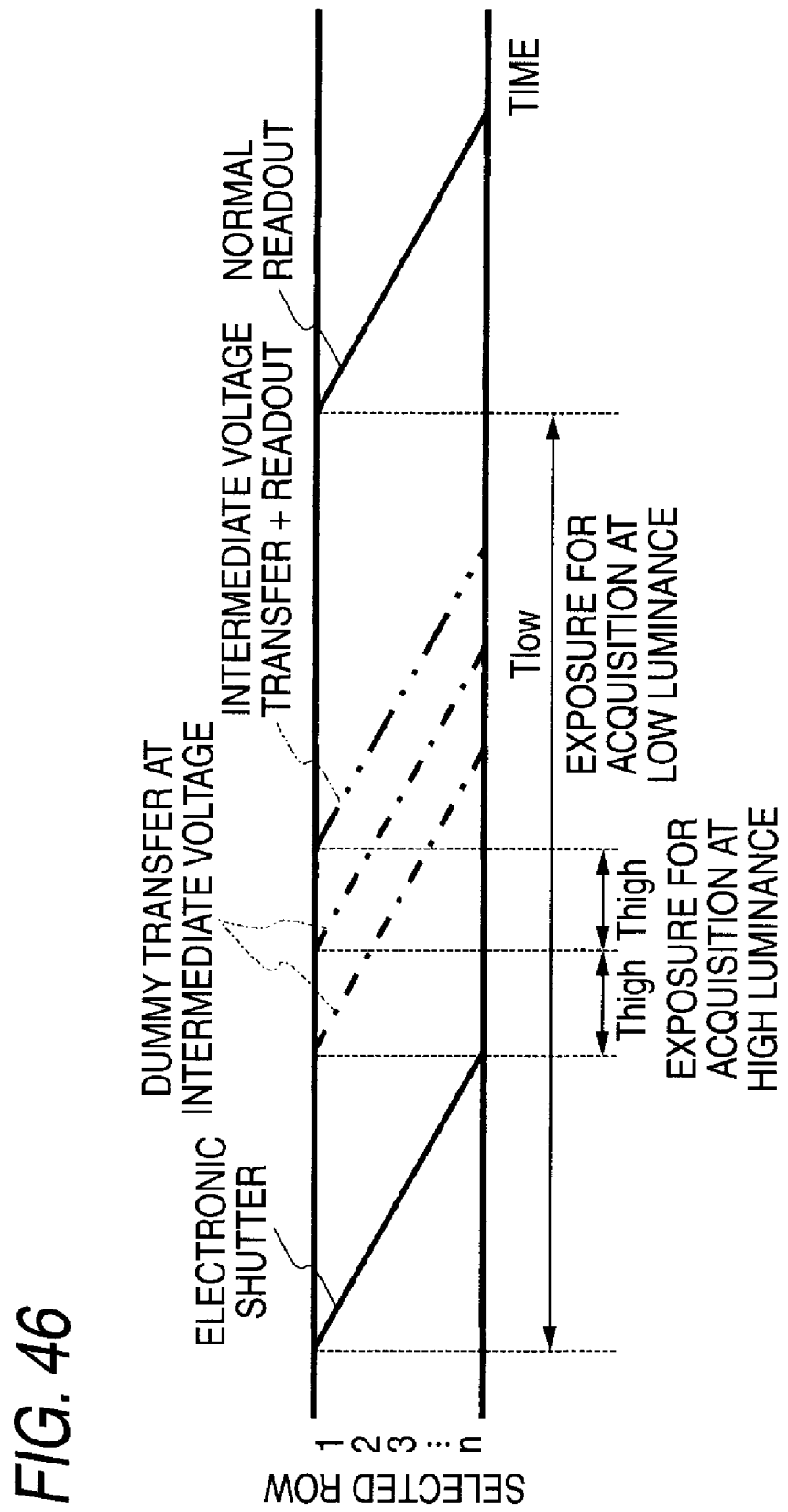

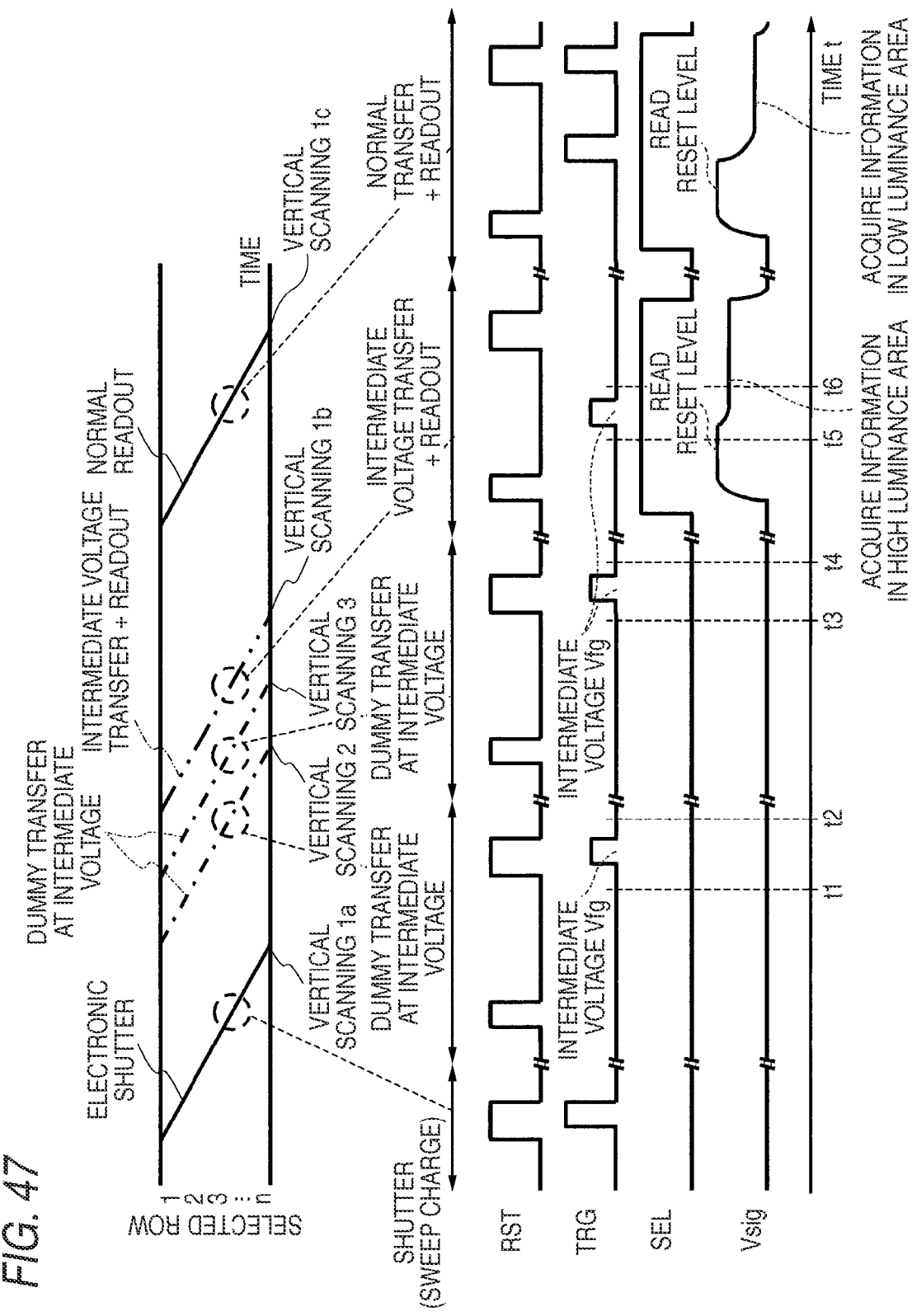

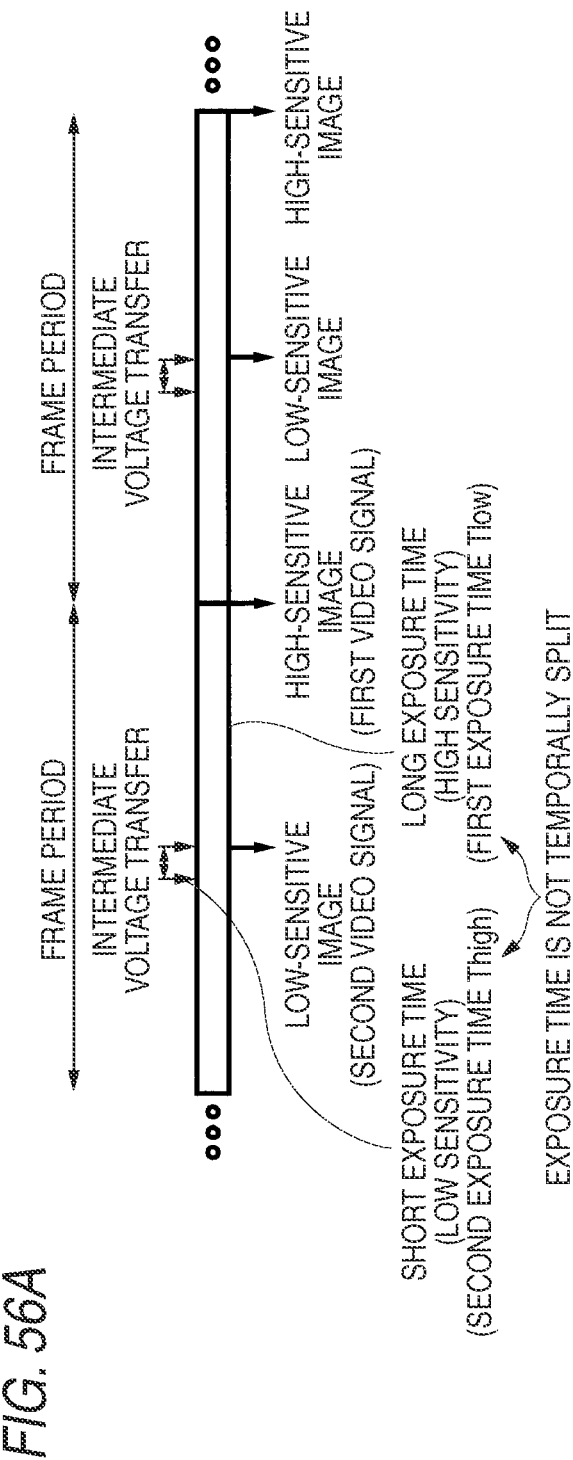
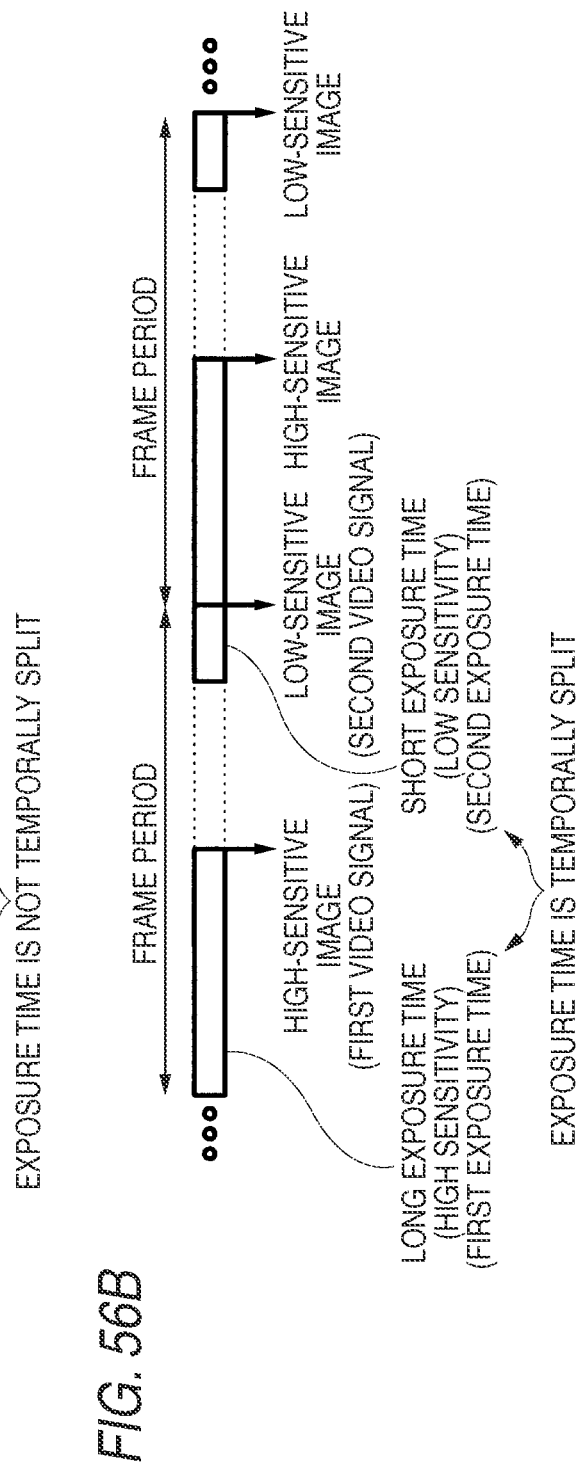
FIG. 56A
FIG. 56B

WHEN INCIDENT LIGHT IS WEAK

WHEN INCIDENT LIGHT IS STRONG

SOLID-STATE IMAGING DEVICE, METHOD OF DRIVING SOLID-STATE IMAGING DEVICE AND IMAGING APPARATUS

RELATED APPLICATION DATA

This application is a continuation-in-part of U.S. patent application Ser. No. 11/551,776, filed Oct. 23, 2006, the entirety of which is incorporated herein by reference to the extent permitted by law. The present application claims priority to Japanese Patent Application Nos. 2005-313755 filed in the Japanese Patent Office on Oct. 28, 2005 and 2006-124699 filed in the Japanese Patent Office on Apr. 28, 2006 the entirety both of which also are incorporated by reference herein to the extent permitted by law.

BACKGROUND OF THE INVENTION

1. Field of the Invention

The invention relates to a solid-state imaging device, a method of driving the solid-state imaging device and an imaging apparatus.

2. Description of the Related Art

In recent years, in a CCD (Charge Coupled Device) image sensor and an amplification-type image sensor which are known as solid-state imaging devices suitable for applying to video cameras, digital still cameras and the like, miniaturization in pixel size is proceeding by increase in number of pixels at high sensibility or reduction in image size. On the other hand, generally, the solid-state imaging devices such as the CCD image sensor or a CMOS (Complementary Metal Oxide Semiconductor) image sensor tend to be used in various environments such as indoor and outdoor, daytime and nighttime, therefore, an electronic shutter operation or the like is often necessary, in which exposure time is adjusted by controlling a charge storage period in a photoelectric conversion element according to variation of outside light and the like to make the sensibility be the optimal value.

As a method of expanding the dynamic range of the CMOS image sensor, a method of adjusting exposure time by releasing the electronic shutter at high speed, a method of taking plural frames at high speed and superimposing them, a method of allowing a photoelectric conversion characteristic at a light-receiving region to be logarithmic response and the like are known.

However, when using the method of releasing the electronic shutter at high speed in a picture-taking scene with high-contrast where bright areas and dark areas are mixed, it is difficult to secure sufficient exposure time especially in the dark area, namely, in a low luminance scene, therefore, S/N deteriorates and image quality is lowered. In the method of taking plural frames at high speed and superimposing them, S/N can be improved by superimposing images as compared to the method of simply releasing the electronic shutter, however, noise by readout is accumulated by the number of times of readouts corresponding to plural frames, therefore, S/N also deteriorates at the low luminance scene.

It is efficient that the dynamic range is expanded by the logarithmic response characteristic, however, fixed pattern noise caused by threshold variations of transistors operating in a subthreshold region becomes prominent especially at the low luminance area. For example, when photographing a person by the window from the room, if the sensibility is adjusted to the person, a scene of the window is saturated white and difficult to be reproduced. If the sensibility is adjusted to the scene of the window, the person is taken to be dark, S/N lowers because it is difficult to sufficiently secure a signal level and to obtain high-quality images even by the amplification after photographing.

In a photographing scene, it is necessary to realize high S/N by long exposure time in pixels with a small amount of incident light on the image sensor, and to expand the dynamic range by avoiding saturation in pixels with a large amount of incident light.

In related arts, as a method of realizing high S/N which is almost equivalent to the normal operation in pixels with low luminance, and expanding the dynamic range in pixels with high luminance, a technique written in IEEE International Solid-State Circuits Conference (ISSCC) 2005, pp. 354, February 2005 (non-patent document 1) is known. Specifically, as shown in FIG. 40, in an amplification-type image sensor in which a pixel 100 is arranged in a matrix form, which includes a photodiode 101, a transfer transistor 102, a reset transistor 103, an amplification transistor 104, and a selection transistor 105, when the transfer transistor 102 is turned off, if electrons are stored exceeding a certain level, a voltage to be applied to a control electrode is set to a level Vtrg, not a level making the transistor completely off as usual, in which the excess is allowed to be overflowed into a FD region 106.

When electrons are stored in the photodiode 101 and exceed the level Vtrg, leak to the FD region 106 is started in the subthreshold region. Since the leak is operated in the subthreshold region, the number of electrons remained in the photodiode 101 is a logarithmic response.

As shown in FIG. 41, after a reset operation at a period t0, storing is executed while the voltage Vtrg is applied to the control electrode of the transfer transistor 102. In a state of a period t1 in which the number of stored electrons is small, all electrons are stored in the photodiode 101, however, when the number of stored electrons exceeds the level of Vtrg, electrons starts leaking to the FD region 106 as shown at a period t2.

Since electrons leak in the subthreshold region, electrons are stored with the logarithmic characteristic with respect to the incident light intensity even when the storing is continued (t3). At a period t4, electrons overflowed in the FD region 106 are reset, and all electrons stored in the photodiode 101 are read out by a complete transfer. Relation between the incident light intensity and the number of output electrons is shown in FIG. 42. In the case of incident light having intensity exceeding the upper limit Qlinear of a linear region set by the voltage Vtrg, the number of output electrons is determined with the logarithmic response.

However, though it is reported that a dynamic range of 124 dB has been realized in the related art written in the non-patent document 1, the saturation level of the linear region in which high S/N is realized is less than half of a normal saturation level Qs. In addition, though the extremely wide dynamic range is realized with the logarithmic response, a logarithmic response circuit tends to be affected by threshold variations and the like, therefore, large fixed pattern noise remains in the wide dynamic range region, which is 5 mV in the logarithmic region when the fixed pattern noise in the linear region is 0.8 mV, even after a cancel operation for threshold variations is performed.

Accordingly, it is desirable to provide a solid-state imaging device, a method of driving the solid-state imaging device and an imaging apparatus, in which signal acquisition with linear and high S/N is possible without narrowing the normal saturation level at low luminance, at the same time, the dynamic range can be expanded while realizing good S/N in a linear region also with respect to incident light larger than the normal saturation level.

SUMMARY OF THE INVENTION

According to an embodiment of the invention, there is provided a solid-state imaging device including: an imaging area in which plural pixels each including a photoelectric conversion part configured to receive incident light and generate signal charges, a transfer gate configured to read out signal charges from the photoelectric conversion part, and a storage part storing signals read out from the transfer gate are arranged, wherein the transfer gate reads out a first signal charge to the storage part by an incomplete transfer, wherein the first signal charge is thrown out from the storage part, wherein a second charge remained at the photoelectric conversion part at the time of the incomplete transfer is added to a third charge generated by light entered after the incomplete transfer in the photoelectric conversion part, and wherein a charge obtained by adding the second charge and third charge is read out by the transfer gate to the storage part.

According to another embodiment of the invention, there is provided an imaging apparatus, including: a solid-state imaging device having an imaging area in which plural pixels each including a photoelectric conversion part configured to receive incident light and generate signal charges, a transfer gate configured to read out signal charges from the photoelectric conversion part, and a storage part configured to store signals read out from the transfer gate; and a control element controlling the solid-state imaging device, wherein the control element supplies control signals to the solid-state imaging device, wherein the transfer gate is driven by pulses generated based on the control signals, wherein the transfer gate reads out a first signal charge to the storage part by an incomplete transfer, wherein the first signal charge is thrown out from the storage part, wherein a second charge remained at the photoelectric conversion part at the time of the incomplete transfer is added to a third charge generated by light entered after the incomplete transfer in the photoelectric conversion part, and wherein a charge obtained by adding the second charge and third charge is read out by the transfer gate to the storage part.

According to the embodiment of the invention, in a solid-state imaging device including: a pixel array area in which an unit pixel including a photoelectric conversion element converting optical signals to signal charges and a transfer gate transferring the signal charges which have been photoelectrically converted in the photoelectric conversion element is two-dimensionally arranged in a matrix form, such a configuration is adapted in which signal charges stored in the unit pixel in a first exposure time are read out and outputted as a first video signal from the pixel array area, during the period of the first exposure time, signal charges are stored in the unit pixel that outputs the first video signal proportional to a second exposure time determined depending on a time interval in which the transfer gate is driven, and the stored signal charges are read out and outputted as a second video signal having a sensitivity different from that of the first video signal from the pixel array area.

In the solid-state imaging device of the above configuration, the unit pixel is a destructive readout pixel having a transfer gate. In addition, the first video signal is a high-sensitive video signal in the first exposure time, and the second video signal is a low sensitive video signal in the second exposure time set within the first exposure time. For these first and second video signals, the video signals are read out of the same unit pixel without spatially splitting the pixel array area (pixel arrangement). Then, since the storing operation in the second exposure time can be set at a given timing within the first exposure time, the timing of reading out the second video signal can be set freely.

Accordingly, a high frame rate depending on the shortest exposure time interval is unnecessary, and a video signal in a shorter exposure time can be acquired at a frame rate determined by the number of times of reading out video signals. In addition, the second exposure time is set within the first exposure time, which provides no frame periods temporally split. Therefore, since the same time as the frame period can be secured at the maximum as the first exposure time, the video signals of a high S/N (high image quality) can be acquired without deteriorating the sensitivity of the first video signal while the dynamic range is widened by the second exposure time.

BRIEF DESCRIPTION OF THE DRAWINGS

FIGS. 4A and 4B are timing charts for explaining respective operations, wherein FIG. 4A is a case of a normal readout and FIG. 4B is a case of aiming at high S/N and wide dynamic range;

FIG. 17 is a timing chart showing an operation example when using a pixel circuit including three transistors;

FIGS. 20A to 20F are potential diagrams showing potential relation at respective timings;

FIG. 30 is a timing chart of a forced saturation operation;

FIGS. 45A and 45B are timing charts for explaining respective operations, wherein FIG. 45A is a case of a normal readout and FIG. 45B is a case of aiming at high S/N and wide dynamic range;

FIG. 46 is a timing chart showing the concept of driving according to the first embodiment;

FIG. 47 is a timing chart showing driving of pixels by applying an intermediate voltage;

FIGS. 56A and 56B are diagrams for explaining respective operations, FIG. 56A is the case in which exposure time is not temporally split, and FIG. 56B is the case in which exposure time is temporally split;

DESCRIPTION OF THE PREFERRED EMBODIMENTS

Hereinafter, an embodiment of the present invention will be explained in detail with reference to the drawings.

Figure 1:
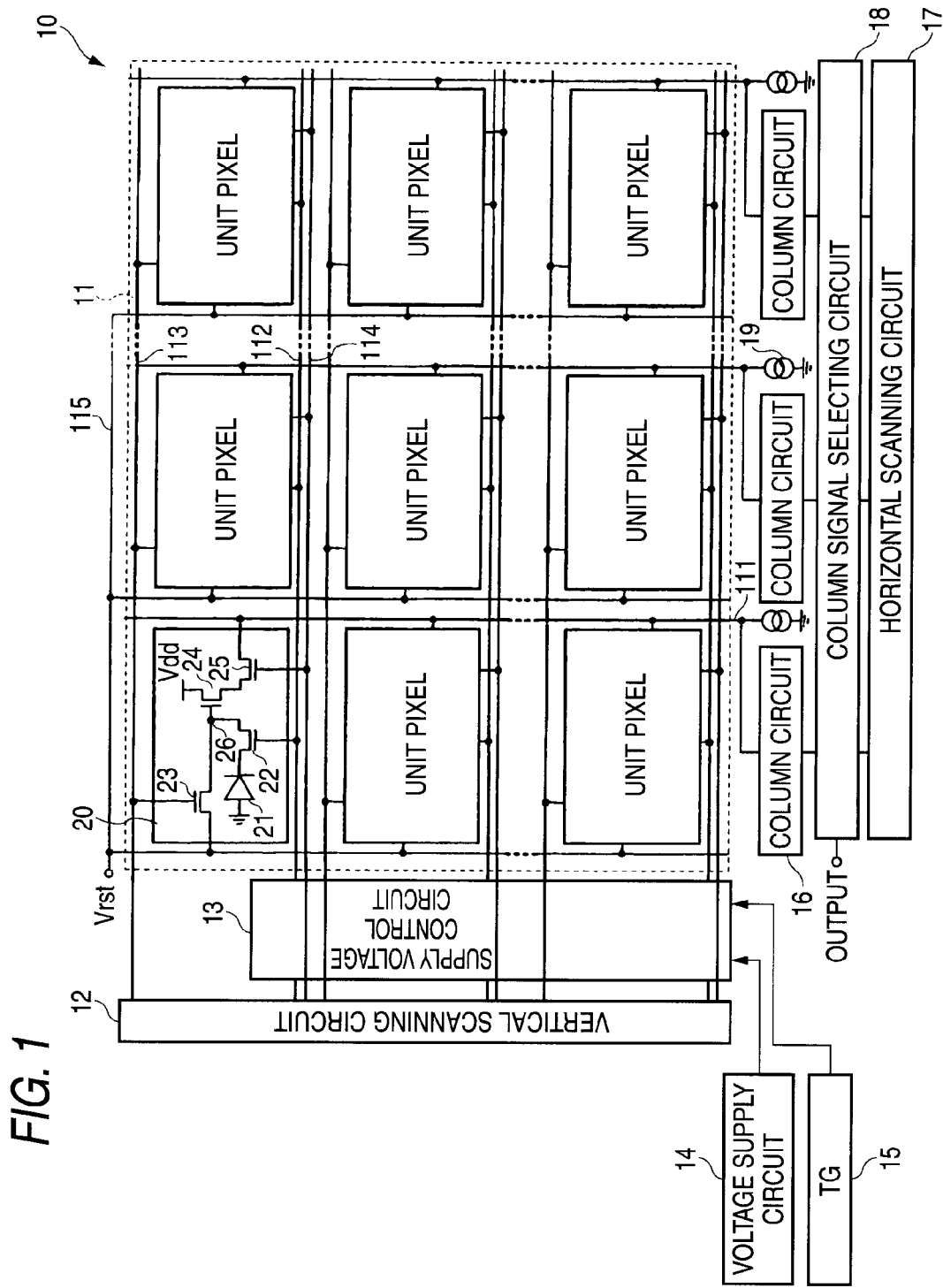
FIG. 1 is a system configuration diagram showing a configuration of a CMOS image sensor according to an embodiment of the invention.

FIG. 1 is a system configuration diagram showing a configuration of a solid-state imaging device, for example, a CMOS image sensor according to an embodiment of the invention.

As shown in FIG. 1, the CMOS image sensor according to the embodiment includes a pixel array area 11 in which an unit pixel (hereinafter, sometimes referred to as merely a "pixel") 20 including a photoelectric conversion element is arranged two-dimensionally in a matrix form, and as peripheral circuits thereof, a vertical scanning circuit 12, a supply voltage control circuit 13, a voltage supply circuit 14, a timing generator circuit (TG) 15, a plurality of column circuits 16, a horizontal scanning circuit 17 and a column signal selection circuit 18.

In the matrix arrangement of pixels 20 in the pixel array area 11, a vertical signal line 111 is arranged at each column, and a drive control line, for example, a transfer control line 112, a reset control line 113, a selection control line 114 are arranged at each row. Further, a reset line 115 supplying reset voltage Vrst is arranged at each unit pixel 20.

First Embodiment

Figure 43:
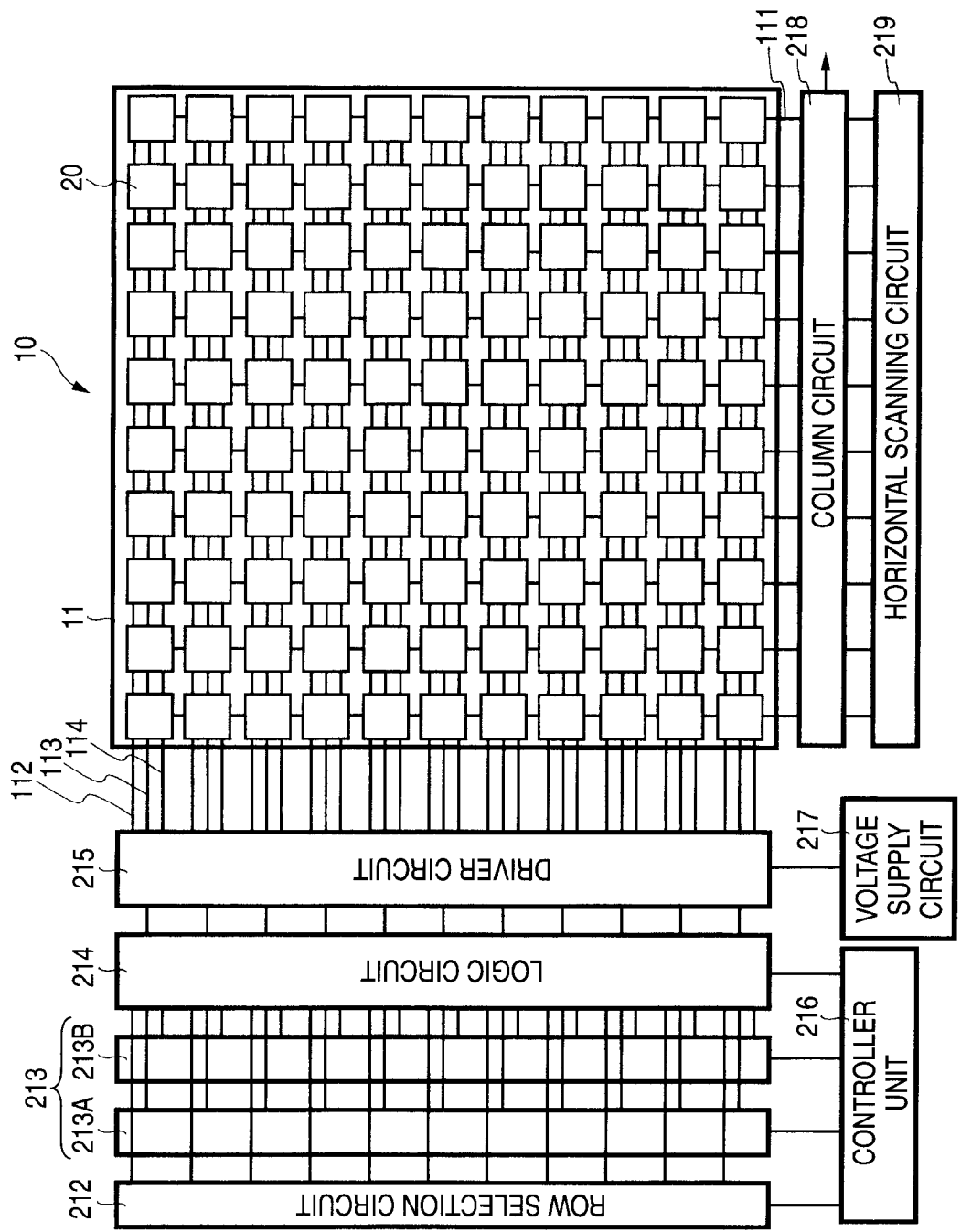
FIG. 43 is a system configuration diagram showing a configuration example of a CMOS image sensor according to a first embodiment of the invention.

FIG. 43 is a system configuration diagram showing a configuration example of a solid-state imaging device, for example, a CMOS image sensor according to a first embodiment of the invention.

As shown in FIG. 43, a CMOS image sensor 10 according to the embodiment includes a pixel array area 11 in which an unit pixel (hereinafter, sometimes referred to as merely a "pixel") 20 including a photoelectric conversion element is arranged two-dimensionally in a matrix form, and as peripheral circuits thereof, as well as includes a row selection circuit 212, a pre-selection circuit 213, a logic circuit 214, a driver circuit 215, a controller unit 216, a voltage supply circuit 217, a column circuit 218 and a horizontal scanning circuit 219.

(Unit Pixel)

In FIG. 1, an example of a circuit configuration of the unit pixel 20 is shown. The unit pixel 20 according to the circuit example has a pixel circuit which includes four transistors of a transfer transistor 22, a reset transistor 23, an amplification transistor 24 and a selection transistor 25, in addition to a photoelectric conversion element, for example, a photodiode 21. In this case, as these transistors 22 to 25, for example, an N-channel MOS transistor is used.

The transfer transistor 22 is equivalent to a transfer gate in claims, connected between a cathode electrode of the photodiode 21 and a FD region (floating diffusion region) 26 which is a charge/voltage converter. Signal charges (electrons, in this case) converted photoelectrically by the photodiode 21 and stored at the transfer transistor 22 are transferred to the FD region 26 by a transfer pulse TRG given to a gate electrode (control electrode).

The reset transistor 23, in which a drain electrode is connected to the reset line 115 and a source electrode is connected to the FD region 26 respectively, resets a potential of the FD region 26 to a reset voltage Vrest by a reset pulse RST given to a gate electrode before the transfer of signal charges from the photodiode 21 to the FD region 26.

The amplification transistor 24, in which a gate electrode is connected to the FD region 26 and a drain electrode is connected to a pixel power source Vdd respectively, outputs a potential of the FD region 26 after the reset by the reset transistor 23 as a reset level, and further outputs a potential of the FD region 26 after signal charges are transferred by the transfer transistor 22 as a signal level.

The selection transistor 25, in which, for example, a drain electrode is connected to a source electrode of the amplification transistor 24 and a source electrode is connected to the vertical signal line 111 respectively, becomes on-state by a selection pulse SEL being given to a gate electrode, and outputs a signal outputted from the amplification transistor 24, taking the pixel 20 as the selected state, to the vertical signal line 111.

It is also preferable that the selection transistor 25 applies a configuration in which the transistor is connected between the pixel power source Vdd and the drain electrode of the amplification transistor 24.

In addition, the pixel circuit is not limited to the configuration of four transistors described above, which may be the configuration of three transistors in which the selection transistor 25 is omitted and the amplification transistor 24 also serves as the selection transistor 25, or such a configuration may be possible in which the amplification transistor 24 is shared among plural unit pixels.

The vertical scanning circuit 12 includes a shift register, an address decoder and the like, scanning respective pixels 20 in the pixel array area 11 with respect to respective electronic shutter rows and readout rows by every row in a vertical direction (up-and-down direction) by generating the reset pulse RST, the transfer pulse TRG, and the selection pulse SEL and the like appropriately. For the electronic shutter row, an electronic shutter operation for sweeping away signals in pixels 20 of that row is performed, and for the readout row, a readout operation for reading out signals in pixels 20 of that row is performed.

Though not shown here, the vertical scanning circuit 12, while sequentially selecting the pixels 20 in units of rows, has a readout scanning system for performing the readout operation of reading out signals in respective pixels 20 of the readout row, and an electronic shutter scanning system for performing the electronic shutter operation for the same row (electronic shutter row) earlier than the readout scanning by the readout scanning system by time corresponding to shutter speed.

Then, a period from the timing when unnecessary charges at the photodiode 21 are reset by the shutter scanning by the electronic shutter scanning system until the timing when signals in the pixels 20 are read out by the readout scanning by the readout scanning system becomes a storing period (exposure period) of signal charges in the pixel 20. That is, the electronic shutter operation means the operation which resets (sweeps) signal charges stored at the photodiode 21 and starts accumulating signal charges anew after the reset.

The supply voltage control circuit 13 controls control voltage supplied (applied) to a gate electrode (control electrode) of the transfer transistor 22 in the unit pixel 20. The detailed configuration of the supply voltage control circuit 13 will be described later.

The voltage supply circuit 14 supplies a voltage in the middle position (hereinafter, sometimes referred to as an "intermediate voltage") between plural voltages (control voltages) having different voltage values, specifically, a voltage at a high level (hereinafter, referred to as a "H" level) which is a voltage level of the pixel power source Vdd and a voltage of a low level (hereinafter, referred to as a "L" level) which is a ground level to the supply voltage control circuit 13. The voltage in the middle position (intermediate voltage) is a voltage in which a part of charges stored in the photodiode 21 is held as well as the rest of stored charges are transferred to the FD region 26 partially.

The timing generator circuit (TG) 15 generates timing signals PTRG1, PTRG2, PTRG3 (refer to FIG. 2) for determining the timing when the supply voltage control circuit 13 supplies the control voltage to the gate electrode of the transfer transistor 22.

The column circuits 16 are arranged, for example, at each pixel row in the pixel array area 11, namely, with one-to-one correspondence with respect to the pixel row, performing prescribed signal processing to signals outputted from respective pixels 20 in the readout row selected by the vertical scanning by the vertical scanning circuit 12 through the vertical signal line 111, and holding pixel signals temporarily after the signal processing.

As the column circuit 16, there are a circuit configuration including a sample-and-hold circuit which samples and holds signals outputted through the vertical signal line 111, and a circuit configuration including the sample-and-hold circuit and a noise elimination circuit which eliminates reset noise or fixed-pattern noise peculiar to the pixel such as threshold variations of the amplification transistors 24 by a Correlated Double Sampling (CDS) processing. Note that these are merely examples, and the circuit is not limited to them. For example, it is also preferable that the column circuit 16 has a A/D (analog-digital) conversion function to employ a configuration of outputting the signal level by digital signals.

The horizontal scanning circuit 17 includes a shift register, an address decoder and the like, horizontally scanning the column circuits 16 arranged at respective pixel columns in the pixel array area 11 in sequence. The column signal selection circuit 18 includes a horizontal selection switch, a horizontal signal line and the like, outputting pixel signals temporarily stored in the column circuits 16 sequentially, synchronizing them with the horizontal scanning by the horizontal scanning circuit 17.

A constant current source 19 is connected to each end of the vertical signal line 111. Instead of the constant current source 19, for example, a biased transistor can be used. Timing signals and control signals to be standards of operation for the vertical scanning circuit 12, the timing generator circuit 15, the column circuits 16, the horizontal scanning circuit 17 and so on are generated in a not-shown timing control circuit.

(Supply Voltage Control Circuit)

The supply voltage control circuit 13 takes an address signal ADR as input, which drives the row selected and scanned by the vertical scanning circuit 12, and supplies one of plural first control voltages supplied from the voltage supply circuit 14, for example, four voltages Vtrg1, Vtrg2, Vtrg3 and Vtrg4 (Vtrg1>Vtrg2>Vtrg3>Vtrg4) to the gate electrode of the transfer transistor 22 in the unit pixel 20, by selecting the voltage based on the timing signals PTRG1, PTRG2, PTRG3 supplied from the timing generator circuit 15.

Figure 2:
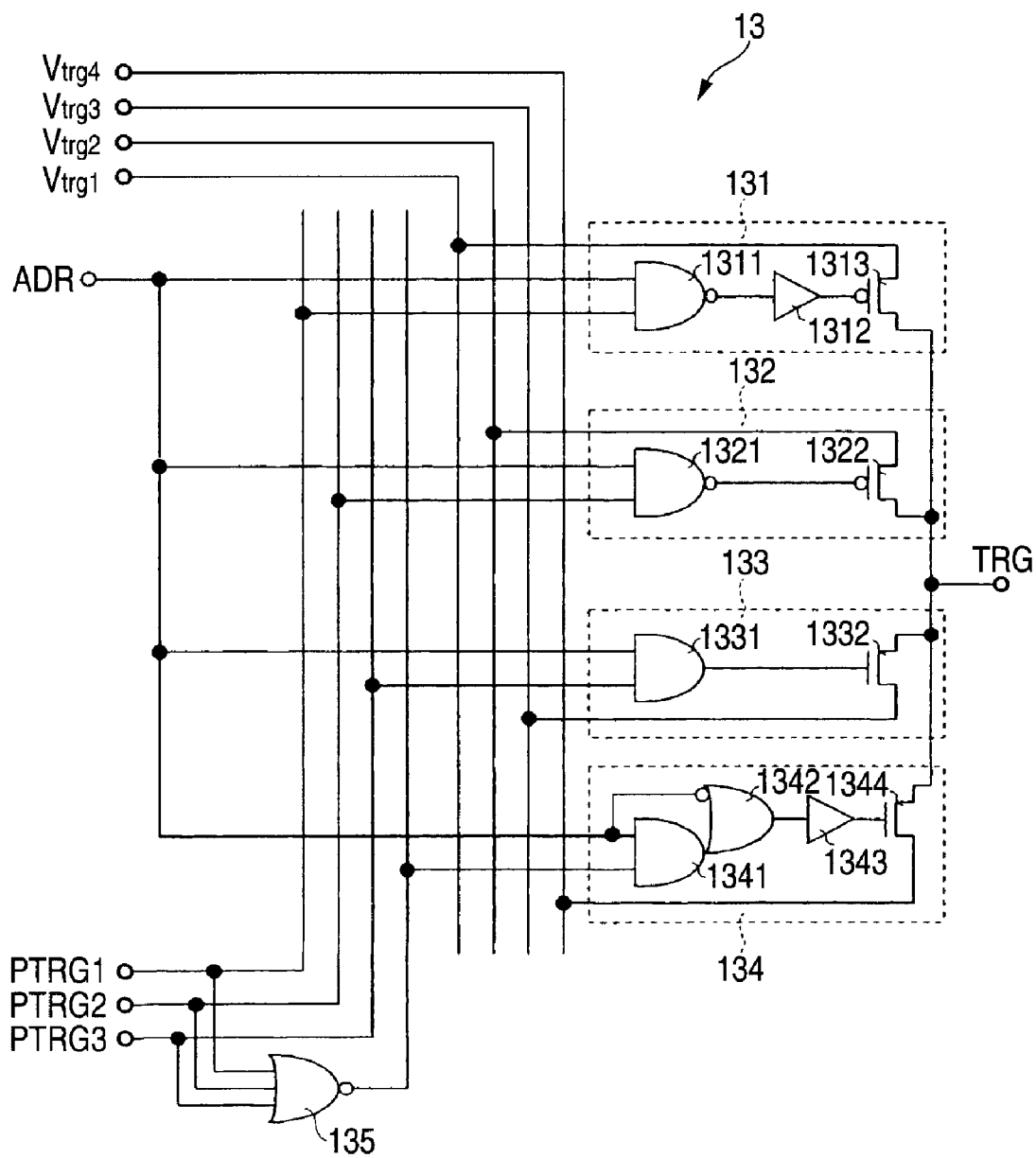
FIG. 2 is a circuit diagram showing an example of a circuit configuration of a supply voltage control circuit.

FIG. 2 is a circuit diagram showing a configuration example of the supply voltage control circuit 13. As shown in FIG. 2, the supply voltage control circuit 13 according to the embodiment includes four circuit blocks 131 to 134 which correspond to four voltages (intermediate voltages) Vtrg1, Vtrg2, Vtrg3 and Vtrg4, and a NOR circuit 135 having three inputs. The address signal ADR is given to the circuit blocks 131 to 134 in common from the vertical scanning circuit 12. The timing signals PTRG1, PTRG2, PTRG3 are given to the NOR circuit 135 as three inputs from the voltage supply circuit 14.

The circuit block 131 includes a NAND circuit 1311 taking the address signal ADR and the timing signal PTRG1 as two inputs, a level shifter 1312 and a P-channel drive transistor 1313, selecting the voltage Vtrg1 which is higher than a power source voltage of the logic circuit and supplying it to the gate electrode of the transfer transistor 22.

The circuit block 132 includes an AND circuit 1321 taking the address signal ADR and the timing signal PTRG2 as two inputs, and a P-channel drive transistor 1322, selecting the voltage Vtrg2 which is the same as, or lower than power source voltage of the logic circuit, and higher than the ground voltage by at least a threshold of the PMOS transistor, and supplying it to the gate electrode of the transfer transistor 22.

The circuit block 133 includes a NAND circuit 1331 taking the address signal ADR and the timing signal PTRG3 as two inputs, and an N-channel drive transistor 1332, selecting the voltage Vtrg4 which is the same as, or higher than the ground voltage of the logic circuit, and lower than the power source voltage by at least a threshold of the NMOS transistor, and supplying it to the gate electrode of the transfer transistor 22.

The circuit block 134 includes an AND circuit 1341 taking the address signal ADR and an output signal of the NOR circuit 135 as two inputs, an OR circuit 1342 taking the address signal ADR as one (negative) input, and taking an output signal of the AND circuit as the other input, a level shifter 1343 and an N-channel drive transistor 1344, selecting the voltage Vtrg4 which is lower than the ground voltage and supplying it to the gate electrode of the transfer transistor 22.

The circuit block 134 has a circuit configuration operating independently of the other circuit blocks 131, 132, and 133 by the operation of the NOR circuit 135 in order to supply a voltage lower than the ground voltage, for example, −1.0V as a voltage for turning off the transfer transistor 22.

Figure 3:
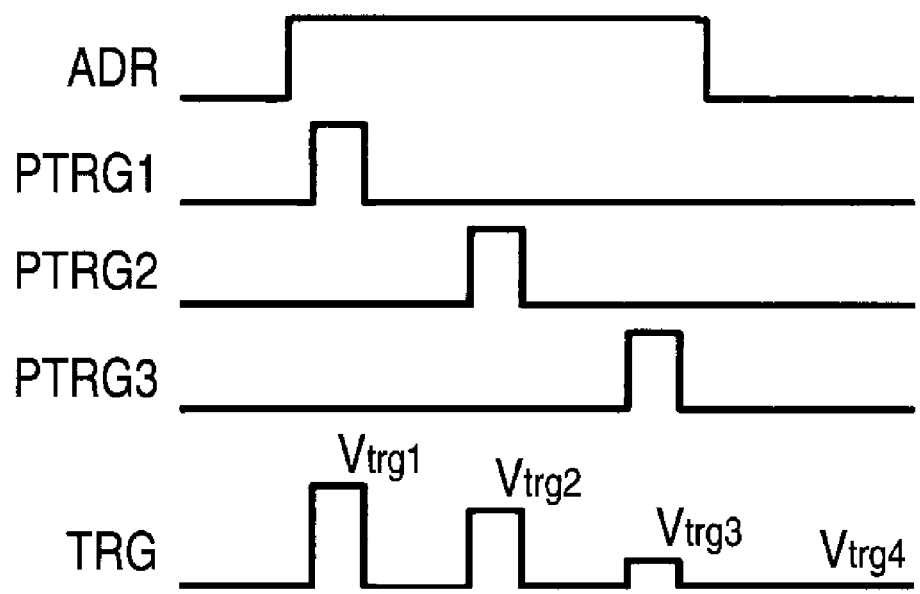
FIG. 3 is a timing chart showing timing relation of input and output in the supply voltage control circuit.

In FIG. 3, timing relation between input and output in the supply voltage control circuit 13 is shown. In the case that voltages to be supplied to the gate electrode of the transfer transistor 22 are Vtrg1, Vtrg2, Vtrg3, and Vtrg4, when a row is selected by the address signal ADR, according to timing signals PTRG1, PTRG2, and PTRG 3, the voltages Vtrg1, Vtrg2, and Vtrg3 which correspond to respective timing signals are supplied, and the voltage Vtrg 4 is supplied to other rows.

(Row Selection Circuit)

The row selection circuit 12 is equivalent to a first driving means in claims, which includes a shift register, an address decoder and the like, scanning and selecting respective pixels 20 in the pixel array area 11 with respect to respective electronic shutter rows and readout rows by every row in a vertical direction (up-and-down direction) by generating pixel drive pulsees such as the transfer pulse TRG, the reset pulse RST, and the selection pulse SEL and the like appropriately under control performed by a controller unit 16. For the electronic shutter row, an electronic shutter operation for sweeping away signals in pixels 20 of that row is performed, and for the readout row, a readout operation for reading out signals in pixels 20 of that row is performed.

(Pre-Selection Circuit)

The pre-selection circuit 213 is equivalent to a second driving means in claims, which is configured of plural row selection circuits, two row selection circuits 213A and 213B, for example, scanning and selecting plural rows (in this example, two rows) at regular intervals prior to the readout row scanned and selected by the row selection circuit 212.

The row selection circuits 213A and 213B are configured of a shift register or an address decoder, scanning and selecting two rows prior to the readout row scanned and selected by the row selection circuit 212 at regular intervals by generating the transfer pulse TRG appropriately, synchronizing them with scanning and selecting performed by the row selection circuit 212 under control performed by the controller unit 216. In the scanning and selecting, such an operation is performed in which based on the transfer pulse TRG, the signal charges stored in the photodiode 21 are transferred to the FD region 26. The detail of the operation will be explained later.

(Logic Circuit)

Under control performed by the controller unit 216, the logic circuit 214 supplies the transfer pulse TRG, the reset pulse RST and the selection pulse SEL, which are each outputted from the row selection circuit 212 and the two row selection circuits 213A and 213B of the pre-selection circuit 213 for row selection, to the transfer control lines 112, the reset control lines 113 and the selection control lines 114 of the pixel array area 11 through the driver circuit 215 as well as provides a signal for selecting the voltage value of the transfer pulse TRG to the driver circuit 215 as described later.

(Driver Circuit)

The driver circuit 215 supplies the transfer pulse TRG, the reset pulse RST and the selection pulse SEL at the voltage for turning ON/OFF the respective transistors 22, 23 and 25 of the pixel 20 to the pixel 20, synchronizing them with scanning and selecting performed by the row selection circuit 212, as well as supplies the transfer pulse TRG at an intermediate voltage that is the voltage for turning ON/OFF the respective transistors 22, 23 and 25 of the pixel 20 (hereinafter, referred to as "intermediate voltage") to the pixel 20, synchronizing them with scanning and selecting performed by the rows election circuits 213A and 213B. In other words, the driver circuit 215 has a function as first to third supply voltage control means in claims.

Figure 44:
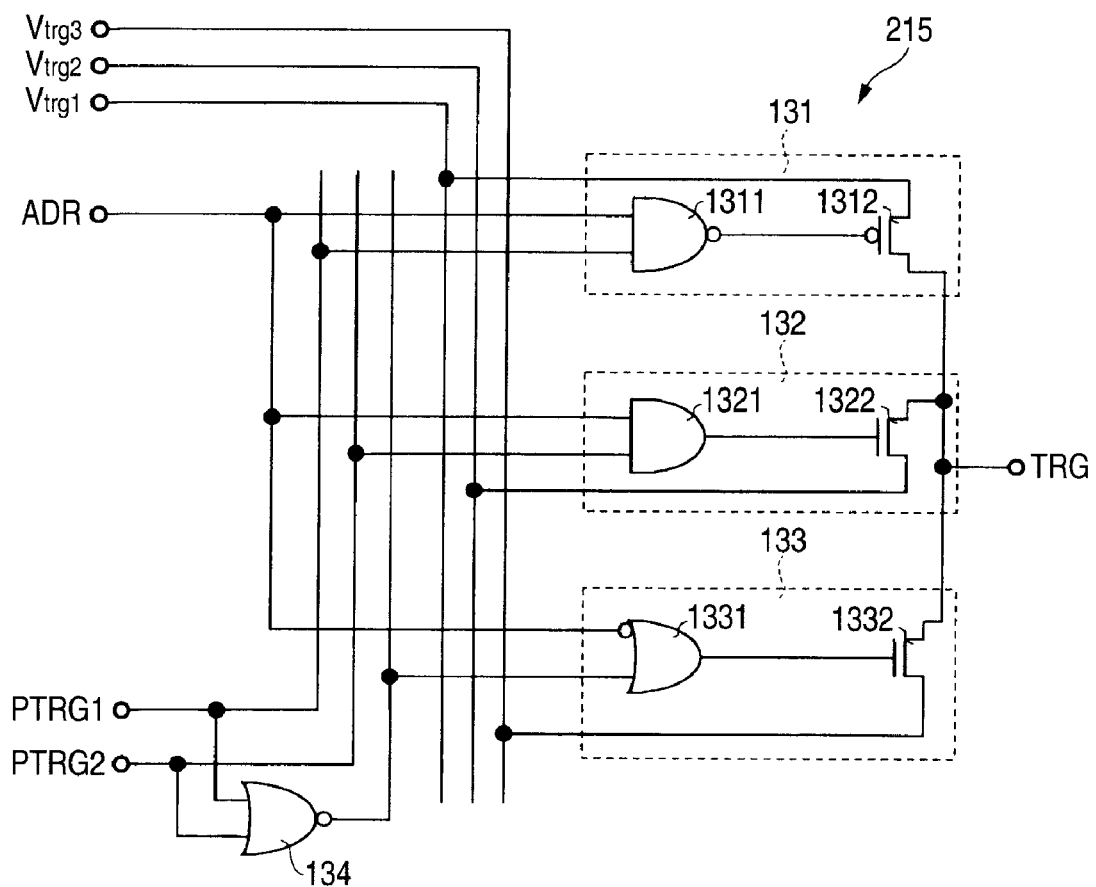
FIG. 44 is a circuit diagram showing a configuration example of a driver circuit.

FIG. 44 is a circuit diagram showing a configuration example of the driver circuit 215. Here, the configuration of a unit circuit for the transfer pulse TRG of the driver circuit 215 corresponding to a certain row. The unit circuit for the transfer pulse TRG is arranged by the number of rows of the pixel array area 11 together with the unit circuits for the reset pulse RST and the selection pulse SEL to configure the driver circuit 215.

As shown in FIG. 44, the driver circuit (unit circuit) 215 according to the embodiment has a circuit configuration having three circuit blocks 131 to 133 corresponding to three voltages Vtrg1, Vtrg2 and Vtrg3, for example, supplied from the voltage supply circuit 217, and a two-input NOR circuit 134.

Among these three voltages Vtrg1, Vtrg2 and Vtrg3, the voltages Vtrg1 and Vtrg3 are the voltages to turn ON/OFF the respective transistors 22, 23 and 25 of the pixel 20, and the voltage Vtrg2 is the intermediate voltage described above.

To the driver circuit 215, the address signal ADR is supplied from the row selection circuit 212 and the row selection circuits 213A and 213B as well as the timing signal PTRG1 is supplied from the logic circuit 214 at the timing of row selection and the timing signal PTRG2 at the timing of applying the intermediate voltage under control performed by the controller unit 216.

Figure 4A:
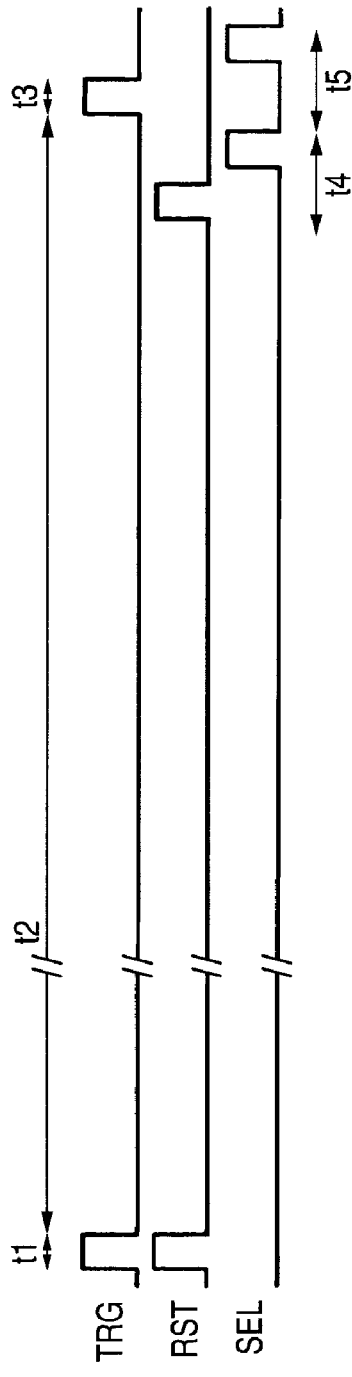
Figure 4B:
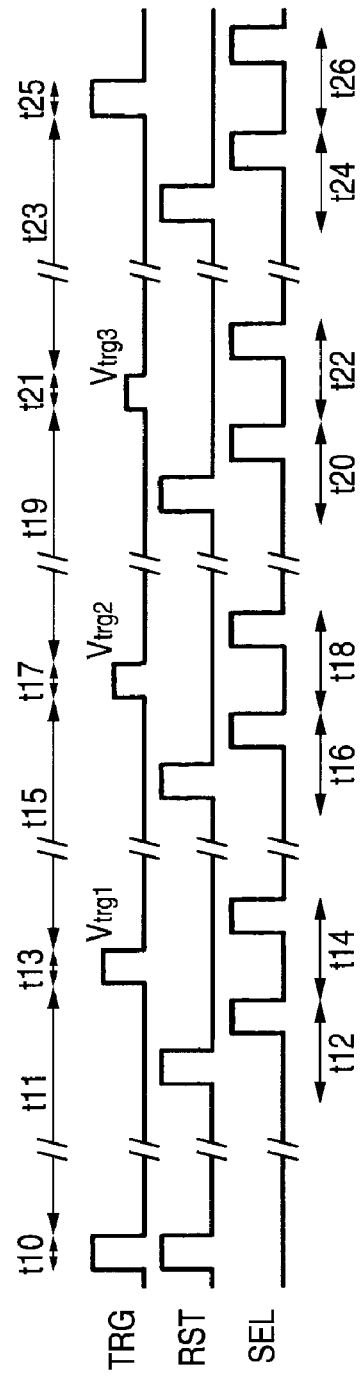

Subsequently, operation of the CMOS image sensor 10 according to the embodiment of the above configuration will be explained using timing charts of FIGS. 4A and 4B. FIGS. 4A and 4B show timing relation in respective operations, which are a case of a normal readout in FIG. 4A, and a case of aiming at high S/N and wide dynamic range in FIG. 4B.

In the CMOS image sensor 10 in which the unit pixel 20 including the pixel circuit configuration shown in FIG. 1 is arranged in a matrix form, generally, as shown in FIG. 4A, the photodiode 21 and the FD region 26 are reset by allowing both the transfer pulse TRG and the reset pulse RST to be the "H" level at a period "t1", received light is photoelectrically converted into electrons at a period "t2" to be stored in the photodiode 21. Then, the FD region 26 is reset by allowing the reset pulse RST to be the "H" level at a period t4 in the last half part of the period t2. Next, a potential of the FD region 26 is read out as a reset level by allowing the selection pulse SEL to be the "H" level, after that, electrons stored in the photodiode 21 are transferred to the FD region 26 by allowing the transfer pulse TRG to be the "H" level at a period t3, next, a potential of the FD region 26 is read out as a signal level at a period t5 by allowing the selection pulse SEL to be the "H" level.

In view of the above normal readout operation, there is a need for allowing S/N to be high and for allowing the dynamic range to be wide in the invention. According to an embodiment of the invention, plural control voltages are sequentially supplied to the control electrode (gate electrode) of the transfer transistor 22 in the storing period (exposure period) in which electrons are stored by the photoelectric conversion, and at that time, signal charges transferred by the transfer transistor 22 are read out twice and more.

Specifically, as shown in FIG. 4B, the photodiode 21 and the FD region 26 are reset by allowing both the transfer pulse TRG and the reset pulse RST to be "H" level at a period t10, received light is photoelectrically converted into electrons at a period t11 to be stored in the photodiode 21. Next, the FD region 26 is reset by allowing the reset pulse RST to be "H" level at a period t12 in the last half part of the period t11, then, a potential of the FD region 26 is read out as a reset level by allowing the selection pulse SEL to be "H" level.

Next, the voltage Vtrg1 is supplied to the control electrode of the transfer transistor 22 at a period t13, and electrons are transferred partially to the FD region 26 according to the amount of stored electrons in the photodiode 21, which is determined by the incident light intensity. At a period t14, a potential of the FD region 26 according to the amount of transferred electrons is read out as a signal level by allowing the selection pulse SEL to be "H" level, and noise cancel processing is performed in, for example, the column circuit 16 using the readout reset level at the period t12, if necessary.

At a period t15, storing operation is continuously performed, and the FD region 26 is reset again by allowing the reset pulse RST to be "H" level at a period t16, next, a reset level is read out by allowing the selection pulse SEL to be "H" level. Further, a voltage Vtrg2 is supplied to the control electrode of the transfer transistor 22 at a period t17, electrons exceeding the potential of the transfer transistor 22 by the voltage Vtrg2, in the sum of electrons remained in the photodiode 21 which has not been transferred at a period t13 and electrons stored in the period t15 are transferred to the FD region 26, and a potential of the FD region 26 is read out as signal level by allowing the selection pulse SEL to be "H" level at a period t18.

During a period t19 to a period 22, the same operation as the above is executed repeatedly, supplying a voltage Vtrg3 to the control voltage of the transfer transistor 22. In addition, the operation from the period t11 to the period t14 is executed once or plural times, while changing the supply voltage to the transfer transistor 22. After an exposure at a period t23, the reset operation is performed again by allowing the reset pulse RST to be "H" level at a period t24 and a reset level is read out by allowing the selection pulse SEL to be "H" level, next, the transfer transistor 22 is completely turned on and a complete transfer is executed to the FD region 26 by allowing the transfer pulse TRG to be "H" level at a period t25, then, a signal level is read out by allowing the selection pulse SEL to be "H" level at a period t26.

In the CMOS image sensor 10 in which the unit pixel 20 including the pixel circuit configuration shown in FIG. 1 is arranged in a matrix form, generally, as shown in FIG. 45A, the photodiode 21 and the FD region 26 are reset to a predetermined potential at a period T1, and light received at a period T2 is photoelectrically converted into electrons to be stored in the photodiode 21. In addition, the FD region 26 is reset at a period T4 that is the later half of the period T2, and a potential of the FD region 26 at this time is read out as the reset level. After that, the electrons stored in the photodiode 21 are transferred to the FD region 26 at a period T3, and a potential of the FD region 26 at this time is read out as a signal level at a period T5.

In view of the above normal readout operation, there is a need for allowing S/N to be high and for allowing the dynamic range to be wide in the invention. According to an embodiment of the invention, in a storing period (first exposure period) in which electrons are stored by the photoelectric conversion, a first control voltage is supplied to the gate electrode of the transfer transistor 22 as well as a second control voltage having a voltage value different from that of the first control voltage is supplied once or plural times, a third control voltage having the same voltage value as that of any one or a plurality of the respective second control voltages is supplied once or plural times prior to any one or a plurality of supplies of the plural second control voltages, signal charges to be transferred to the FD region 26 by the transfer transistor 22 are read out when the first control voltage is supplied, and signal charges to be transferred to the FD region 26 by the transfer transistor 22 are read out once and more drive when the second control voltage is sequentially supplied.

Here, the first control voltage is a voltage that can completely transfer the charges stored in the photodiode 21 to the FD region 26 by the transfer transistor 22. Hereinafter, the first control voltage is referred to as a complete transfer voltage. In addition, the second and third control voltages are the intermediate voltage described above. Hereinafter, the second and third control voltages are referred to as an intermediate voltage. In this example, since the transfer transistor 22 is an NMOS transistor, the voltage value different from that of the first control voltage means a voltage value lower than that of the first control voltage. Naturally, in the case in which the transfer transistor 22 is a PMOS transistor, the voltage value is the voltage value lower than that of the first control voltage. In addition, as to the second and third control voltages, "the same voltage value" includes not only the case in which the voltage values are completely the same but also the case of a few percentages of some errors.

More specifically, as shown in FIG. 45B, the photodiode 21 and the FD region 26 are reset at a period T10, and light received at a period T11 is photoelectrically converted into electrons to be stored in the photodiode 21. Subsequently, the FD region 26 is reset at a period T12. Here, a potential of the FD region 26 at the period T12 may be read out as a reset level.

Then, an intermediate voltage (third control voltage) Vtrg is supplied to the gate electrode of the transfer transistor 22 at a period T13, and electrons are partially transferred to the FD region 26 depending on the amount of the electrons stored in the photodiode 21 decided in accordance with the incident light intensity. At a period T14, a potential of the FD region 26 depending on the amount of the transferred electrons is read out as a signal level, and the reset level read out at the period T12 is used to perform noise cancel processing in the column circuit 218, for example, if necessary.

At a period T15, storing operation is continuously performed, and the FD region 26 is reset again at a period T16. Here, a potential of the FD region 26 at a period T16 may be read out as a reset level. Furthermore, an intermediate voltage (third control voltage) Vtrg is supplied to the gate electrode of the transfer transistor 22 at a period T17, and in the sum of the electrons that are not transferred at the period T13 and remain in the photodiode 21 and the electrons stored at the period T15, the electrons exceeding the potential of the transfer transistor 22 by applying an intermediate voltage are transferred to the FD region 26. The potential may be read out as a signal level at a period T18.

In the period from a period T19 to a period T22, an intermediate voltage (second control voltage) Vtrg having the same voltage value as that of the previous intermediate voltage is applied to the gate electrode of the transfer transistor 22 to repeatedly perform the similar operation. In addition, the operations from the period T11 to the period T14 are performed once or plural times as the supply voltage to the transfer transistor 22 is varied. Then, after exposure at a period T23, the reset operation is performed again at a period T24 to read the reset level. After that, the transfer transistor 22 is completely turned to the ON state at a period T25 to perform complete transfer to the FD region 26, and then a signal level is read out at a period T26.

Figure 5:
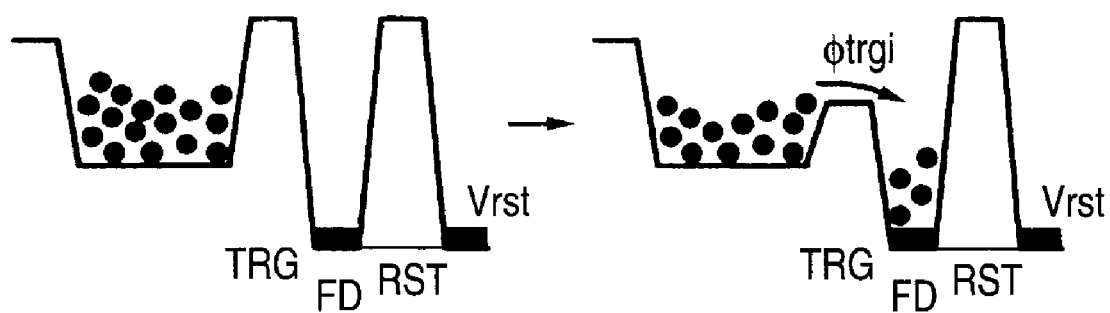
FIG. 5 is a potential diagram showing an example of a potential in a pixel when plural voltages are selectively supplied to a control electrode of a transfer transistor.

An example of a potential in a pixel when the voltages Vtrg1, Vtrg2, and Vtrg3 are supplied to the control electrode of the transfer transistor 22 is shown in FIG. 5. In the case that the number of electrons stored in the photodiode 21 are large and exceeds a potential Φtrgi by the voltage Vtrg1, electrons stored in the photodiode 21 are partially transferred to the FD region 26.

Figure 6:
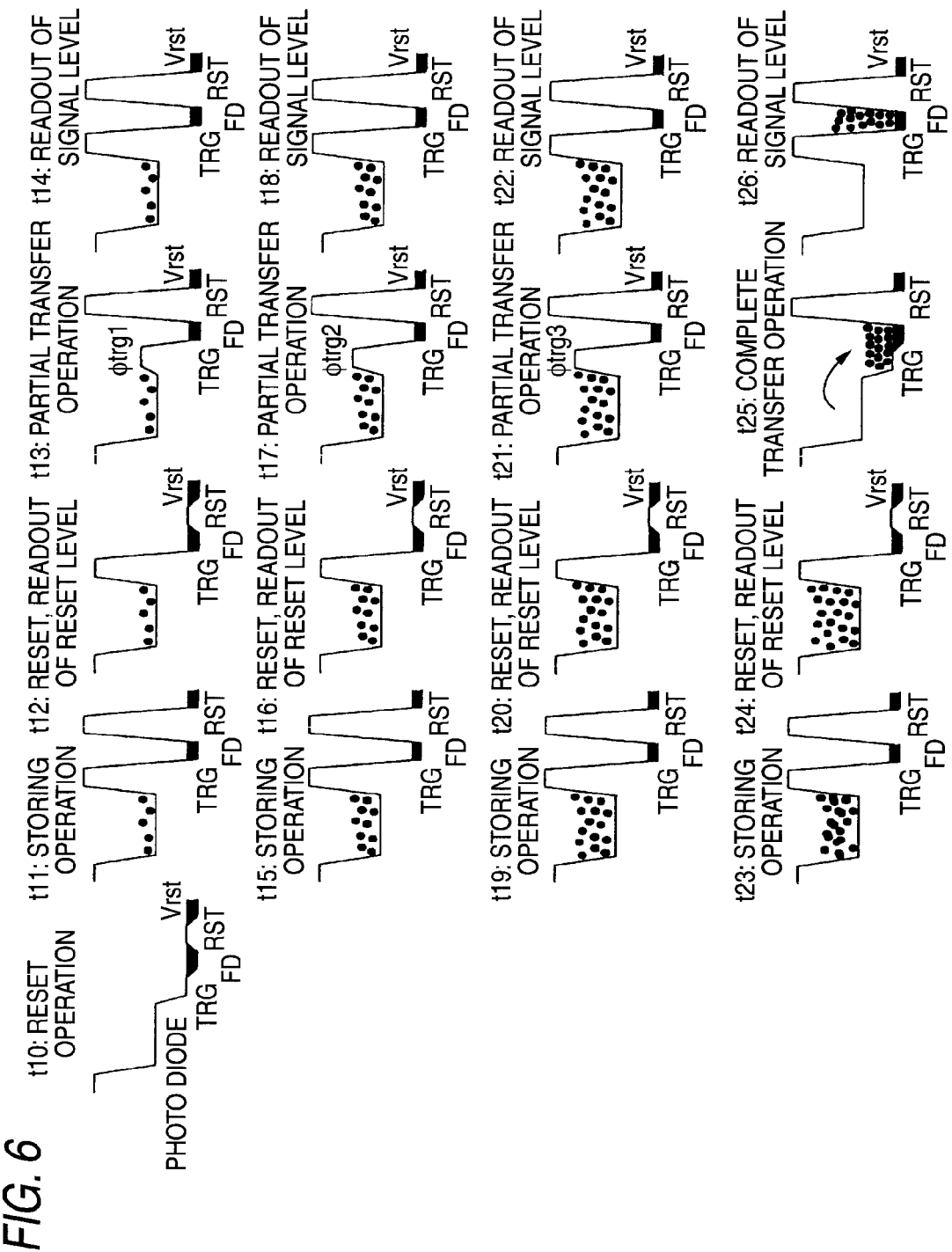
FIG. 6 is a potential diagram showing potential variations when incident light is weak.

FIG. 6 is a potential diagram showing potential variations when the voltage Vtrg is supplied in stages with weak incident light. In the case that the number of electrons stored in the photodiode 21 is small, the number does not exceeds the potential Φtrgi of the transfer transistor 22, therefore, electrons generated by photoelectric conversion are held in the photodiode 21, transferred to the FD region 26 at the final transfer, then, read out as a signal level.

Figure 7:
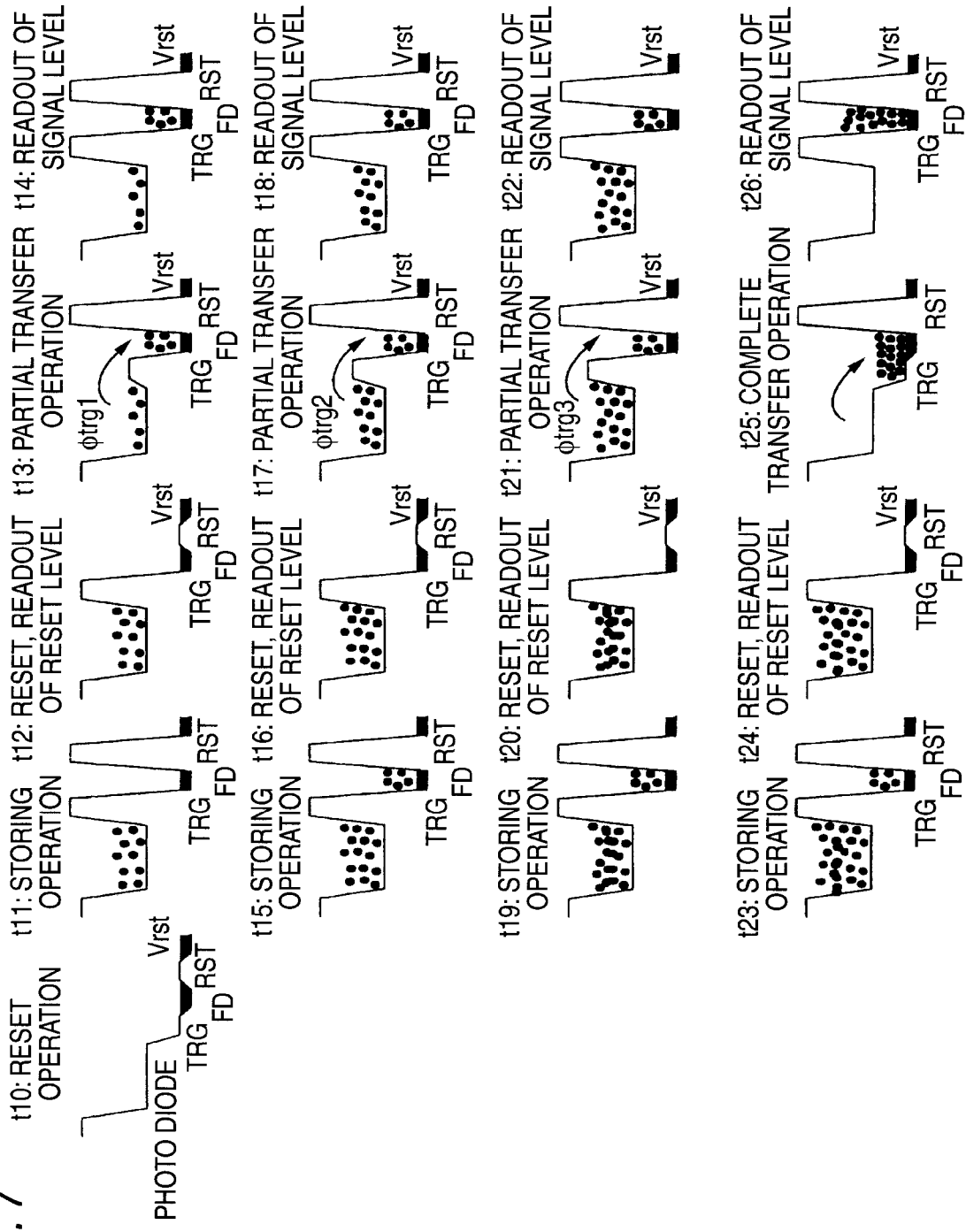
FIG. 7 is a potential diagram showing potential variations when incident light is strong.

On the other hand, as shown in FIG. 7, when incident light is strong, electrons exceeding the potential Φtrgi are transferred to the FD region 26 and sequentially read out as signal levels. Accordingly, it is possible to read out at the final transfer through sufficient exposure time without deterioration of the signal in the case of low luminance, and it is possible to finally create a composite image with wide dynamic range by reading out excessive electrons in stages in the case of high luminance.

Note that respective operation periods t10 to t26 in FIG. 6 and FIG. 7 correspond to the respective operation periods t10 to t26 in the timing chart of FIG. 4B.

As described above, when plural voltages Vtrg1, Vtrg2 and Vtrg3 are supplied in stages to the control electrode of the transfer transistor 22 and excessive electrons are transferred to the FD region 26 plural times, after the second transfer, threshold variations are cancelled. There are following reasons.

Here, before the discussions of operation and effect are given which are the feature of the embodiment of the invention, in which the intermediate voltage having the same voltage value is supplied to the gate electrode of the transfer transistor 22 plural times, the case is studied in which an intermediate voltage having a different voltage value is supplied to the gate electrode of the transfer transistor 22 plural times.

<Operation and Effect with Applying an Intermediate Voltage Plural Times>

First, during the exposure time in which the electronic shutter is released to turn on the transfer transistor 22 of the pixel 20 for reading the stored charges, one or plural intermediate voltages are applied to the transfer transistor 22 of the pixel 20 for readout, whereby information of the high luminance area can be obtained as a high S/N is kept secured in the low luminance area.

In addition, the reset operation is performed in which plural intermediate voltages are used to transfer charges plural times and the FD region 26 is reset to a predetermined potential (for example, the power supply voltage VDD) without reading a signal level once or plural times among the plural transfers, that is, the reset operation is performed by means of the reset unit formed of the reset transistor 23 and the row selection circuits 213A and 213B that apply the reset pulse RST to the reset transistor 23, whereby the threshold variations of the transfer transistors 22 of the pixels 20 can be effectively cancelled.

Figure 8:
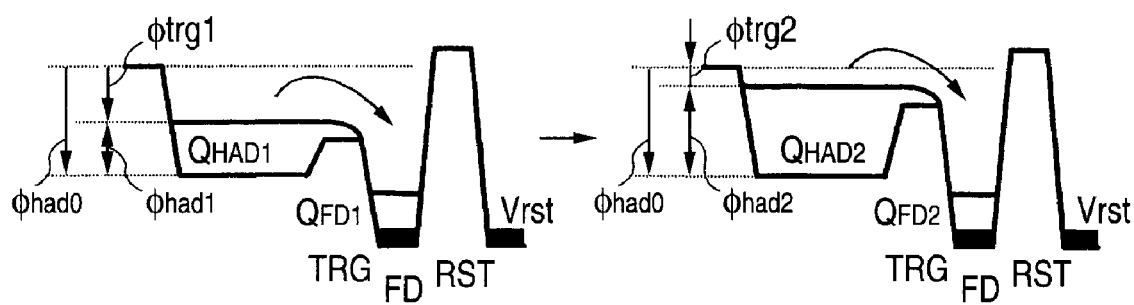
FIG. 8 is an explanatory diagram of a reason that threshold variations are cancelled after the second transfer.

As shown in FIG. 8, when the voltage Vtrg1 is applied to the control electrode of the transfer transistor 22 at the first transfer, a potential of the transfer transistor 22 is denoted by $\phi_{trg1}$, a potential of the photodiode 21 before charges are stored is denoted by $\phi_{had0}$, the number of electrons held in the photodiode 21 is denoted by $Q_{HAD1}$, the number of electrons overflowed to the FD region 26 is denoted as $Q_{FD1}$, a potential of the photodiode 21 when the number of electrons $Q_{HAD1}$ is held is denoted by $\phi_{had1}$. When photoelectric current generated in the photodiode 21 in proportion to the incident light intensity is Ipd, exposure time to the first transfer is $\Delta T$, capacity of the photodiode 21 is Cpd, $Q_{HAD1}$ and $Q_{FD1}$ are represented by the following formulas.

$$Q_{HAD1} = Cpd \cdot \phi_{had1}$$

$$Q_{FD1} = Ipd \cdot \Delta T - Q_{HAD1}$$

$$\phi_{had1} = \phi_{had0} - \phi_{trg1}$$

$$\phi_{trg1} = Vtrg1 - (Vth + \Delta Vth)$$

In the above, Vth is a threshold of the transfer transistor 22, and $\Delta$Vth is a threshold variation of the transfer transistor 22.

In the second transfer when the different voltage Vtrg2 is applied after exposure is continuously performed for $\Delta T$ period of time and photoelectric current is stored, similarly, when a potential of the transfer transistor 22 is $\phi_{trg2}$, the number of electrons held in the photodiode 21 is $Q_{HAD2}$, the number of electrons overflowed to the FD region 26 is $Q_{FD2}$, a potential of the photodiode 21 when the number of electrons $Q_{HAD2}$ is held is $\phi_{had2}$, the following formulas can be derived.

$$Q_{HAD2} = Cpd \cdot \varphi_{had2}$$

$$\varphi_{had2} = \varphi_{had0} - \varphi_{trg2}$$

$$\varphi_{trg2} = V_{trg2} - (Vth + \Delta Vth)$$

$$\begin{aligned}Q_{FD2} &= (Q_{HAD1} + Ipd \cdot \Delta T) - Q_{HAD2}\\ &= Cpd \cdot \varphi_{had1} + Ipd \cdot \Delta T - Cpd \cdot \varphi_{had2}\\ &= Cpd \cdot (\varphi_{had0} - \varphi_{trg1}) + Ipd \cdot \Delta T -\\ &\quad Cpd \cdot (\varphi_{had0} - \varphi_{trg2})\\ &= Cpd \cdot \varphi_{trg1} + Ipd \cdot \Delta T - Cpd \cdot \varphi_{trg2}\\ &= Cpd \cdot \{V_{trg1} - (Vth + \Delta Vth)\} + Ipd \cdot \Delta T -\\ &\quad Cpd \cdot \{V_{trg2} - (Vth + \Delta Vth)\}\\ &= Ipd \cdot \Delta T - Cpd \cdot (V_{trg2} - V_{trg1})\end{aligned}$$

As described above, after the second transfer, the number of electrons transferred intermediately to the FD region 26 is determined by the incident light intensity, namely, the amount of generated photoelectric current and the difference between the voltage Vtrg2 applied to the control electrode of the transfer transistor 22 and the voltage Vtrg1 applied just before, which can reduce effect of the threshold variation $\Delta$Vth of the transfer transistor 22. Further, since the number of electrons transferred through the transfer transistor 22 at respective timings has correlation, the remained number of electrons not transferred in the transfer period according to the number of electrons exceeding the potential has also correlation, as a result, variations caused by the remained electrons are reduced after the second transfer.

As apparent from the discussions above, in the case in which plural intermediate voltages Vtrg1 and Vtrg2 are applied to the transfer transistor 22 at different timings during the exposure time, potentials ☐trg1 and ☐trg2 in the transfer transistor region each include the threshold variations of the transfer transistors 22. Since the charges equivalent to the threshold variations are swept into the FD region 26 in the transfer operation at the potential ☐trg1, in the transfer operation at the subsequent potential ☐trg2, a charge amount QFD2 is transferred to the FD region 26, which is determined by the difference between the charges stored during the operation and the amount of the held charges in the photodiode 21 because of the difference between the potentials ☐trg1 and ☐trg2. Since the potentials ☐trg1 and ☐trg2 have the same threshold variations of the transfer transistors 22, they do not affect the difference in the amount of the held charges, and the effect on the transfer charge amount caused by the intermediate voltages Vtrg1 and Vtrg2 can be cancelled.

The level of the voltage Vtrg to be supplied to the transfer transistor 22 is determined as follows.

Figure 9:
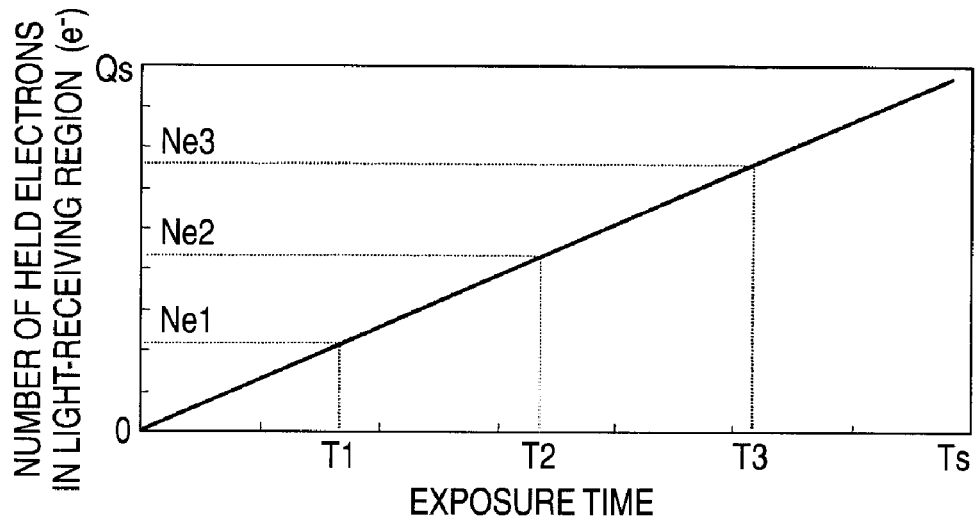
FIG. 9 is a graph showing relation between exposure time and the number of stored electrons in a light-receiving region.

As shown in FIG. 9, when the amount of incident light is fixed, the number of electrons to be stored in the photodiode 21 increases in proportion to exposure time. For example, when the incident light intensity is assumed, under which the number of electrons reaches the number of saturated electrons Qs in an exposure time Ts to be a standard such as 1/30 second when 30 frames per second, 1/60 second when 60 frames per second, the number of stored electrons Nei at a timing Ti when the voltage Vtrg is supplied to the control electrode of the transfer transistor 22 is estimated. A supply voltage Vtrgi at the timing Ti is set as a voltage by which the number of stored electrons Nei is stored in the photodiode 21.

Figure 10:
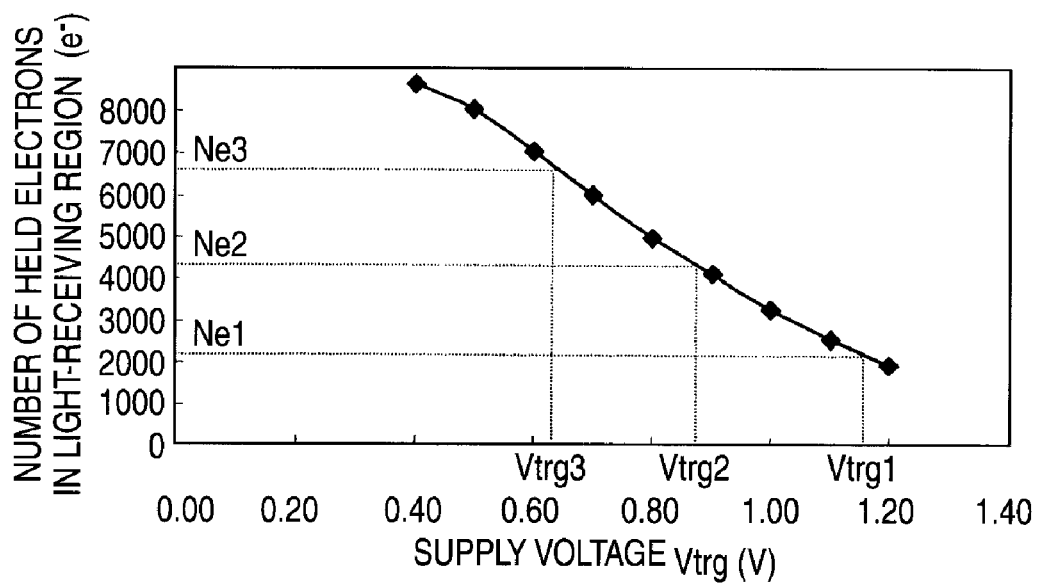
FIG. 10 is a graph showing experimental results of a supply voltage Vtrg to the control electrode of the transfer transistor in the photodiode of which the number of saturated electrons Qs is 8800e− and the number of electrons held in the photodiode when the voltage Vtrg is supplied.

In FIG. 10, results of an experiment of the supply voltage Vtrg to the control electrode of the transfer transistor 22 in the photodiode 21 of which the number of saturated electrons Qs is 8800e− and the number of electrons stored in the photodiode 21 when the voltage Vtrg is supplied.

In this case, the supply voltages at timings T1, T2, and T3 will be voltages Vtrg1, Vtrg2, and Vtrg3 from the number of stored electrons Ne1, Ne2, and Ne3 in FIG. 9. Concerning voltages to be supplied in practice, it is preferable to apply a voltage several 100 mV lower than the above in the case that the transfer transistor 22 is an N-channel MOS transistor, and a voltage several 100 mV higher than the above in the case of a P-channel MOS transistor, in consideration of a margin for preventing a leak from the photodiode 21 to the FD region 26 caused by thermal diffusion and the like.

Here, in setting the plural intermediate voltages Vtrg1 and Vtrg2, it can be considered that such a voltage is set that can hold the stored charges at respective timings in the photodiode 21 under the condition that the mount of light reaching the saturation level enters during the exposure time from the electronic shutter to normal readout. More specifically, as shown in FIG. 9, a charge amount that has to be held in the photodiode 21 at the timing of applying an intermediate voltage is estimated from the line reaching the saturated charge amount Qs in the exposure time, and an apply voltage that can hold that charge amount is determined from the relation between the apply voltage and the number of held electrons in the light-receiving region as shown in FIG. 10.

<The Case in which the Voltage Value of the Intermediate Voltage is Different>

However, when the voltage value of the intermediate voltage (second control voltage) applied in the intermediate readout operation is different from the voltage value of the intermediate voltage (third control voltage) applied in advance for suppression of the threshold variations of the transfer transistors 22, the variations in characteristics below might not be cancelled enough.

(1) The Offset Value of the Intermediate Voltage to be Supplied

In the case in which two types of intermediate voltages Vtrg1 and Vtrg2 are applied to the transfer transistor 22 at different timings during the exposure time, the transferred amount by the second time intermediate voltage is determined by the charges stored in the transfer by applying the respective intermediate voltages and the voltage difference between the intermediate voltage Vtrg1 and the intermediate voltage Vtrg2. In the case in which the intermediate voltage to be supplied to the transfer transistor 22 has an offset to the set voltage value, the voltage difference between the two intermediate voltages Vtrg1 and Vtrg2 is deviated from the set value, which might deteriorate the image quality in the high luminance area as noise.

(2) The Offset Value of the Intermediate Voltage in the Pixel Arrangement

In the case in which an intermediate voltage is applied to the pixel arrangement, an offset is provided in the intermediate voltage depending on the position in the pixel arrangement due to the effect caused by parasitic resistance in an supply wiring. Since the voltage values of plural intermediate voltages to be supplied are different, these offset values are varied in every transfer, which might deteriorate the image quality in the high luminance area as noise.

(3) Variations in Time in which an Intermediate Voltage is being Applied to the Transfer Transistor in the Pixel Arrangement In the case in which an intermediate voltage is supplied to the transfer transistor 22 through the drive circuit, because of the resistance or capacitance of the wiring and the transistor, a rise time and a fall time are varied depending on the position in the pixel arrangement. Since the transfer by applying an intermediate voltage is converged in the subthreshold region, the charge amount to be transferred might be changed when the time to apply a desired voltage to the transfer transistor 22 is varied between pixels, which leads to deterioration in the image quality in the high luminance area as noise.

(4) The Residual Transfer Charge Amount in Intermediate Voltage Transfer

When the charge amount stored in the light-receiving region (photodiode 21) is varied depending on the regions immediately before an intermediate voltage is applied, transfer by applying an intermediate voltage is operated in the subthreshold region. Thus, in the case in which apply time for the intermediate voltage is shorter than the time necessary for charge transfer to converge, transfer residues occur which are different depending on the amount of the stored charges immediately before transfer. Because of this, the image quality in the high luminance area is deteriorated as noise.

Figure 11:
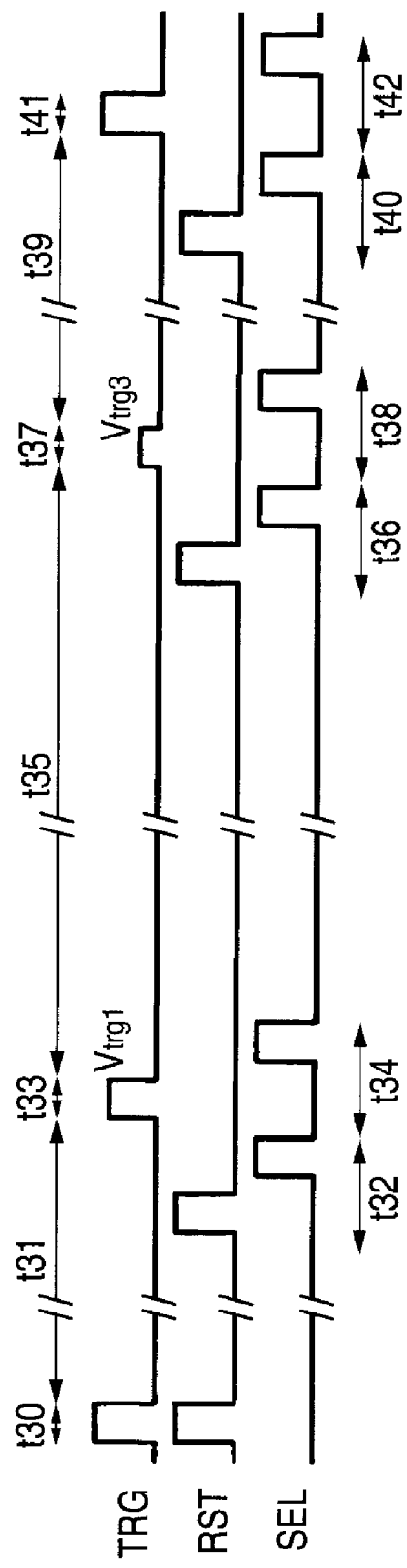
FIG. 11 is a timing chart showing another example of supply timing of voltages to be supplied to the control electrode of the transfer transistor.

In FIG. 11, another example of timings of supplying voltage to be supplied to the control electrode of the transfer transistor 22 is shown.

In another example, the voltage Vtrg1 is supplied at a timing of ¼ of exposure time to the complete transfer, and the voltage Vtrg3 is supplied at a timing of ¾. The method of determining respective voltages Vtrg1, Vtrg3 is the same as the above example.

Accordingly, by controlling intervals of supplying the voltages Vtrg1, Vtrg3, relation between the number of electrons of intermediate transfer and the incident light intensity, namely, sensibility can be controlled. That is, by allowing the execution interval of respective intermediate transfers to be plural, the dynamic range can be widen at plural sensibilities, as well as S/N at an area where the light intensity is relatively weak in the wide dynamic range area can be set relatively high.

For example, as shown in FIG. 11, when an exposure time to the first intermediate transfer (t31) is ¼ of the whole, and an exposure time from the first intermediate transfer to the second intermediate transfer (t35) is ½ of the whole, the sensibility of the number of electrons to be read out with respect to the incident light intensity in the first transfer will be ¼, which contributes to expansion of the dynamic range.

In the second transfer, the sensibility will be ½, and the dynamic range is narrower than the first transfer, however, higher S/N than in the region by the first transfer can be realized until the region which is approximately twice as wide as the normal region. In the last complete transfer, the sensibility and dynamic range of one time, namely, equivalent to the normal with respect to the incident light intensity are realized, which avoids deterioration of image quality by the wide dynamic range in the low luminance area.

Figure 12:
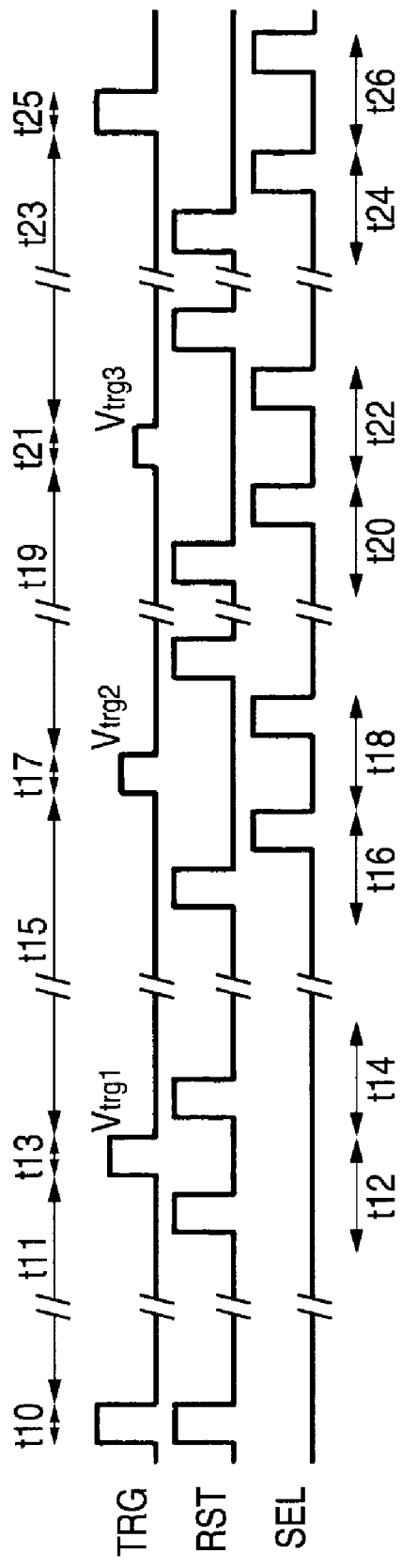
FIG. 12 is a timing chart showing further another example of supply timing of voltages to be supplied to the control electrode of the transfer transistor.

In FIG. 12, further another example of timings of supplying voltage to be supplied to the control electrode of the transfer transistor 22 is shown.

In the example, in an arbitrary once or plural times in plural supplies of the voltage Vtrgi, the reset operation is executed without reading out the transferred signal level. The operation can be realized by moving to the reset operation just after the transfer without activating the selection signal. According to the operation, when obtaining signals in which variations of the number of transferred electrons by threshold variations are reduced, the readout operation having large variations in the first transfer can be omitted.

It becomes possible that the transfer interval can be made shorter than a frame rate of the CMOS image sensor 10 by not executing the readout operation, which contributes to expansion of the dynamic range. For example, in FIG. 12, the voltage Vtrg1 is supplied at a timing of ⅛ of exposure time to the complete transfer, and the reset is performed without reading out a signal level. The voltage Vtrg2 is supplied at a timing of ¼, and a signal level is read out. Next, the voltage Vtrg3 is supplied at a timing of ¾ and a signal level is read out, and finally, in the complete transfer, a signal level is read out.

In readout operations performed four times in total, in the first readout transferred by the voltage Vtrg2, output corresponding to ⅛ of exposure time can be obtained, therefore, approximately eight-times dynamic range can be secured at the maximum, and threshold variations are reduced by the transfer of the voltage Vtrg1 just before. In the second readout by the voltage Vtrg3, the transfer interval is ½, therefore, it is possible to obtain a signal having S/N which is higher than the first readout in dynamic range which is twice as wide as a saturation level.

In the example, the dynamic range is expanded to approximately eight times its ordinary width, however, it is sufficient that readout speed is four times its ordinary speed. Similarly, the dynamic range can be expanded by allowing the supply timing of the voltage Vtrg1 to be close to the supply timing of the voltage Vtrg2. As the example shown in FIG. 12, it is also possible that electrons in the FD region 26 are previously reset by executing reset operation just after the transfer or readout of the signal level in addition to the operation of FIG. 4A.

Figure 13:
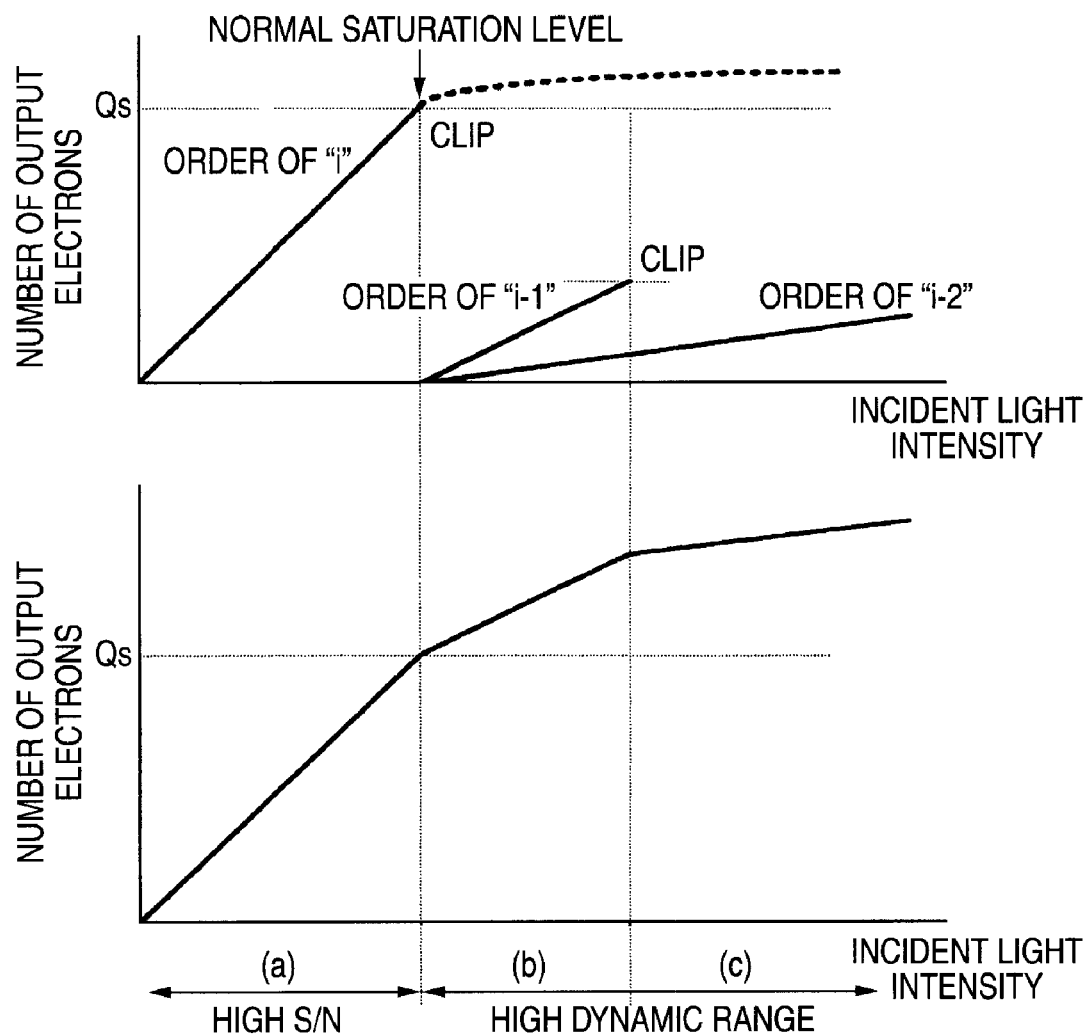
FIG. 13 is an explanatory diagram for making S/N high and making the dynamic range wide.

Signals obtained by intermediate transfers of plural times obtains continuous input and output characteristics by being clipped at the saturation levels which have been previously set and added as shown in FIG. 13. For example, in FIG. 13, after the complete transfer in the normal exposure as a readout in the order of "i", the signal is outputted in high S/N until the normal saturation level. In the transfer in the previous order of "i-1", almost doubled dynamic range can be obtained by performing intermediate transfer at ½ of exposure time, and in the transfer in the order of "i-2", almost eight-times dynamic range can be obtained by performing intermediate transfer at ⅛ of exposure time. It is possible to obtain continuous characteristic by clipping and adding signals at points near the saturation levels.

Processing for allowing S/N to be high and for allowing the dynamic range to be wide by clipping and adding will be performed by using a frame memory which stores an image read out plural times, for example, in a signal processing circuit (not shown) of the CMOS image sensor 10 provided at a subsequent stage.

However, the processing example is only an example, and it is possible to process by using a personal computer if the image read out plural times is stored, and it is also possible to employ a configuration in which processing is performed in the CMOS image sensor 10 and only a final image is outputted by mounting the frame memory on the CMOS image sensor 10.

Figure 14:
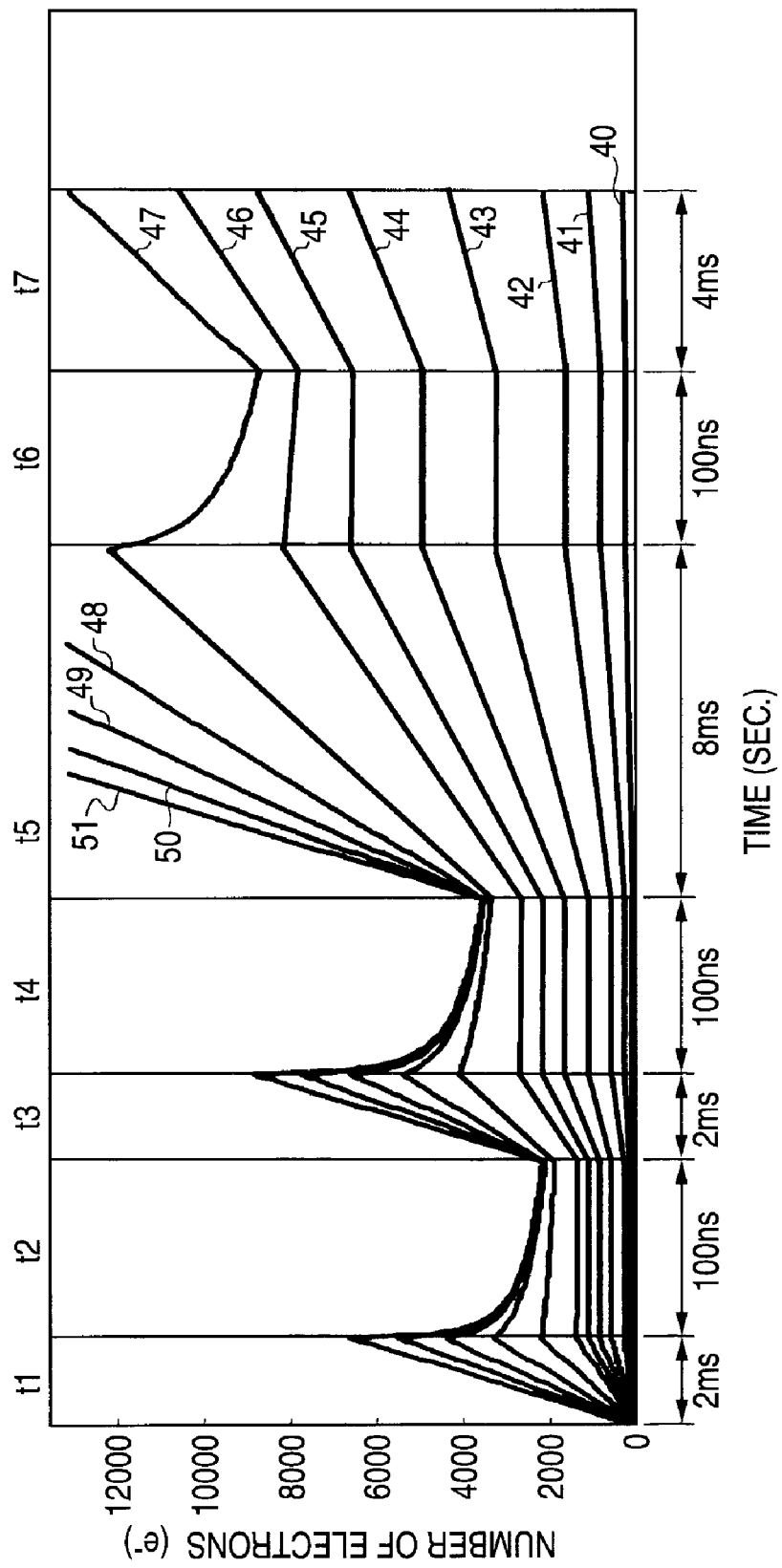
FIG. 14 is a graph showing experimental results in prescribed conditions.

In FIG. 14, experimental results are shown. In the experiment, the voltage Vtrg1 of 0.6V, the voltage Vtrg2 of 1.1V, and the voltage Vtrg3 of 1.3V in the timing chart of FIG. 12 are supplied to the control electrode of the transfer transistor 22.

FIG. 14 represents the respective numbers of electrons remained in the photodiode 21 are represented at the time when the intermediate transfer by the first voltage Vtrg1 is executed 2 ms later, when the intermediate transfer by the second voltage Vtrg2 is executed 4 ms later, and when the third intermediate transfer is executed 12 ms later than the reset of the photodiode 21, in the case that exposure time from the reset of the photodiode 21 to the complete transfer is approximately 16 ms.

In FIG. 14, t1, t2, t3 and t4 are exposure periods, and t2, t4, and t6 are transfer periods. Time while applying the voltage Vtrg to the control electrode of the transfer transistor 22 is 100 ns. Graphs 40 to 51 represent conditions in which lights enter the photodiode 21, which have intensities to allow the total number of electrons generated in the photodiode 21 during 16 ms to be 350e-, 1200e-, 2200e-, 4400e-, 6600e-, 8800e-, 11000e-, 17500e-, 25000e-, 35000e-, 44000e-, 53000e-, respectively. It is preferable that the transfer period will be sufficiently long so that the transfer comes closed to a balanced state, and more preferable that it will be 100 ns and more.

Figure 15:
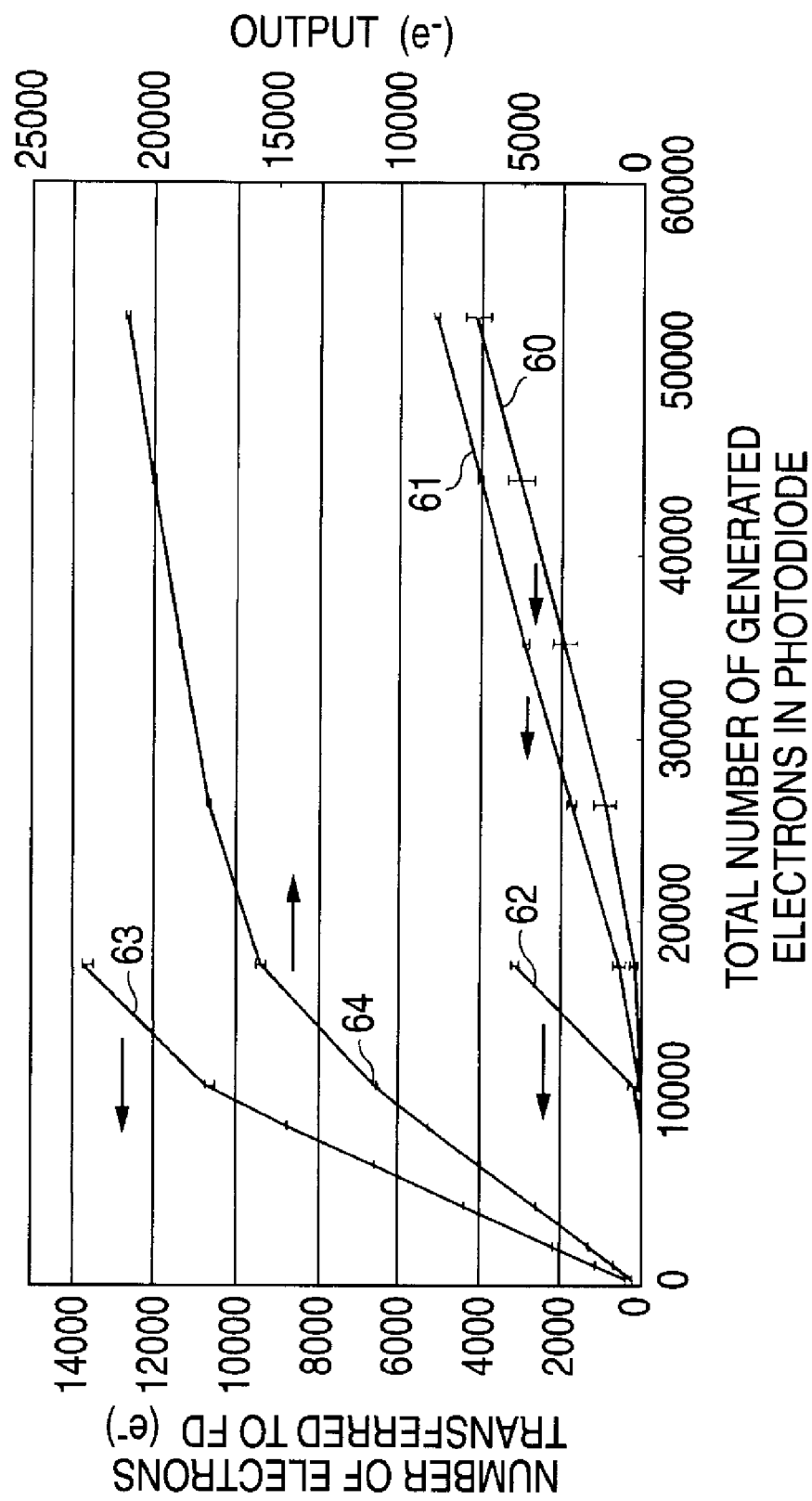
FIG. 15 is a graph showing relation between the total number of generated electrons indicating incident light intensity in the above experiment and the number of electrons transferred by respective intermediate transfers and the last complete transfer as outputs.

FIG. 15 is a graph showing relation between the total number of generated electrons showing the incident light intensity in the above experiment and the number of electrons transferred as output in respective intermediate transfers and the last complete transfer. In FIG. 15, a graph 60 denotes the number of electrons transferred by the voltage Vtrg1, error bars are values when the threshold of the transfer transistors 22 varies ±50 mV.

In the first transfer, variations of the number of transferred electrons caused by threshold variations are large, however, in a transfer result 61 by the second voltage Vtrg2, variations of the number of electrons are reduced. A transfer result 62 by the third voltage Vtrg3 has high sensibility and large gradient because the transfer period is longer than the transfer by the voltage Vtrg2. A result 63 by the complete transfer has the same S/N as the normal transfer in which the intermediate transfer is not performed with low luminance. The results 61, 62 have gradients of ½ times and /1;8 times of the result 63, respectively, which verifies that the sensibility is controlled and that the dynamic range is allowed to be wide by controlling the transfer timing. The result 63 is a wide-dynamic range characteristic obtained by the above method of characteristic composition. It realizes high S/N with low luminance and wide dynamic range in a linear characteristic.

As described above, for example, in the CMOS image sensor 10 in which the unit pixel 20 including the photodiode 21 and the transfer transistor 22 transferring signal charges which are photoelectrically converted in the photodiode 21 is two-dimensionally arranged in a matrix form, plural first control voltages are sequentially supplied from the supply voltage control circuit 13 to the control electrode of the transfer transistor 22, and at that time, driving in which signal charges transferred by the transfer transistor 22 are read out twice and more is performed by the vertical scanning circuit 12, which enables signal acquisition in linear and high S/N without narrowing the normal saturation level with low luminance, and enables the expansion of dynamic range while realizing good S/N in the linear region also with respect to incident light which is more than the normal saturation level.

Accordingly, it becomes possible to obtain high-quality images having high S/N in a low luminance scene, and to obtain high-quality images with less saturation by linear response in a high luminance scene, with respect to variation of external light in various environments such as indoor and outdoor, daytime and nighttime. Further, even in a high-contrast scene in which both low luminance and high luminance exist, saturation in a high luminance part can be avoided while maintaining high S/N in a low luminance part.

Additionally, in the case that pixels having high sensibility are arranged in the normal pixel arrangement for the purpose of increasing the sensibility, it is not necessary to lower S/N in the normal pixels to suit exposure time to the high sensibility pixels, and high S/N images of high sensibility pixels can be obtained by suiting the adequate exposure of normal pixels, which will be an advantageous for processing for high image quality in a subsequent stage.

In the above embodiment, the case in which the invention is applied to the CMOS image sensor in which the unit pixel 20 (refer to FIG. 1) including selection transistor 25 is arranged in a matrix form was explained, however, the invention is not limited to the application.

That is to say, in the CMOS image sensor 10 according to the embodiment of the invention, electrons transferred to the FD region 26 can be reset before the next exposure period, regardless of whether there is readout operation or not just after the transfer, therefore, the invention can be also applied to a CMOS image sensor in which an unit pixel not including the selection transistor 25 is arranged in a matrix form.

Figure 16A:
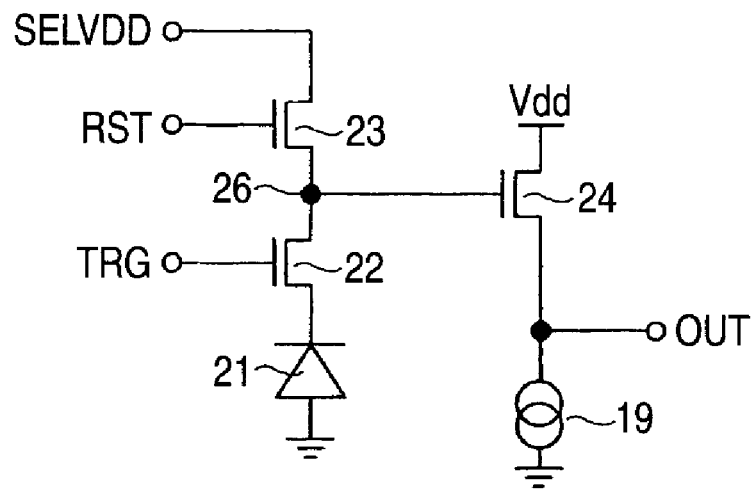
FIGS. 16A and 16B are circuit diagrams showing other circuit examples of an unit pixel.

Specifically, as shown in FIG. 16A, the invention can be also applied to the CMOS image sensor having an unit pixel of a pixel circuit including, in addition to the photodiode 21, three transistors of transfer transistor 22, the reset transistor 23 and the amplification transistor 24, which sets a potential of the FD region 26 to a potential lower than a threshold of the amplification transistor 24, that is, the selection power source potential SELVDD through the reset transistor 23 to allow the unit pixel to be in an unselected state.

Figure 16B:
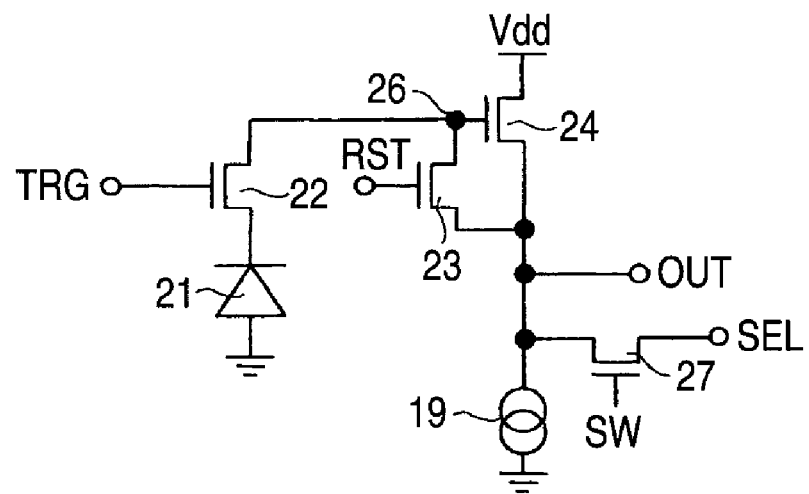

As shown in FIG. 16B, the invention can be also applied to a pixel circuit including, in addition to the photodiode 21, three transistors of the transfer transistor 22, the reset transistor 23 and the amplification transistor 24, further including a switch transistor 27. The pixel circuit has a configuration in which the reset voltage Vrst is selectively supplied from the vertical signal line 111, therefore, the reset transistor 23 is connected between the FD region 26 (the gate electrode of the amplification transistor 24) and the vertical signal line 111, and the reset voltage Vrst is selectively supplied to the vertical signal line 111 through the switch transistor 27 which is turned on by a switch pulse SW.

Furthermore, the invention can be also applied to a pixel configuration which shares the amplification transistor 24 between plural unit pixels from the same reason.

The operation of the CMOS image sensor having unit pixels of the pixel circuit including three transistors shown in FIG. 16A will be explained using a timing chart in FIG. 17.

After a period T4 of the complete transfer and readout in the previous frame, signal charges in the photodiode 21 and the FD region 26 are emptied by an electronic shutter in a period T1. Then, charges (in this case, electrons) generated by exposure and photoelectric conversion are stored in the photodiode 21. Before the intermediate transfer, an intermediate voltage (corresponding to the voltage Vtrg1 in FIG. 4B) is applied to the control electrode of the transfer transistor 22 in a period T2, and signal charges generated in pixels having a large amount of incident light are partially transferred to the FD region 26. At this time, charges transferred to the FD region 26 are not read out and reset.

An intermediate voltage which is the same as the period T2 or different from the period T2 is applied to the control electrode of the transfer transistor 22 in a period T3, and signal charges generated in pixels having a large amount of incident light are partially transferred to the FD region 26 again. At this time, signal charges transferred to the FD region 26 are read out. Then, exposure is carried on, and by turning on transfer transistor 22 completely in a period T4, all signal charges stored in the photodiode 21 are transferred to the FD region 26 and read out from the FD region 26.

In the period T4, in pixels having a small amount of incident light where the transfer does not occur by the application of intermediate voltage, signal charges are not reduced and stored therein, therefore, signals can be read out with high S/N. Whereas in pixels having the large amount of incident light, signal charges are saturated, however, they are read out as signals by the intermediate transfer by the application of the intermediate voltage.

Figure 18:
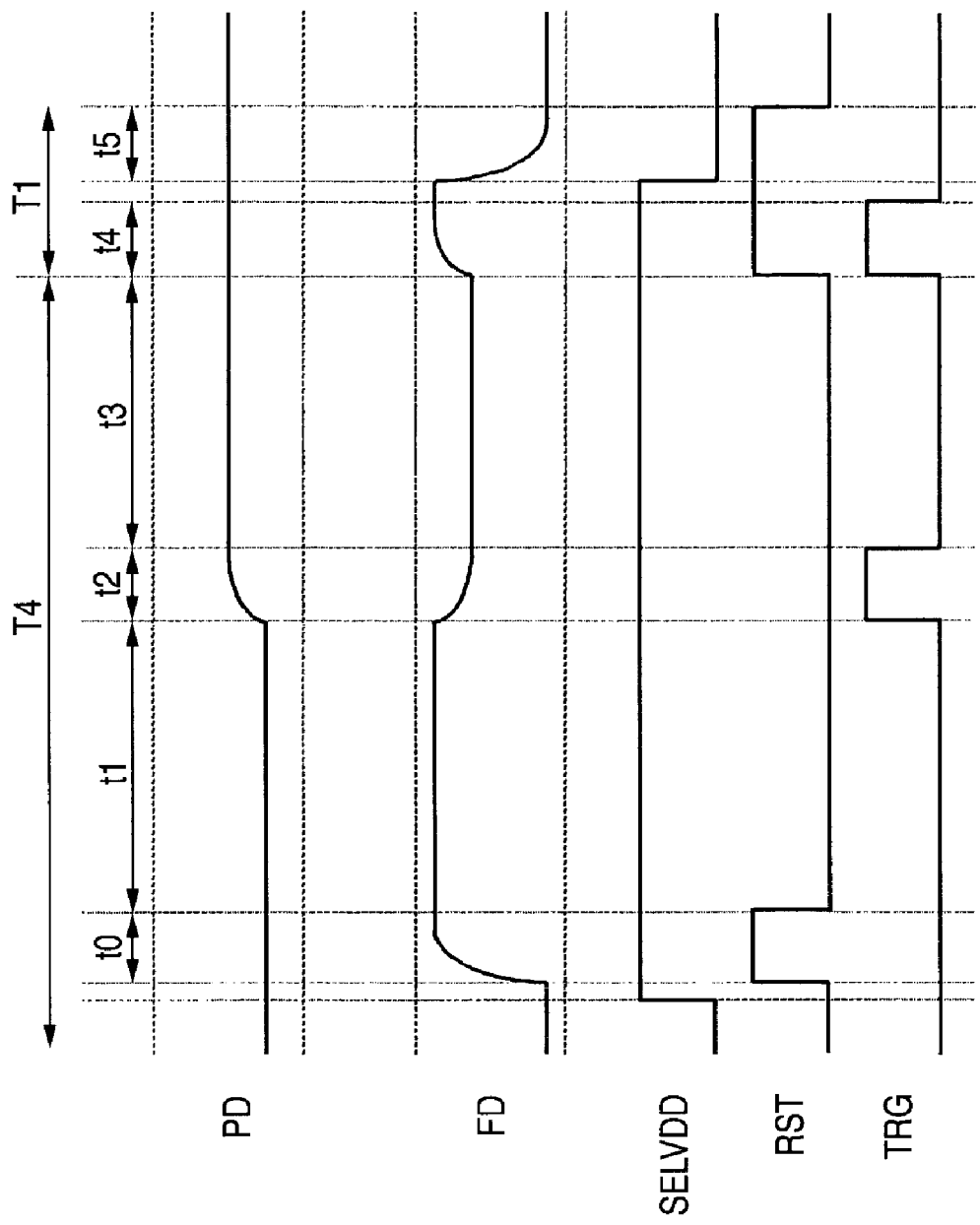
FIG. 18 is a timing chart showing potential relation and detailed timing relation in a complete transfer period and an electronic shutter period.

In FIG. 18, potential relation of the photodiode (PD) 21 and the FD region 26, and detailed timing relation of the selection power source potential SELVDD, the reset pulse RST and the transfer pulse TRG in the complete transfer period T4 and the electronic shutter period T1 are shown.

When the selection power source potential SELVDD is in a state of the "H" level, the FD region is reset by allowing the reset pulse RST to be the "H" level and allowing the reset transistor 23 to be on-state at a period t0, then, a potential of the FD region 26 is read out as a reset level through the amplification transistor 24 at a period t1. At a period t2, signal charges of the photodiode 21 are transferred to the FD region 26 by allowing the transfer pulse TRG to be the "H" level, and a potential of the FD region 26 is read out as a signal level through the amplification transistor 24 at a period t3.

At a period t4, the FD region 26 is reset by allowing the reset pulse RST to be the "H" level and allowing the reset transistor 23 to be on-state, which operates as the electronic shutter. At a period t5, by allowing the selection power source potential SELVDD to be the "L" level and allowing the potential of the FD region 26 to be lower than the threshold of the amplification transistor 24, the amplification transistor 24 is turned off to make the pixel be in the unselected state.

Figure 19:
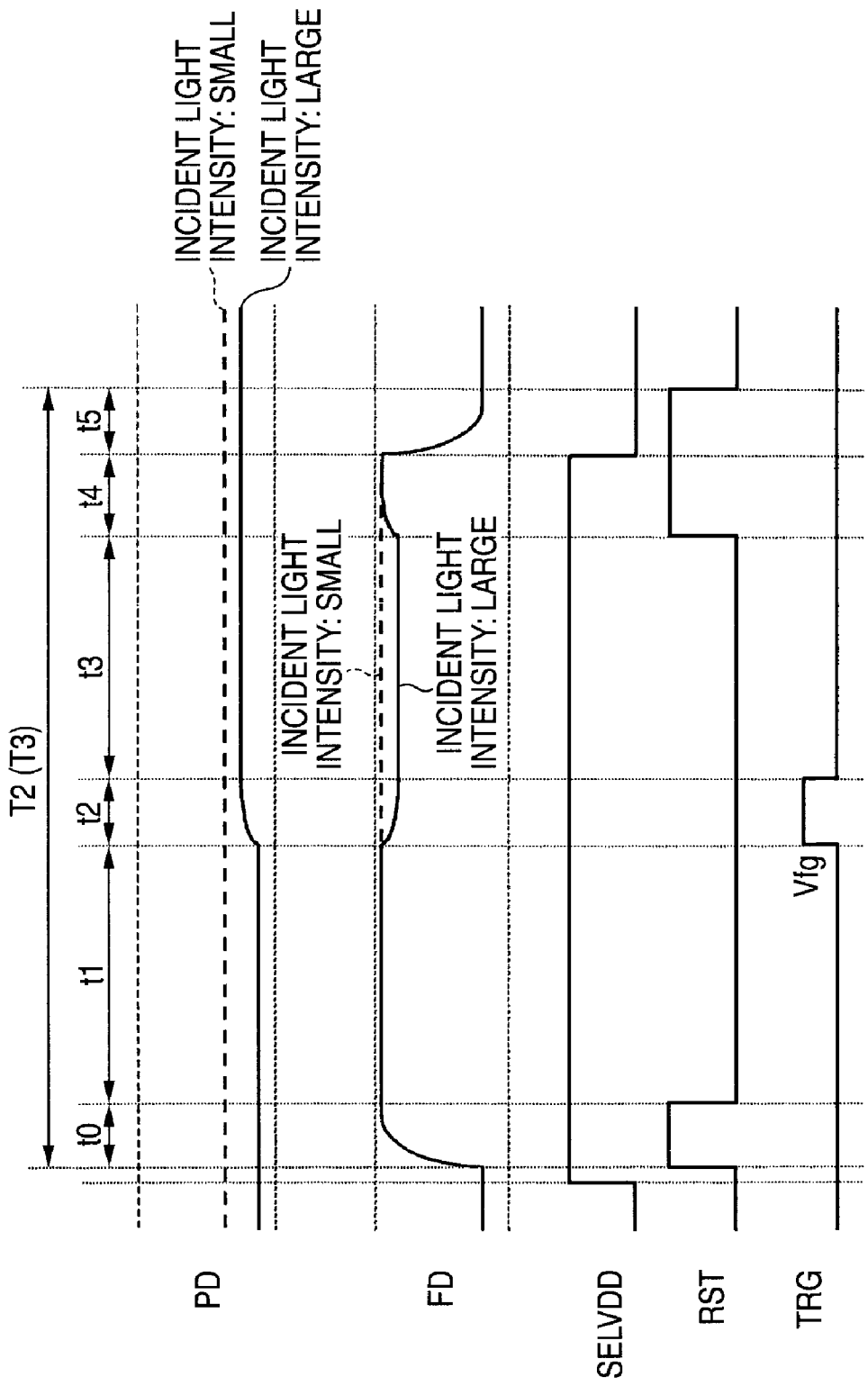
FIG. 19 is a timing chart showing potential relation and detailed timing relation in intermediate transfer periods.

In FIG. 19, potential relation of the photodiode (PD) 21 and the FD region 26, and detailed timing relation of the selection power source potential SELVDD, the reset pulse RST and the transfer pulse TRG in the intermediate transfer periods T2, T3 are shown.

At a period of t0, the FD region 26 is reset by allowing the reset pulse RST to be the "H" level and allowing the reset transistor 23 to be on-state. In the case of the period T3, a potential of the FD region 26 is read out as a reset level through the amplification transistor 24 at a period t1. In the case of the period T2, it is not necessary to perform the readout operation. At a period t2, the intermediate transfer is executed by applying an arbitrary voltage Vfg to the control electrode of the transfer transistor 22. Concerning the arbitrary voltage, Vfg0 is applied in the case of the period T2 and Vfg1 is applied in the case of the period T3.

When the amount of incident light is small, the voltage of the photodiode 21 is high as shown by a dashed line, and transfer to the FD region 26 is not generated. Whereas when the amount of incident light is large, the voltage of the photodiode 21 is low as shown by a solid line, signal charges exceeding a potential under the gate of the transfer transistor 22 are partially transferred to the FD region 26. In the case of the period T3, a potential of the FD region 26 is read out as a signal level through the amplification transistor 24 at a period t3. In the case of the period T2, it is not necessary to perform readout operation.

At a period t4, only the FD region 26 is reset by allowing the reset pulse RST to be the "H" level and allowing the reset transistor 23 to be on-state, and at a period t5, by allowing the selection power source potential SELVDD to be the "L" level and allowing a potential of the FD region 26 to be lower than a threshold of the amplification transistor 24, the amplification transistor 24 is turned off to make the pixel be in the unselected state.

In FIGS. 20A to 20F, potential relations at respective timings are shown. FIG. 20A is a potential diagram at the time of the electronic shutter operation at the period t4 in the period T4 which is the period of the complete transfer and readout. In the electronic shutter operation, charges stored in the photodiode 21 and the FD region 26 are swept away to the side of the selection power source potential SELVDD.

FIG. 20B is a potential diagram after the reset operation at the period t0 in the periods T2, T3, and T4. After the reset operation, storage of charges by exposure is generated according to the degree of the incident light intensity.

FIG. 20C is a potential diagram at the time of the intermediate transfer operation at the period t2 in the period T2, T3. In the intermediate transfer operation, a voltage which allows a potential under the gate of the transfer transistor 22 to be the intermediate state between the on-state and the off-state of the transfer transistor 22 is applied to the control electrode of the transfer transistor 22, as a result, when the incident light intensity is small, the transfer is not generated because stored charges are small, and only when the incident light intensity is large, the transfer to the FD region 26 is generated because the potential of the photodiode 21 is higher than the potential under the gate of the transfer transistor 22.

FIG. 20D is a potential diagram of the period t2 in the period T4, when the transfer transistor 22 is in the on-state to perform the complete transfer in which charges stored in the photodiode 21 are completely read out. FIG. 20E is a potential diagram of the period t3 in the periods T3, T4, when the transfer transistor 22 is in the off-state after the complete transfer to read out a signal. FIG. 20F is a potential diagram of the period t5 in the periods T1, T2 and T3, when the operation in which the pixel is not selected to allow the potential of the FD region 26 to be not more than the threshold of the amplification transistor 24.

In the pixel array area, in the case that a potential shape of the photodiode 21 as a light-receiving region is not uniform in each pixel, the number of electrons held in the photodiode 21 by the application of the intermediate voltage differs. Accordingly, there is a worry that output signals in the high luminance area obtained by readout with the application of the intermediate voltage have fixed pattern noise depending on variations of the potential shape of the photodiodes 21, which leads to deterioration of image quality.

Figure 21A:
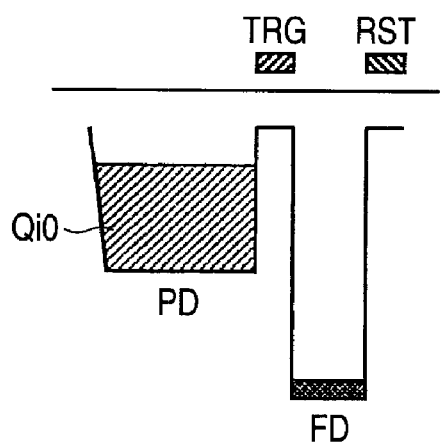
FIGS. 21A to 21D are potential diagrams in intermediate transfers.
Figure 21B:
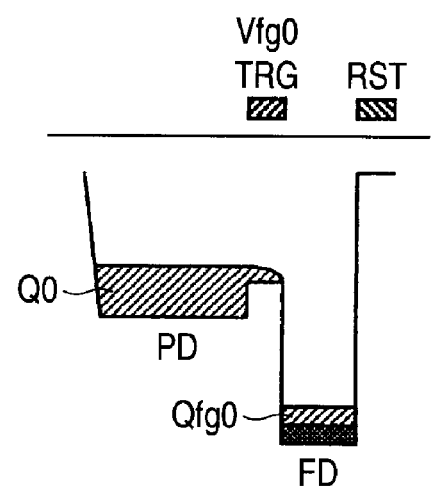

As shown in FIGS. 21A to 21D, let us consider a state of FIG. 21B, for example, in which only a charge Q0 remains in the photodiode 21 when a part of a charge Qi0 is swept away from a state of FIG. 21A in which the charge Qi0 is stored in the photodiode (PD) 21 by applying a voltage Vfg0 to the control electrode of the transfer transistor 22.

Figure 21C:
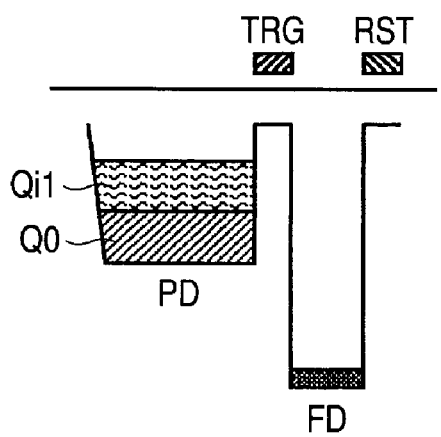
Figure 21D:
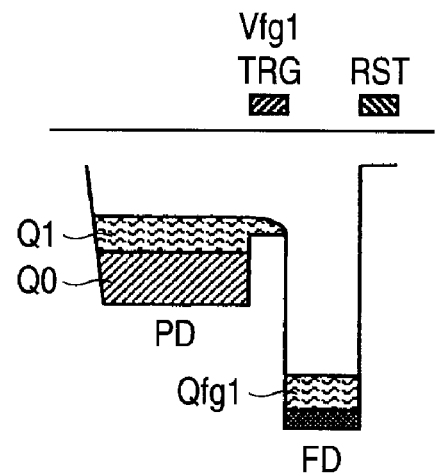

By applying a voltage Vfg1 to a state of FIG. 21C in which a charge Qi1 is further stored in the state of FIG. 21B, a charge Qfg1 can be transferred to the FD 26 and read out as a signal, while a charge Q0+Q1 is remained in the photodiode 21 (a state of FIG. 21D).

Figure 22:
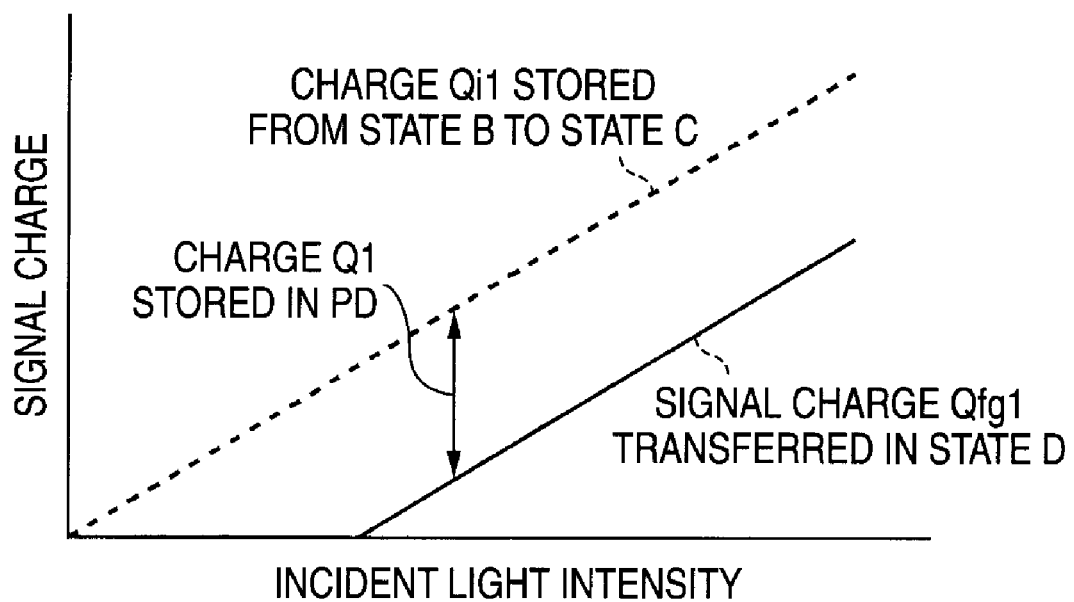
FIG. 22 is a graph showing a correspondence between incident light intensity and signal charges in the intermediate transfers.

As shown in FIG. 22, the charge Qi1 stored from the state of FIG. 21B to the state FIG. 21C is proportion to the incident light intensity. In order to obtain the incident light intensity, that is, the brightness from the signal charge Qfg1 transferred in the state of FIG. 21D, it is necessary to obtain the charge Q1 which is determined by the voltage Vfg0 and the voltage Vfg1. However, when the potential shape of the photodiode 21 differs in each pixel, the charge Q1 has variations by each pixel, therefore, the image obtained from the charge Qfg1 includes fixed pattern noise.

[Applications]

In order to compensate the above fixed pattern noise depending on variations of potential shapes of the photodiodes 21, the following application has been made, which will be explained as follows.

Operation Example 1

Figure 23:
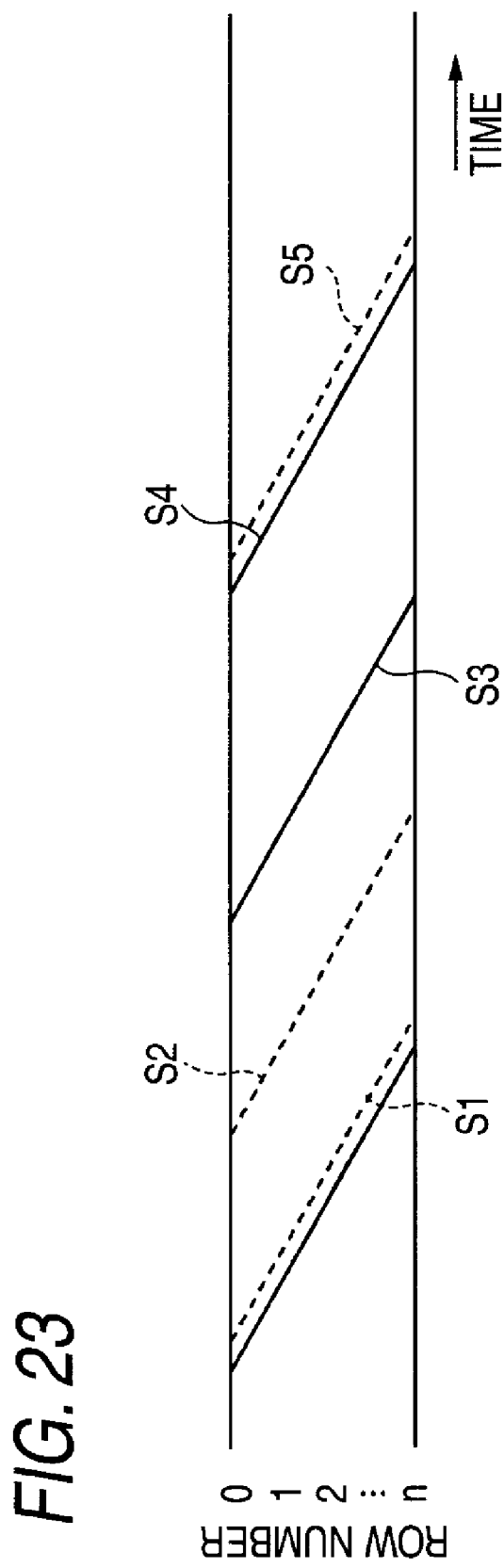
FIG. 23 is a timing chart showing an operation example 1 according to an application of the invention.

FIG. 23 is a timing chart showing an operation example 1 according to the application of the invention. The operation example 1 is the example in the case of the CMOS transistor having unit pixels of the pixel circuit including three transistors shown in FIG. 16A.

First, after readout in the previous frame, the photodiode 21 is filled with charges (electrons or holes) in a period S1. Next, in a period S2, a voltage Vfg1 is applied to the control electrode of the transfer transistor 22 and the intermediate transfer is performed, then, the charges are reset. Next, in a period S3, a voltage Vfg0 is applied to the control electrode of the transfer transistor 22, the intermediate transfer is performed and a signal is read out. Finally, the complete transfer is performed and a signal is read out in a period S4, then, the electronic shutter operation is performed in a period S5.

Figure 24:
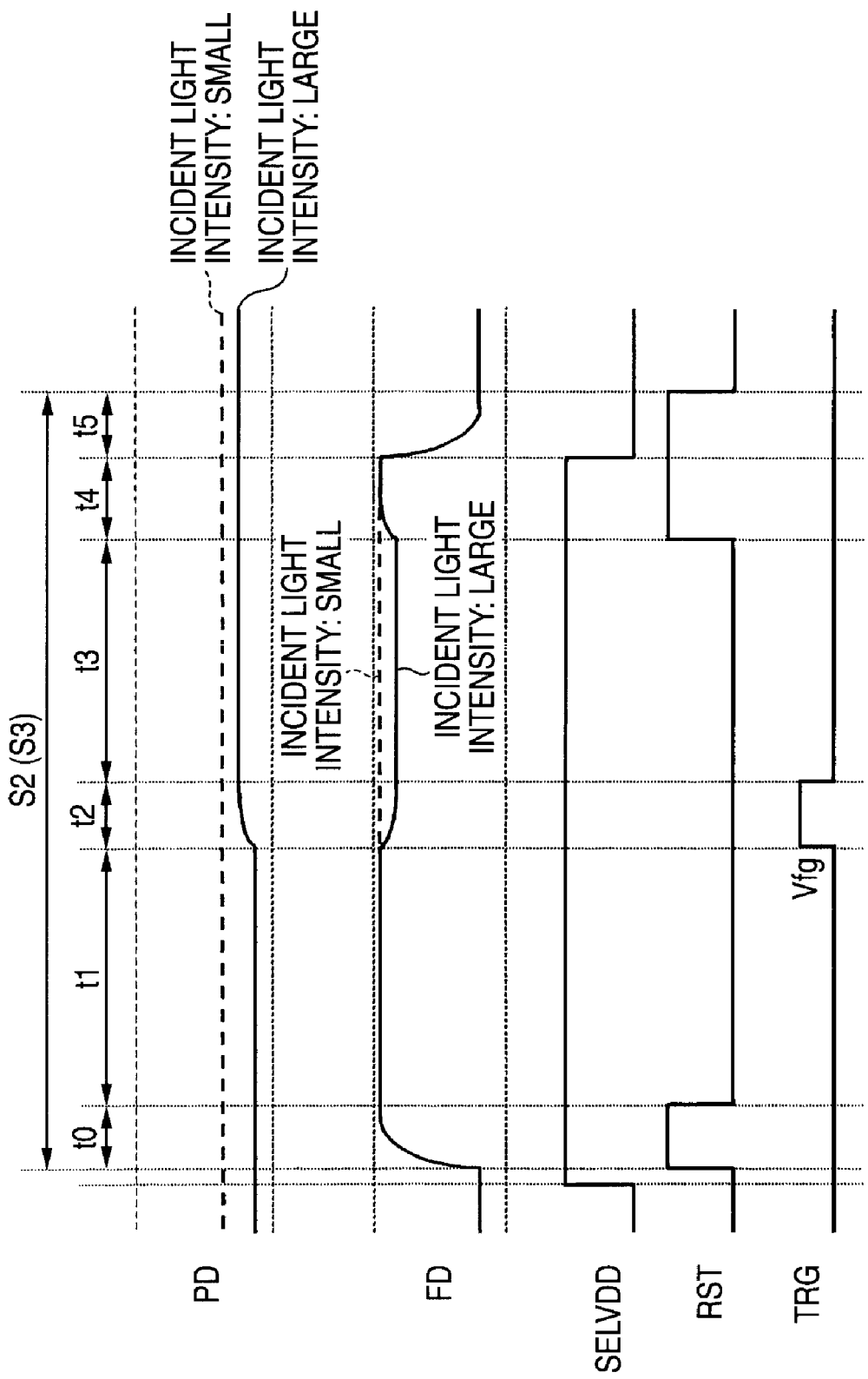
FIG. 24 is a timing chart showing potential relation and detailed timing relation in intermediate transfer periods in the case of the operation example 1.

In FIG. 24, potential relation of the photodiode 21 and the FD region 26, and detailed timing relation of the selection power source potential SELVDD, the reset pulse RST and the transfer pulse TRG in the intermediate transfer periods S2, S3 are shown.

At a period t0, the FD region 26 is reset by allowing the reset pulse RST to be the "H" level and allowing the reset transistor 23 to be on-state. In the case of the period S3, a potential of the FD region 26 is read out as a reset level through the amplification transistor 24 in a period t1. In the case of the period S2, it is not necessary to perform the readout operation. At a period t2, the intermediate transfer is executed by applying an arbitrary voltage Vfg to the control electrode of the transfer transistor 22. Concerning the arbitrary voltage Vfg, Vrg1 is applied in the case of the period S2 and Vfg0 is applied in the case of the period S3. In this case, Vfg0 and Vfrg1 may be the same voltage value.

When the amount of incident light is small, the voltage of the photodiode 21 is high as shown by a dashed line, and the transfer to the FD region is not generated. Whereas when the amount of incident light is large, the voltage of the photodiode 21 is low as shown by a solid line, signal charges exceeding a potential under the gate of the transfer transistor 22 are partially transferred to the FD region 26. In the case of the period S3, a potential of the FD region 26 is read out as a signal level through the amplification transistor 24 at a period t3. In the case of the period T2, it is not necessary to perform the readout operation.

At a period t4, only the FD region 26 is reset by allowing the reset pulse RST to be the "H" level and allowing the reset transistor 23 to be on-state, and at a period t5, by allowing the selection power source potential SELVDD to be the "L" level and allowing a potential of the FDD region 26 to be lower than a threshold of the amplification transistor 24, the amplification transistor 24 is turned off to make the pixel be in the unselected state.

Figure 25:
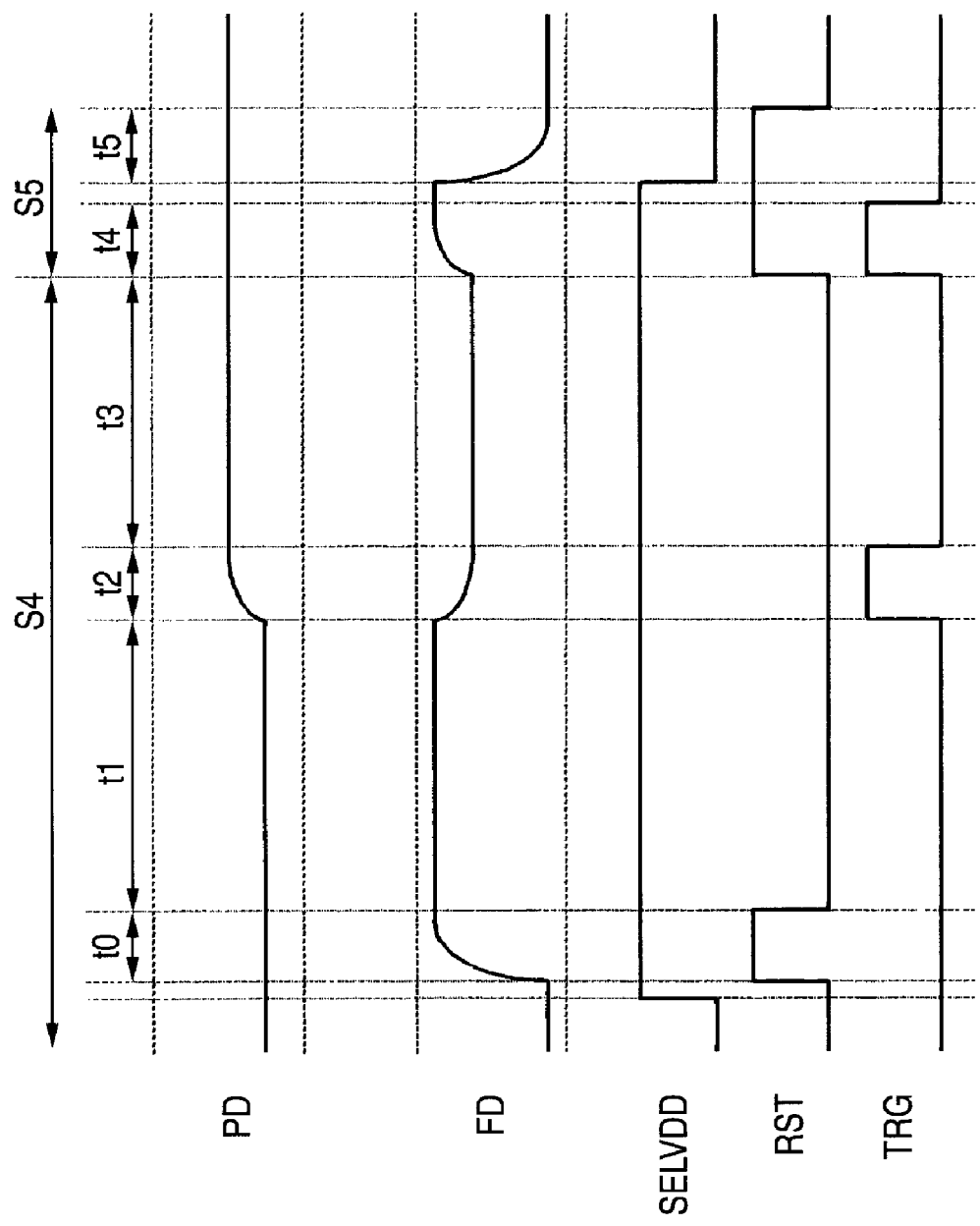
FIG. 25 is a timing chart showing potential relation and detailed timing relation in the complete transfer period and the electronic shutter period in the case of the operation 1.

In FIG. 25, potential relation of the photodiode 21 and the FD region 26 and detailed timing relation of the selection power source potential SELVDD, the reset pulse RST and the transfer pulse TRG in the complete transfer period S4 and the electronic shutter period S5 are shown.

When the selection power source potential SELVDD is in the "H" level, the FD region 26 is reset by allowing the reset pulse RST to be the "H" level and allowing the reset transistor 23 to be on-state at a period t0, then, a potential of the FD region 26 is read out as a reset level through the amplification transistor 24 at a period t1. At a period t2, signal charges of the photodiode 21 are transferred to the FD region 26 by allowing the transfer pulse TRG to be the "H" level, and a potential of the FD region 26 is read out as a signal level through the amplification transistor 24 at a period t3.

At a period t4, the FD region 26 is reset by allowing the reset pulse RST to be the "H" level and allowing the reset transistor 23 is to be on-state, which operates as the electronic shutter. At a period of t5, by allowing the selection power source potential SELVDD to be a "L" level and allowing the potential of the FD region 26 to be lower than the threshold of the amplification transistor 24, the amplification transistor 24 is turned off to make the pixel be in the unselected state.

Operation Example 2

Figure 26:
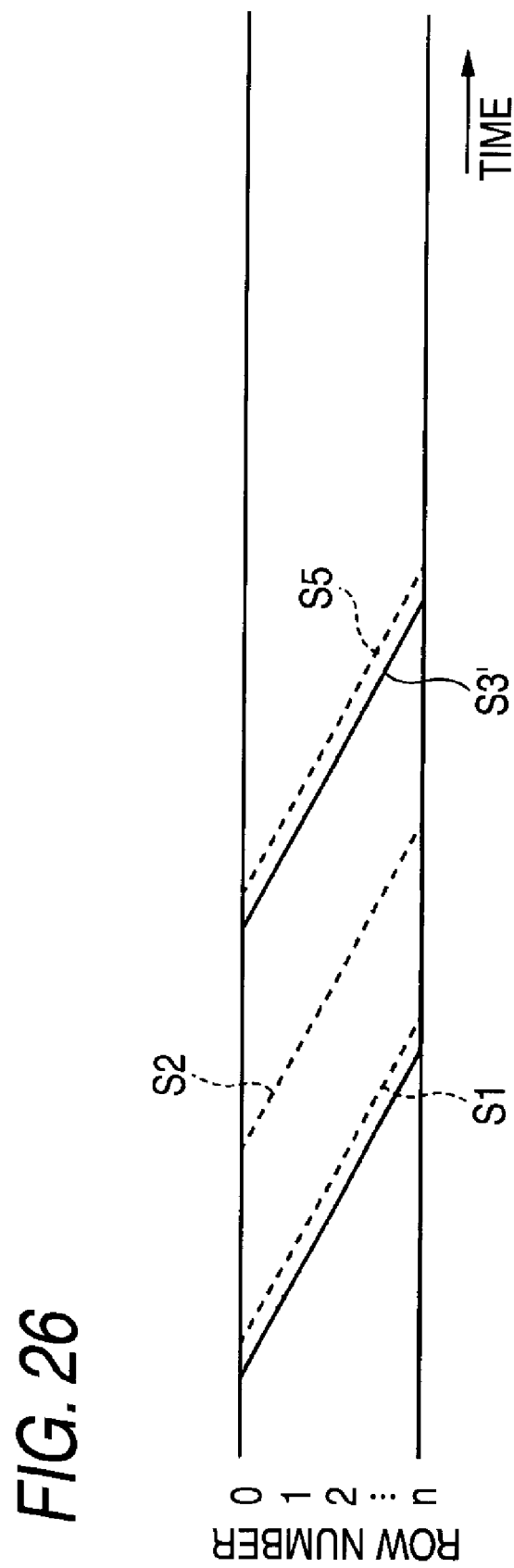
FIG. 26 is a timing chart showing an operation example 2 according to the application of the invention.

FIG. 26 is a timing chart showing an operation example 2 according to the application of the invention. The operation example 2 is also the example in the case of the CMOS transistor having unit pixels of the pixel circuit including three transistors.

The operation example 2 is the example in which readout of the last complete transfer in the operation example 1 is omitted. By omitting the readout of the last complete transfer, time necessary for a series of processes for obtaining a compensation signal which compensates fixed pattern noise depending on variations of potential shapes of the photodiodes 21 can be shorten as compared to the case of the operation example 1. By setting one or all of plural voltages to a voltage other than the voltage which makes the transfer transistor 22 be off-state completely, readout of the complete transfer can be omitted.

Figure 27:
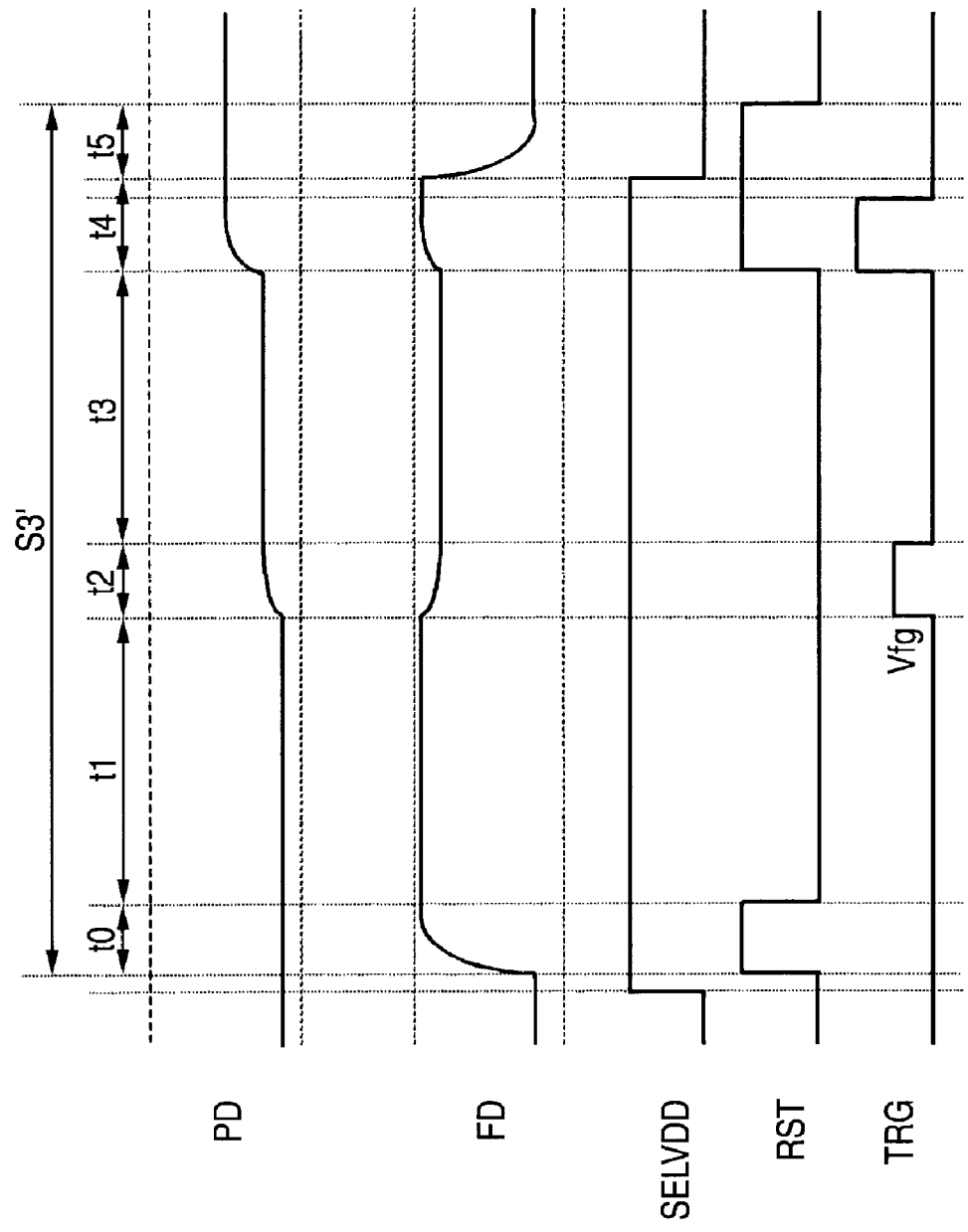
FIG. 27 is a timing chart showing potential relation and detailed timing relation in the intermediate transfer period and the electronic shutter period in the case of the operation 2.

In FIG. 27, potential relation the photodiode 21 and the FD region 26, and detailed timing relation of the selection power source potential SELVDD, the reset pulse RST and the transfer pulse TRG in an intermediate transfer period S3', and an electronic shutter period S5 in the case of the operation example 2 are shown. In the operation example 2, shatter operation and operation for the unselected state in the electric shutter period S5 are executed after the intermediate readout as shown in the timing chart in FIG. 27.

Operation Example 3

Figure 28:
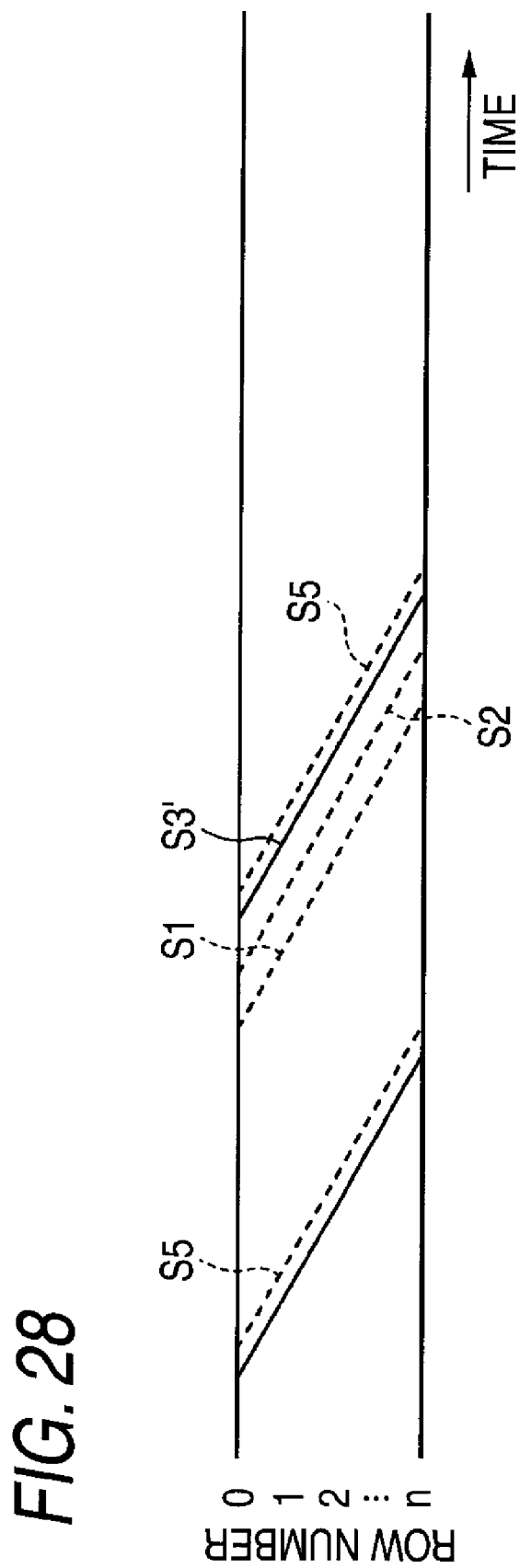
FIG. 28 is a timing chart showing an operation example 3 according to the application of the invention.

FIG. 28 is a timing chart showing an operation example 3 according to the application of the invention. The operation example 2 is also the example in the case of the CMOS transistor having unit pixels of the pixel circuit including three transistors.

The operation example 3 is the example in which respective intervals between a forced saturation operation in a period S1, an intermediate transfer operation in a period S2 and an intermediate transfer and a readout operation in a period S3 are allowed to be shortened. By shortening respective intervals between the periods S1, S2 and S3, effect by incident light or dark current can be reduced as compared to the case of the operation example 1.

Operation Example 4

Figure 29:
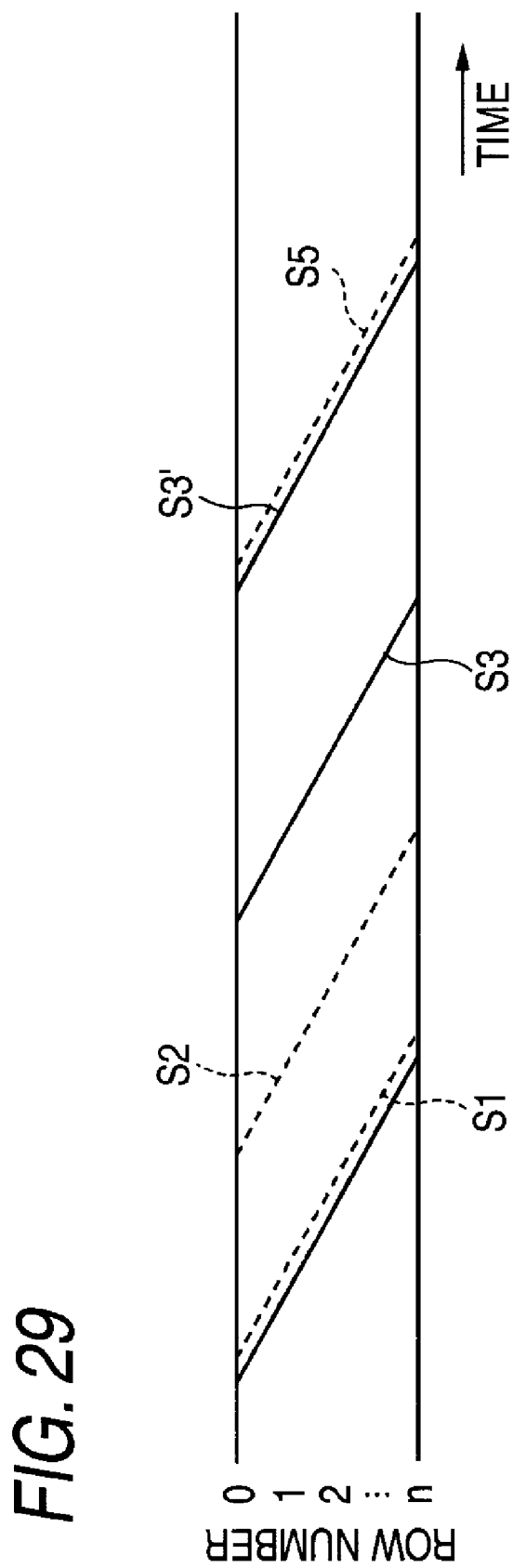
FIG. 29 is a timing chart showing an operation example 4 according to the application of the invention.

FIG. 29 is a timing chart showing an operation example 4 according to the application of the invention. The operation example 4 is also the example in the case of the CMOS image sensor having pixels of the pixel circuit having three transistors.

The operation example 4 is the example in which readout of the signal by the intermediate transfer is performed plural times sequentially, and by applying plural voltages from the low order to the control electrode of the transfer transistor 22, compensation signals of the compensation amount corresponding to respective voltages can be obtained.

Timing relation of the forced saturation operation of the photodiode 21 in the operation examples 1 to 4 explained as the above is shown in FIG. 30. In FIG. 30, a period S1 shows the timing relation of the forced saturation operation.

The transfer transistor 22 and the reset transistor 23 are turned on by allowing a reset voltage (in this case, selection power source potential SELVDD) as an initial voltage of the FD region 26 to be equivalent to a voltage of the photodiode 21 at the time of saturation and allowing the transfer pulse TRG and the reset pulse TRS to be the "H" level. Accordingly, the photodiode 21 is in a state in which charges are held in the same way as the saturation state. That is, the transfer transistor 22 is turned on by allowing the potential of the FD region (transfer capacity) 26 to be equivalent to the potential of the photodiode 21 in the saturated state, as a result, the photodiode 21 is filled with electrons or holes.

As described above, after the photodiode 21 is filled with charges (electrons or holes), plural intermediate voltages (second control voltages) are sequentially applied to the control electrode of the transfer transistor 22 to execute partial transfers, that is to say, while a part of charges stored in the photodiode 21 is held, the remained stored charges are partially transferred to the FD region 26, as a result, signal charges transferred by one of or all intermediate voltages can be acquired as a voltage signal. The voltage signal includes variation components in the potential shapes of the photodiodes 21, therefore, it becomes the compensation signal for compensating fixed pattern noise depending on variations of potential shapes.

As apparent from the explanation of the above operation example 4, the order of applying plural intermediate voltages (the second control voltage) is the reverse of the order of applying plural control voltages (the second control voltage) at the time of acquiring the image. That is, in the case of acquiring the image, when plural control voltages are applied in the order of high voltage, the compensation signal for compensating fixed pattern noise depending on variations in potential shapes of the photodiodes 21 can be acquired by sequentially applying plural intermediate voltages in the order of low voltage.

[Principle of Obtaining a Compensation Signal]

Next, the principle of obtaining a compensation signal for compensating fixed pattern noise depending on variations of potential shapes of the photodiodes 21.

Figure 31A:
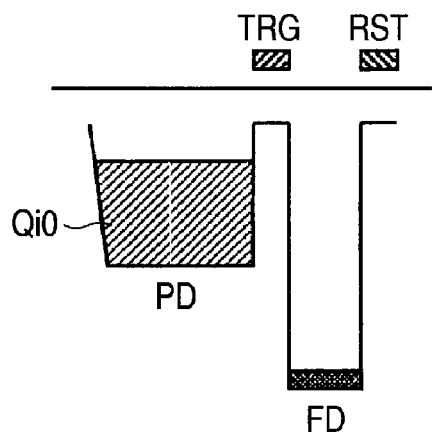
FIGS. 31A to 31D are potential diagrams in a readout with intermediate transfers.
Figure 31B:
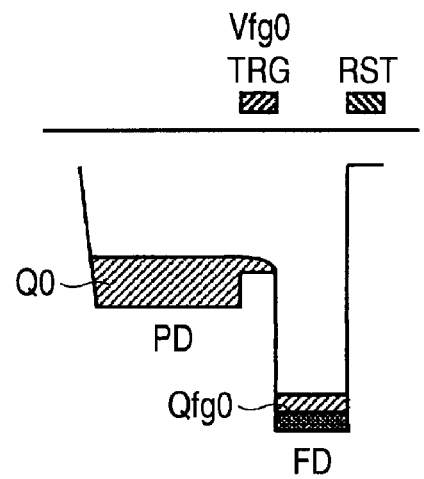
Figure 31C:
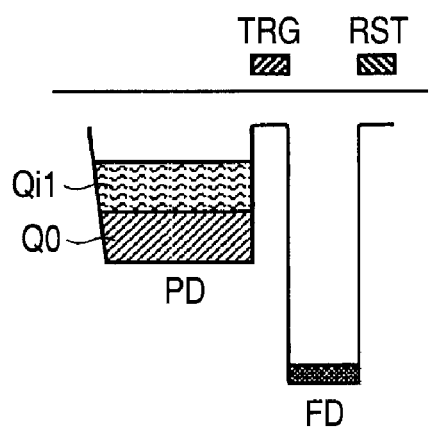
Figure 31D:
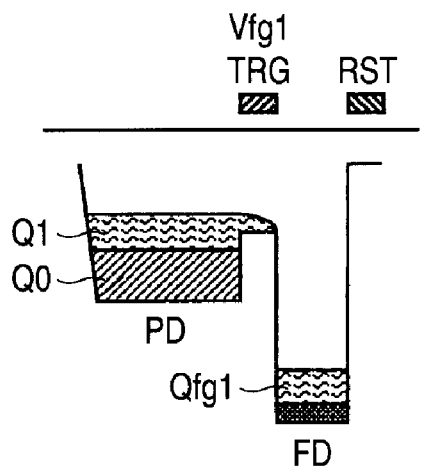

FIGS. 31A to 31D are potential diagrams in the readout with the intermediate transfer. In FIGS. 31A to 31D, FIG. 31A shows a potential of a period t1 of an intermediate transfer period S2, Fig. B shows a potential of a period t2 of the intermediate transfer period S2, FIG. 31C shows a potential of a period t1 of an intermediate transfer period S3 and FIG. 31D shows a potential of a period t2 of the intermediate transfer period S3, respectively.

A charge Qi0 stored in the photodiode 21 in the S2-t1 period (FIG. 31A) is partially transferred to the FD region 26 by applying a voltage Vfg0 to the transfer transistor 22 in the S2-t2 period (FIG. 31B), and a charge Q0 remains in the photodiode 21. A Qfg0 transferred to the FD region 26 is reset.

The charge Q0 is controlled by the applied voltage Vfg0, however, the charge Q0 includes a variation of the number of charges $\Delta Q vth$ by characteristic variations (threshold variations) of the transfer transistor 22 and a variation of the number of charges $\Delta Q pot0$ by variations of potential shapes as fixed pattern noise in each pixel. The charge Q0 is represented by the following formula when an average value of the Q1 is Qhad0.

$$Q0 = Qhad0 + \Delta Qvth + \Delta Qpot0 \tag{1}$$

In the readout of the period S3, the charge Qi1 generated by photoelectric conversion during the exposure period from the period S2 is added, and a charge (Qi1+Q0) is held in the photodiode 21. In this state, a part of the charge Qi1 is transferred to the FD region 26 by applying an intermediate voltage Vfg1 to the control electrode of the transfer transistor 22. At this time, when a charge of the remains of the charge Qi1 is Q1, a charge (Q0+Q1) is held in the photodiode 21.

The charge (Q0+Q1) also includes the variation of the number of electrons $\Delta Q vth$ caused by threshold variations of the transfer transistors 22, and the charge Q1 includes the variation of the number of electrons $\Delta Q pot1$ caused by variations the potential shapes. When an average value of the charge Q1 is Qhad1, the charge (Q0+Q1) is represented by the following formula.

$$Q0+Q1 = (Qhad0+\Delta Qpot0)+(Qhad1+\Delta Qpot1)+\Delta Qvth \tag{2}$$

In this case, the charge Q1 is represented by $$Q1 = Qhad1 + \Delta Qpot1 \tag{3}$$

A signal to be read out, namely, the charge Qfg1 transferred to the FD region is represented by $$Qfg1 = Qi1 - Q1 \qquad (4)$$
$$= Qi1 - (Qhad1 + \Delta Qpot1)$$

As can be seen from the formula (4), it is necessary to cancel the variation of the number of charges ΔQpot1 caused by variations of potential shapes as the character variation of the pixel.

Figure 32A:
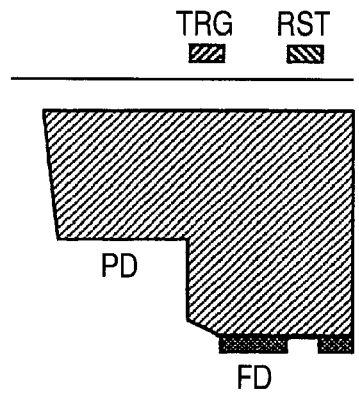
FIGS. 32A to 32E are potential diagrams in the forced saturation operation and intermediate transfers.
Figure 32B:
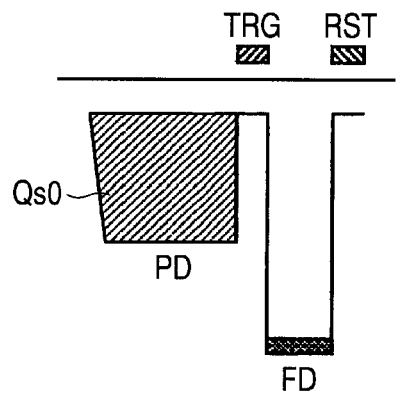
Figure 32C:
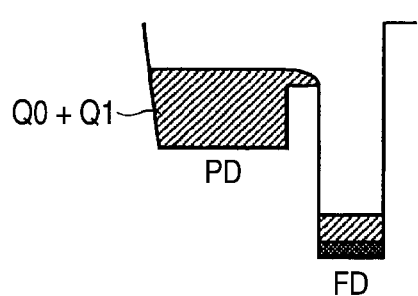
Figure 32D:
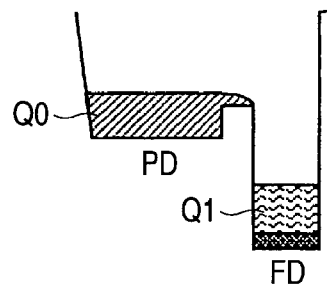
Figure 32E:
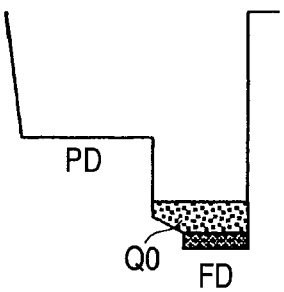

FIGS. 32A to 32E are potential diagrams in the forced saturation operation and the intermediate transfer. In FIGS. 32A to 32E, FIG. 32A shows a potential of a period t4 in the forced saturation period S1, FIG. 32B shows a potential of a period t5 of the forced saturation period S1, FIG. 32C shows a potential of the period t2 of the intermediate transfer period S2 and FIG. 32D shows a potential in the period t2 of the intermediate transfer period S3, and FIG. 32E shows a potential of period t2 of an intermediate transfer period S4, respectively.

In the S1-t4 period (FIG. 32A), the photodiode 21 is forcibly made to be saturated state, and in the S1-t5 period (FIG. 32B), the number of saturated electrons Qs0 is held in the photodiode 21. In the S2-t2 period (FIG. 32c), the charge (Q0+Q1) represented by the formula (2) can be held in the photodiode 21 by applying the voltage Vfg1 to the control electrode of the transfer transistor 22. The charge transferred to the FD region 26 is reset.

In the S3-t3 period, when the voltage Vfg0 is applied to the control electrode of the transfer transistor 22, the charge Q0 represented by the formula (1) is held in the photodiode 21, and the remaining charge Q1 is transferred to the FD region 26, which is read out as a signal. The charge Q1 is represented by the formula (3), therefore, an offset value by a term ΔQpot1 to be fixed pattern noise as the character variation of the pixel, which deteriorates image quality, can be obtained.

In the case that the complete transfer is sequentially executed in the S4-t2 period, the charge Q0 of the formula (1) is read out as a signal, an offset value of (ΔQpot0+ΔQvth) can be also obtained. By reading out the signal, it is possible to eliminate fixed pattern noise by threshold variations of the transfer transistors 22.

(Compensation of Fixed Pattern Noise)

From the CMOS image sensor 10 shown in FIG. 1, the charge Qfg1 including the charge (amount) Qi1 depending on the incident light amount is read out as a signal. The average value Qhad1 of the remained charge Q1 by the intermediate transfer is a value which can be controlled by the intermediate voltage Vfg1, however, the variations of the number of charges ΔQpot1 caused by variations of potential shapes deteriorate image quality as fixed pattern noise of the pixel.

Consequently, the charge Q1 in the formula (3) is obtained by the method of acquiring a compensation signal (compensation value). When calculation processing of summing the charge Q1 and the charge Qfg1 performed, a calculation result can be obtained, which is the following formula (5).

$$Qfg1 + Q1 = Qi1 - (Qhad1 + \Delta Qpot1) + \qquad (5)$$
$$Qhad1 + \Delta Qpot1$$
$$= Qi1$$

The variation of the number of charges ΔQpot1 caused by variations of potential shapes is cancelled, and only the charge Qi1 depending on the incident light amount can be obtained.

That is to say, by performing addition processing of the formula (5), variations of the number of charges ΔQpot1 caused by variations of potential shapes of the photodiodes 21 is cancelled by using the compensation signal obtained by the above acquisition method, and the charge Qi1 indicating the incident light amount can be obtained, as a result, image quality of imaged pictures can be improved by reducing fixed pattern noise.

Figure 33:
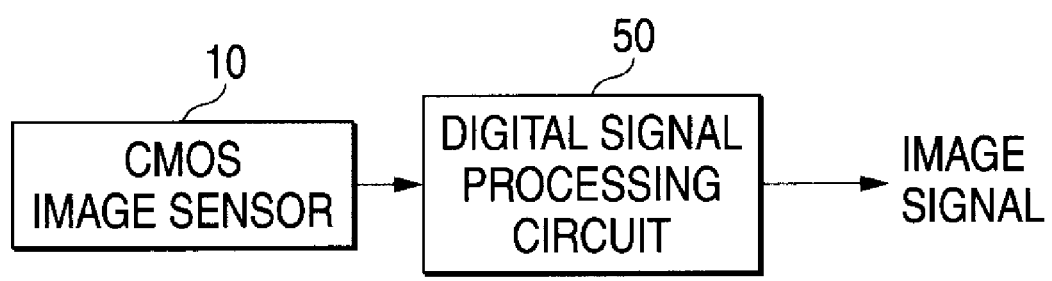
FIG. 33 is a block diagram showing a system configuration including a compensation function of fixed pattern noise of pixels.

The addition processing of the formula (5) is executed in a digital processing circuit 50 provided at a subsequent stage of the CMOS image sensor 10 as shown in FIG. 33. In this case, an imaging signal is outputted in a digital signal from the CMOS image sensor 10. The digital signal processing circuit 50 include, for example, a frame memory, compensation signals acquired with respect to each pixel by the above acquisition method are stored in the frame memory by each pixel, and the addition processing of the formula (5) is executed by each pixel at the time of normal imaging by using compensation signals stored in the frame memory to compensate fixed pattern noise depending on variations of potential shapes of the light-receiving regions (photodiodes).

Concerning acquisition of compensation signals, it can be considered that a method in which the acquisition processing is performed once in a manufacturing stage and compensation signals of respective pixels are stored as fixed values in a nonvolatile memory, a method in which the acquisition processing is executed once when applying power to a system, and compensation signals of respective pixels are stored as fixed values in the frame memory, a method in which the acquisition processing is executed repeatedly in every fixed period, for example, in the period of several frames, or several dozen frames, and compensation signals stored in the frame memory are updated in each period, a method in which the acquisition processing is repeatedly executed by each frame, and compensation signals stored in the frame memory are updated, and some other methods. As the acquisition of compensation signals increases, there is an advantage that fixed pattern noise caused by variations with time can be surely compensated.

As described above, after the photodiode 21 is filled with charges, plural intermediate voltages (second control voltages) are sequentially applied to the control electrode of the transfer transistor 22 and partial transfers are executed, signal charges obtained by one of or all transfers by the intermediate voltages are read out, and the signal charges are used, as compensation terms, for eliminating fixed pattern noise of images obtained by sequentially applying plural control voltages to the control electrode of the transfer transistor 22 at the time of the normal imaging, as a result, the following operation and effect can be obtained. That is, in output signals at high luminance when the dynamic range is widened, fixed pattern noise of images occurring by one of, or both of variations of potential shapes of the photodiodes 21 and threshold variations of the transfer transistors 22 can be eliminated, therefore, it is possible to allow imaging pictures to be high in quality.

In the embodiment, a case in which compensation signals obtained by the above acquisition method are applied to imaging signals obtained by sequentially applying plural control voltages to the control electrode of the transfer transistor 22 was explained as the example, it is not limited to the application.

In the embodiment and the application explained above, the case in which the invention is applied to the CMOS image sensor was explained as examples, however, the invention is not limited to application to the CMOS image sensor and relates to the whole amplification-type solid-state imaging device, further, relates to a readout part of signal charges from the photoelectric element, therefore, the invention can be also applied to a charge-transfer type solid-state imaging device which is represented by a CCD image sensor.

Figure 34A:
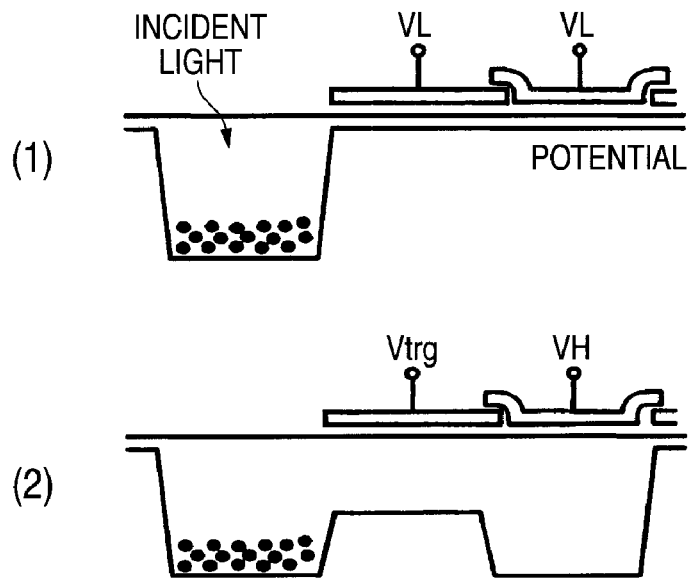
FIGS. 34A and 34B are potential diagrams showing examples when applied to a CCD image sensor.
Figure 34B:
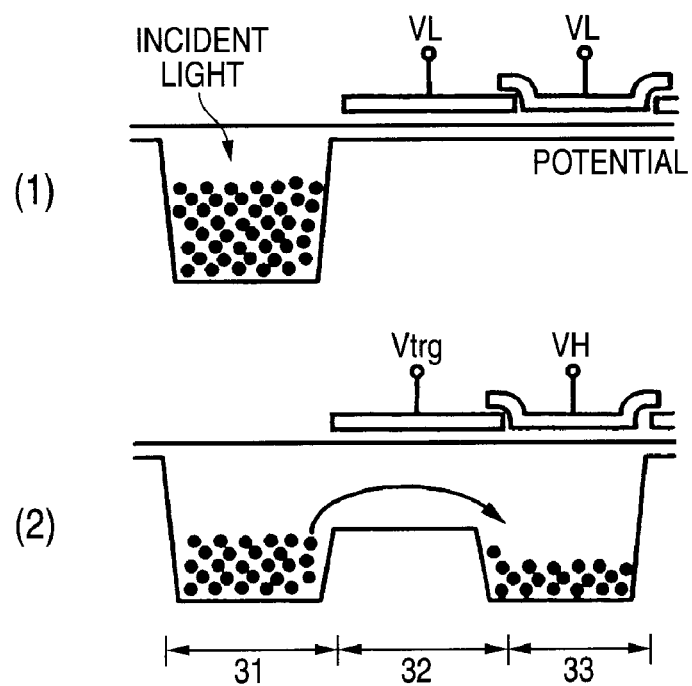

An example in which the invention is applied to the CCD image sensor is shown in FIGS. 34A and 34B. In the CCD image sensor, photoelectric conversion is performed in a photodiode (light-receiving region) 31, and signal charges stored therein are transferred to a vertical CCD (vertical transfer region) 33 by a transfer gate (readout gate) 32, which are read out according to the vertical transfer by the vertical CCD 33. In the CCD image sensor, the amount of electrons to be transferred to the vertical CCD 33 can be controlled by applying the above-described control voltage Vtrg to the transfer gate 32.

When incident light is weak (FIG. 34A), since the amount of electrons which has been photoelectrically converted is small, it is difficult for stored electrons in the photodiode 31 to exceed a potential under the transfer gate 32 even when the control voltage Vtrg is applied to the transfer gate 32, and the stored electrons are held in the photodiode 31. Whereas when incident light is strong (FIG. 34B), since the amount of electrons which has been photoelectrically converted is large, the stored electrons in the photodiode 31 exceed the potential under the transfer gate 32 and are partially transferred to the vertical CCD 33 by applying the control voltage Vtrg to the transfer gate 32.

Then, by applying the control voltage Vtrg at the same control timing as in the case of the CMOS image sensor, signal acquisition can be executed according to the intermediate transfer at high luminance while holding signal charges at low luminance, in the same way as the CMOS image sensor.

Modification Example

In the embodiment explained as the above, plural control voltages are sequentially supplied to the control electrodes of the transfer transistors 22 with respect to all pixels 20 in the pixel array area 11, and at that time, signal charges transferred by the transfer transistors 22 are read out twice and more, however, the invention is not limited to the application in which the above driving is performed to all pixels 20. Hereinafter, other applications will be explained as modification examples 1, 2 and 3.

Modification Example 1

Figure 35:
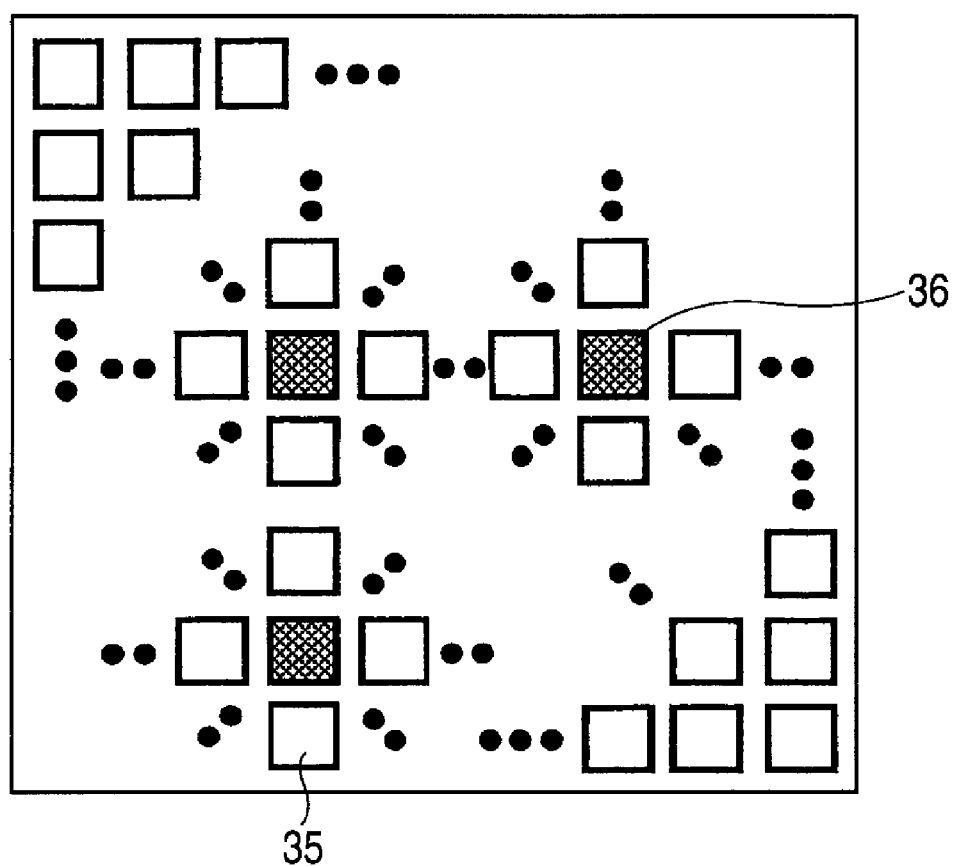
FIG. 35 is a schematic diagram of a modification example 1 of the invention.

FIG. 35 is a schematic diagram of a modification example 1 of the invention. In the modification example 1, in a solid-state imaging device in which color transmission filters such as primary color filters of R (red), G (green) and B (blue) or complementary color filters of Cy (cyan), Mg (magenta) and Ye (yellow) are arranged on pixels to acquire color images, pixels 36 which do not have color transmission filters and have higher sensibility than pixels 35 having the color transmission filters are provided sectionally, and plural control voltages are sequentially supplied to the control electrodes of the transfer transistors with respect to the pixels 36 of high sensibility, and at this time, signal charges transferred by the transfer transistors are read out twice and more.

Figure 36:
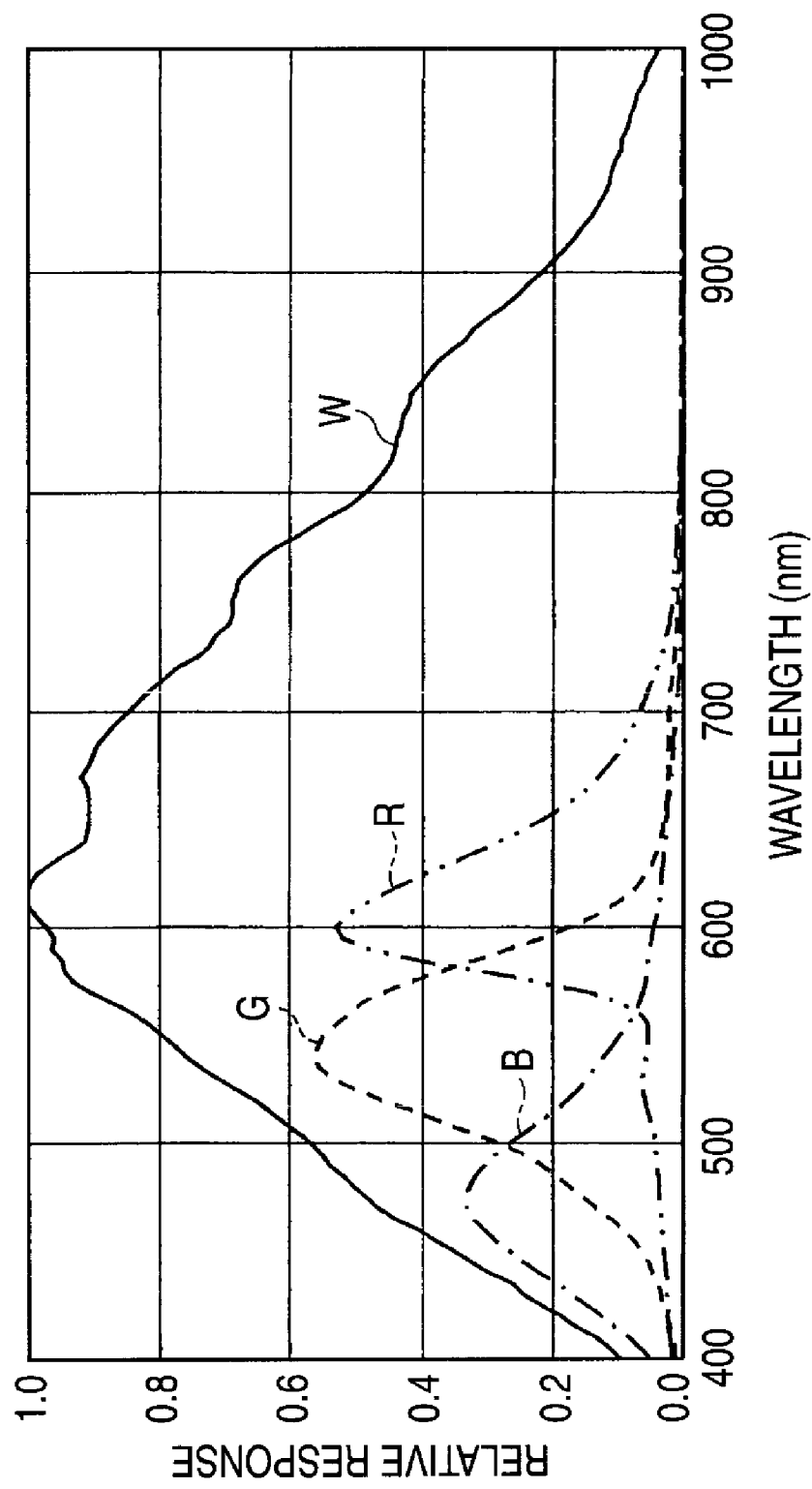
FIG. 36 is a graph showing an example of an incandescent lamp spectrum.

FIG. 36 is a graph showing an example of an incandescent lamp spectrum. In general, the incandescent lamp includes a large amount of infrared light and a wide wavelength band as shown by a characteristic "W" in FIG. 36, and the intensity thereof is attenuated as shown by characteristics "B", "G", and "R" after transmitting through the color transmission filters of blue, green and red. The high-sensitive pixels 36 which do no have the color transmission filters receive light of the wide wavelength band, therefore, they have several times higher sensibility than the pixels 35, which includes the color transmission filters.

In the solid-state imaging device in which both the low-sensitive pixel 35 including the color transmission filters and the high-sensitive pixels 36 not including the color transmission filters exist, plural control voltages are sequentially supplied to the control electrodes of the transfer transistors with respect to the high-sensitive pixels 36, and at that time, signal charges transferred by the transfer transistors are read out twice and more, as a result, signals can be acquired while maintaining high S/N in the pixels 35 including the color transmission filters, even when exceeding the normal level in the high-sensitive pixels 36.

The signals acquired in the high-sensitive pixels 36 not including the color transmission filters have sharp edges. Therefore, as an example, signals acquired in the high-sensitive pixels 36 not including the color transmission filters are reflected on signals acquired in the low-sensitive pixels 35 including the color transmission filters, as a result, imaging pictures having sharp edges can be obtained.

Modification Example 2

Figure 37:
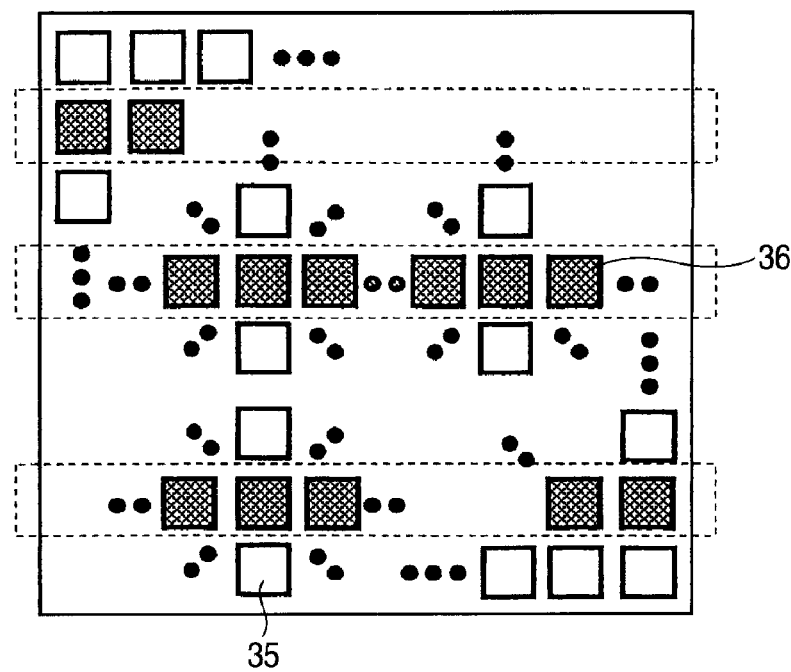
FIG. 37 is a schematic diagram of a modification example 2 of the invention.

FIG. 37 is a schematic diagram of a modification example 2 of the invention. The modification example 2 is similar to the modification example 1 in a point that both low-sensitive pixels 35 including the color transmission filters and high-sensitive pixels 36 not including color transmission filters exist, however, they are different in a point that the high-sensitive pixels 36 are sectionally provided in the modification example 1, whereas the high-sensitive pixels 36 are provided in units of rows.

In the modification example 1 in which the high-sensitive pixels 36 are scattered, it is difficult to distinguish the low-sensitive pixels 35 from the high-sensitive pixels 36 by selection scanning being performed in units of rows. Whereas, in the modification example 2 in which the high-sensitive pixels 36 exist in units of rows, it is possible to distinguish the low-sensitive pixels 35 from the high-sensitive pixels 36 to perform selective drive in units of rows. In other words, a row of the high-sensitive pixels 36 can be selectively driven separately.

In order to selectively drive the row of the high-sensitive pixels 36 separately, in the vertical scanning circuit 12 in FIG. 1, a scanning system for selectively scanning rows of the low-sensitive pixels 35 including the color transmission filters, and a scanning system for selectively scanning rows of the high-sensitive pixels 36 not including the color transmission filters are provided and scanning is performed separately by each scanning system.

Accordingly, in the modification example 2, rows of the high-sensitive pixels 36 can be selectively driven separately, therefore, it is possible to perform the driving with respect to the high-sensitive pixels 36, in which plural control voltages are sequentially supplied to the control electrodes of the transfer transistors and at that time, signal charges transferred by the transfer transistors are read out twice and more with fast operation speed. At the same time, normal readout operation can be performed to the low-sensitive pixels 35 at low speed, as a result, the example has an advantage that power consumption can be reduced as the low-sensitive pixels 35 can be driven at low speed, as compared to the modification example 1 in which high-speed operation is inevitable also to the low-sensitive pixels 35 in the same way as the high-sensitive pixels 36.

Modification Example 3

Figure 38:
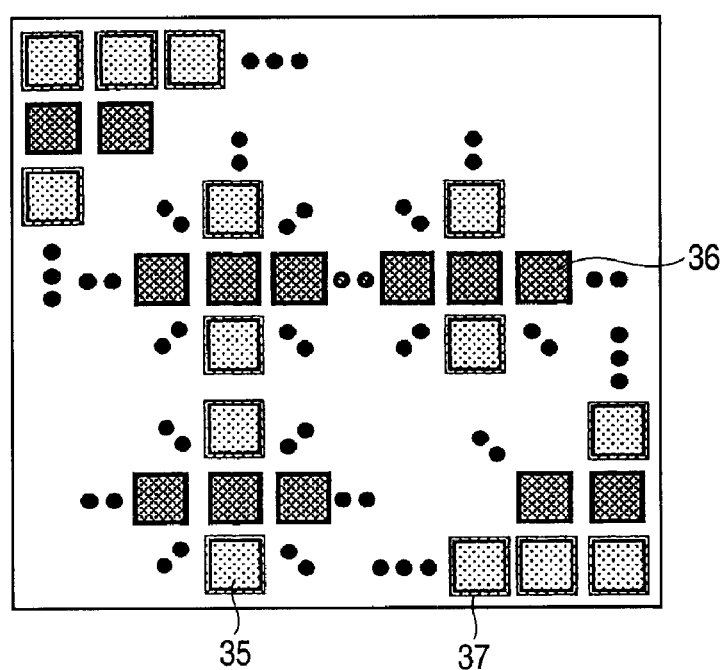
FIG. 38 is a schematic diagram of a modification example 3 of the invention.

FIG. 38 is a schematic diagram of a modification example 3 of the invention. In the modification example 3, for example, in the pixel arrangement of the modification example 2, infrared light cut filters 37 are arranged as pixel units, on pixels other than the high-sensitive pixels 36 not including the color transmission filters, namely, on the low-sensitive pixels 35 including the color transmission filters.

In order to arrange the infrared light cut filters 37 as pixel units on the low-sensitive pixels 35, for example, dielectric multilayer films may be stacked on the low-sensitive pixels 35. In addition, the infrared cut filters which are generally arranged in a previous stage of the imaging device are removed from the high-sensitive pixels 36, or filters which cut off infrared light having more longer wavelength are used, as a result, the infrared light cut filters 37 can be arranged on the low-sensitive pixels 35.

Accordingly, by arranging the infrared light cut filter 37 on the low-sensitive pixels 35, the high-sensitive pixels 36 can also receive infrared light, which allows the high-sensitive pixels 36 to be more sensitive, therefore, signals of more than the normal saturation level can be acquired in the high-sensitive pixels 36 without deteriorating signals of the low-sensitive pixels 35 including the normal color transmission filters.

Applicable Example

It is preferable that the CMOS image sensors according to the above embodiments (including modification examples 1 to 3) are used as imaging devices (image input devices) in imaging apparatuses such as a digital still camera and a video camera.

The imaging apparatus indicates a camera module (for example, used mounted on electronic equipment such as a cellular phone) including a solid-state imaging device as an imaging device, an optical system which focuses image light of a subject on an imaging surface (light-receiving surface) of the solid-state imaging device and a signal processing circuit of the solid-state imaging device, and a camera system on which the camera module is mounted, such as a digital still camera and a video camera.

Figure 39:
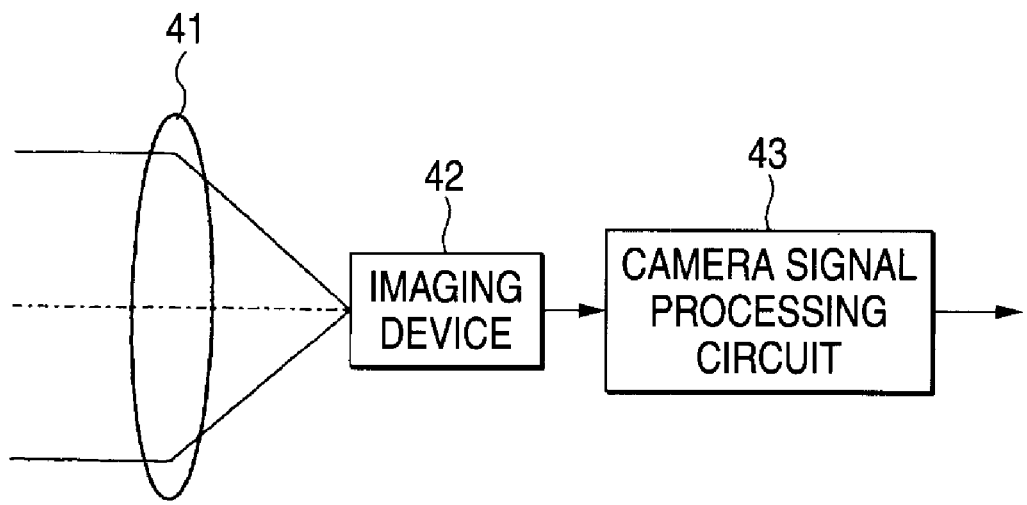
FIG. 39 is a block diagram showing a configuration example of an imaging apparatus according to an embodiment of the invention.
Figure 40:
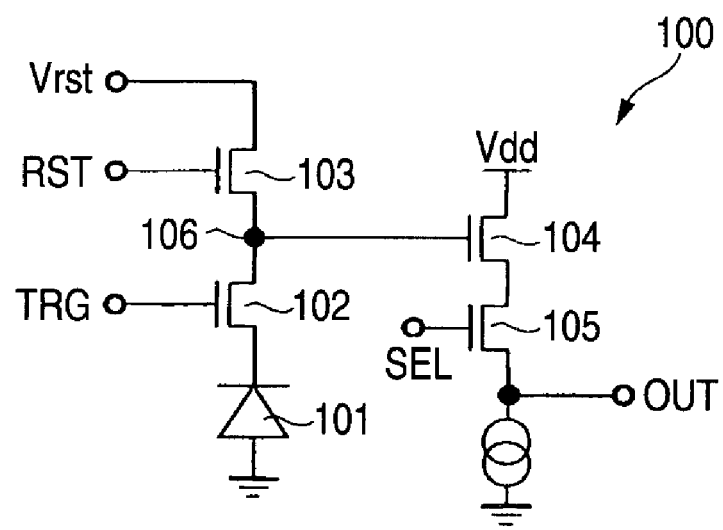
FIG. 40 is a circuit diagram showing an example of circuit configuration of a pixel.
Figure 41:
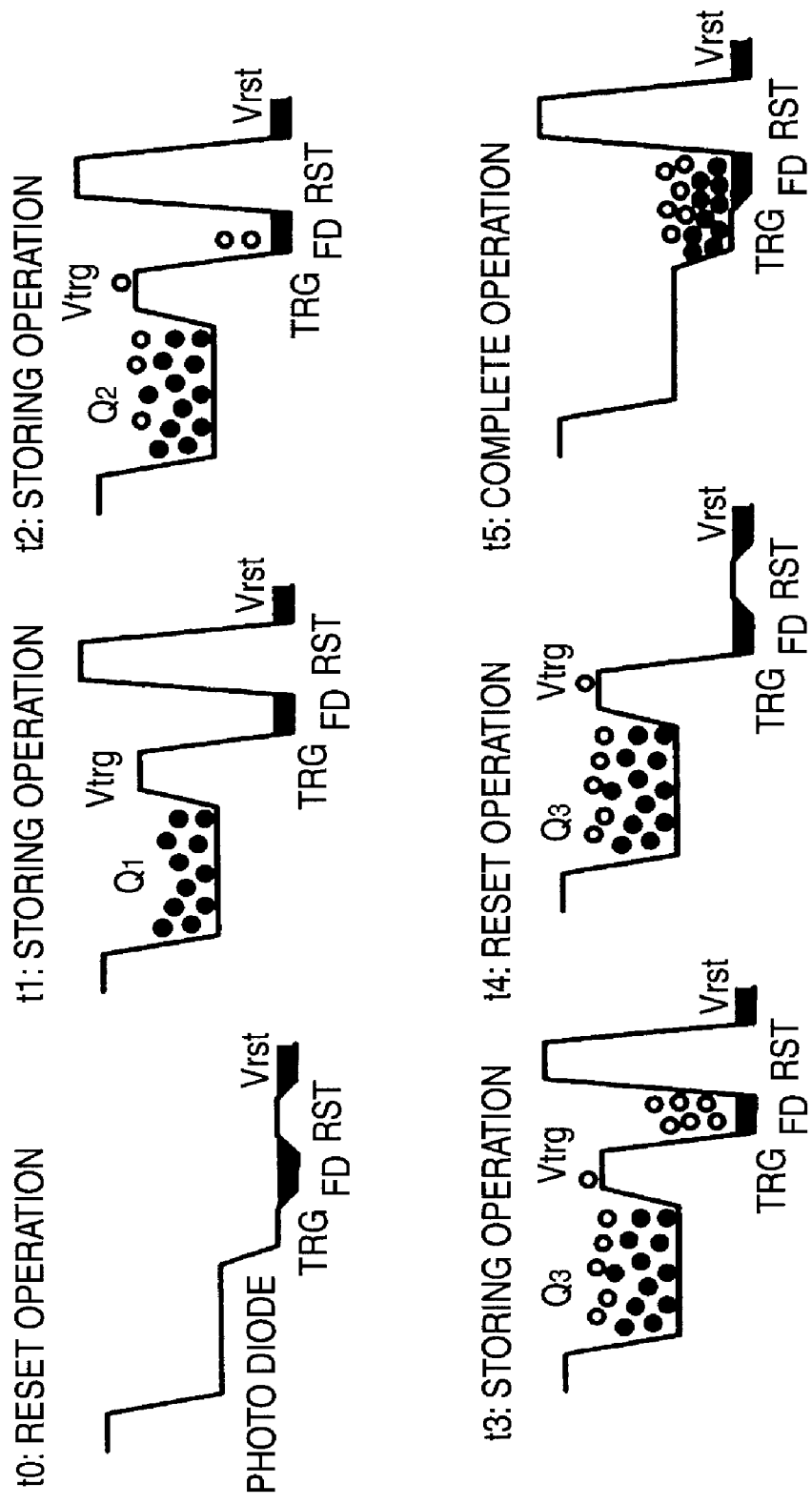
FIG. 41 is a potential diagram in a related art written in non-patent document 1.
Figure 42:
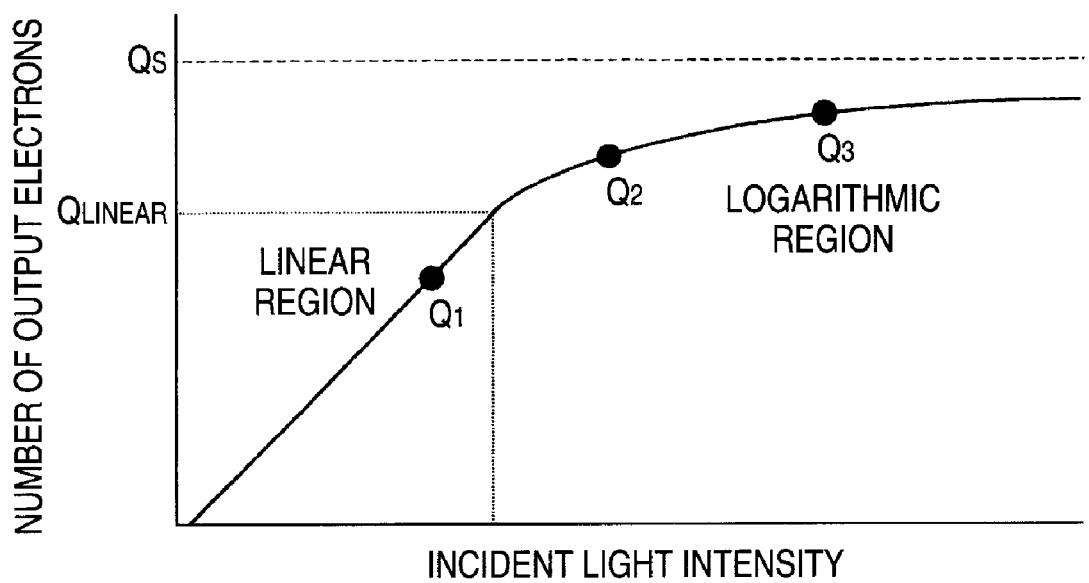
FIG. 42 is a graph showing relation between incident light intensity and the number of output electrons in the related art written in non-patent document 1.

FIG. 39 is a block diagram showing a configuration example of the imaging apparatus according to an embodiment of the invention. As shown in FIG. 39, the imaging apparatus according to the embodiment includes the optical system including a lens 41, an imaging device 42, and a camera signal processing circuit 43 and the like.

The lens 41 focuses image light from a subject on an imaging surface of the imaging device 42. The imaging device 42 outputs an image signal obtained by converting image light which is focused on the imaging surface by the lens 41 into an electrical signal in a pixel unit. As the imaging device 42, the CMOS image sensor 10 according to the embodiments is used. The camera signal processing unit 43 performs various signal processing to the image signals outputted from the imaging device 42.

As described above, in the imaging apparatus such as the video camera, the digital still camera, and the camera module used for mobile equipment such as the cellular phone, by using the CMOS image sensor 10 according to the embodiment as the imaging device 42, the CMOS image sensor 10 enables signal acquisition with linear and high S/N without narrowing the normal saturation level at low luminance, at the same time, the dynamic range can be expanded while realizing good S/N in a linear region also with respect to incident light larger than the normal saturation level, as a result, image quality of the imaging pictures can be further improved.

According to the embodiment of the invention, signal acquisition can be realized with the linear and high S/N without narrowing the normal saturation level at low luminance, and the dynamic range can be expanded while realizing good S/N in the linear region also with respect to incident light larger than the normal saturation level, therefore, in the variation of outside light under various environments, high-quality images having high S/N can be acquired at a low luminance scene, and images with less saturation in high quality by the linear response can be acquired at a high luminance scene, and further, it is possible to avoid saturation at high luminance areas while maintaining high S/N at low luminance area, even at a high contrast scene in which both low luminance and high luminance exist.

It should be understood by those skilled in the art that various modifications, combinations, sub-combinations and alterations may occur depending on design requirements and other factors insofar as they are within the scope of the appended claims or the equivalents thereof.

<The Case in which the Voltage Value of the Intermediate Voltage is the Same>

Then, in the embodiment, as shown in FIG. 46, during the period of a first exposure time Tlow in which an image in the low luminance area is acquired from the electronic shutter operation to the normal readout operation, readout scanning by intermediate voltage transfer (transfer by applying an intermediate voltage (second control voltage)) is performed. Furthermore, row scanning and selecting for dummy transfer by an intermediate voltage having the same voltage value (third control voltage) is performed once or plural times, as a second exposure time Thigh for acquiring an image in the high luminance area earlier than the readout operation by the intermediate voltage transfer. All of the time intervals of the intermediate voltage transfer plural times are the second exposure time Thigh. In other words, the intermediate voltage (third control voltage) is applied to the transfer transistor 22 plural times at equal time intervals.

FIG. 47 is a timing chart of driving the pixel 20 by applying an intermediate voltage. In addition, FIG. 13 is a potential diagram showing a pixel driven by applying an intermediate voltage.

Here, for the pixel circuit, the four transistor configuration shown in FIG. 2 is taken as an example, but the pixel circuit is not limited thereto, which may be a destructive readout pixel circuit having the photodiode (light-receiving region) 21 as well as at least the transfer transistor 22 (transfer gate).

In FIG. 47, the timing t after and before the respective transfer operations by applying an intermediate voltage to the gate electrode of the transfer transistor 22 is timings t1 to t6. As vertical scannings 1 (1a, 1b, 1c) to 3 shown in FIG. 47, row scanning and selecting is performed by the row selection circuits 212, 213A and 213B. Then, the charges in the photodiode 21 are swept by the vertical scanning 1a performed by the row selection circuit 212 to start storing the charges generated by exposure and photoelectric conversion.

Subsequently, as shown in FIG. 47, prior to the vertical scanning 1b performed by the row selection circuit 212, an intermediate voltage lower than a voltage necessary for normal complete transfer is supplied to the gate electrode of the transfer transistor 22 (transfer gate) by the vertical scanning 2 performed by the row selection circuit 213A. As described above, as the intermediate voltage to be supplied, plural intermediate voltages are supplied from the voltage supply circuit 217 shown in FIG. 43 to the driver circuit 215, and selected by the driver circuit 215 based on timing signals PTRG1 and PTRG2 supplied from the logic circuit 214 in response to the signal from the controller unit.

Figure 48:
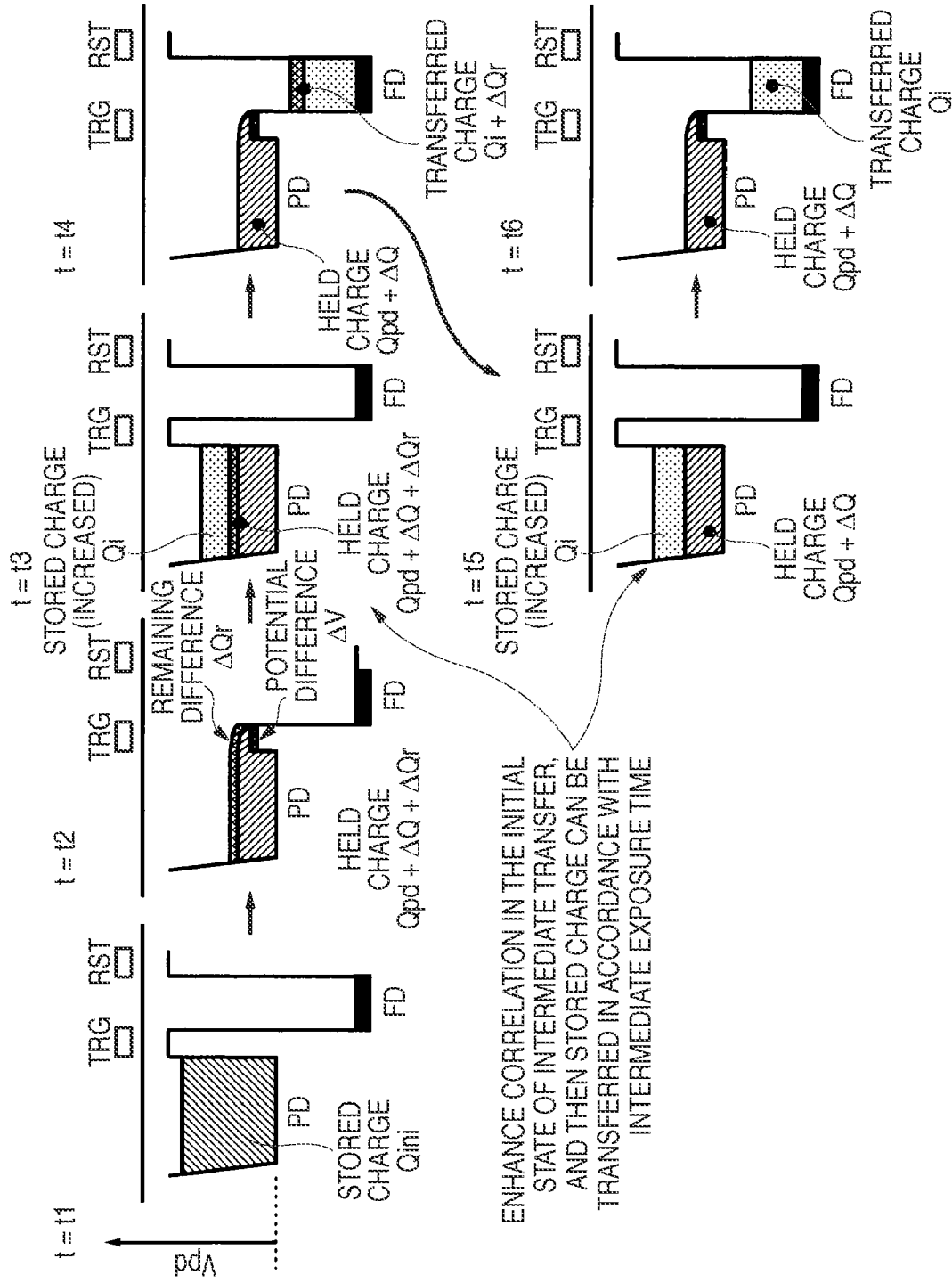
FIG. 48 is a potential diagram showing a pixel driven by applying an intermediate voltage.

As shown in t=t1 to t2 in FIG. 48, the intermediate voltage is applied to the gate electrode of the transfer transistor 22 to hold the charge Qpd+$\Delta$Q+$\Delta$Qr for transfer to the FD region 26, and after that, the FD region 26 is reset. Here, $\Delta$Q is variations in the held charges caused by a potential difference $\Delta$V resulted from the threshold variations of the transfer transistors 22, the offset of the voltage supplied from the voltage supply circuit 17, or the offset of the supply voltage depending on the positions in the two-dimensional pixel arrangement. In addition, $\Delta$Qr is a transfer residual difference generated depending on the difference in the initial state before transfer.

Moreover, the same intermediate voltage is supplied to the gate electrode of the transfer transistor 22 by the vertical scanning 3 performed by the row selection circuit 213A to hold the charge Qpd+$\Delta$Q as shown in t=t3 to t4 in FIG. 48, and then the FD region 26 is reset. By the vertical scanning 1b performed by the row selection circuit 212, the signal charges are transferred by the intermediate voltage having the same voltage value as the vertical scannings 2 and 3, read out by the column circuit 218 through the vertical signal line 111, and then outputted by horizontal scanning performed by the horizontal scanning circuit 219.

In this transfer, as shown in t=t5 to t6, the charge Qpd+$\Delta$Q is held in the photodiode 21, and then the charge Qi stored in the exposure time Thigh shown in FIG. 47 can be read out as the signal charges. This result is equivalent to a second video signal in the short exposure time (second exposure time Thigh), that is, imaging at a low sensitivity, which is image information in the high luminance area.

Exposure is further continued, and as shown in FIG. 47, a supply voltage different from the supply voltage (intermediate voltage) is applied to the gate electrode of the transfer transistor 22 by the vertical scanning 1c performed by the row selection circuit 212, and the charges stored in the photodiode 21 are completely transferred to the FD region 26 for readout. This result is equivalent to a first video signal in the long exposure time (first exposure time Tlow), that is, imaging at the high sensitivity, which is image information in the low luminance area.

Next, specific discussions will be given to the reason why the intermediate voltage having the same voltage value Vtrg is used to solve the points (1) to (4) which lead to problems in the case in which the voltage value of the intermediate voltage Vtrg is different.

First, the principle of canceling "the threshold variations of the transfer transistors", the above-described "(1) offset value of the intermediate voltage to be supplied" and "(2) offset value of the intermediate voltage in the pixel arrangement" will be explained with reference to FIG. 49.

These cancellations are implemented by intermediate voltage transfer t=t5 to t6 in which readout is performed and dummy transfer t=t3 to t4 performed at the same intermediate voltage immediately before intermediate voltage transfer.

The charges stored in the photodiode 21 at t=t3 is Q0. In addition, the cancel operation is performed in two operations A and B.

In the operation A, an amount of the held charge Qpd determined by the applied intermediate voltage remains in the photodiode (PD) 21, and the charge Qo−Qpd is transferred to the FD region 26. At t=t5, the charge Qpd+Qi, added with the charge Qi stored in the exposure time Thigh, is stored in the photodiode 21, and is transferred at the same intermediate voltage at t=t6, whereby the charge Qpd remains in the photodiode 21, and the charge Qi stored in the exposure time Thigh can be read out.

On the other hand, in the operation B, a potential difference is generated by $\Delta$V as compared with the operation A caused by the threshold variations of the transistors or the offset value of the intermediate voltage. In this case, at t=t4, the held charges in the photodiode 21 are changed by $\Delta$Q caused by the potential difference $\Delta$V, and then the charge Qpd+$\Delta$Q remains. Therefore, the transfer charge at this time is Qo−(Qpd+$\Delta$Q).

As similar to the operation A, in the case in which the stored charges are increased by the charge Qi in the exposure time Thigh, the stored charges at =t5 are Qpd+$\Delta$Q+Qi. In the case in which at t=t6, a transfer is performed at the same intermediate voltage as t=t4, because the threshold variations of the transistors, the offset value of the intermediate voltage to be supplied, and the position in the pixel arrangement are the same, the potential difference $\Delta$V is equal to the potential difference at t=t4. Thus, the held charges are Qpd+$\Delta$Q, and the transfer charges become the charge Qi stored in the exposure time Thigh. The charge Qi stored in the exposure time Thigh is obtained in the operation A as well as in the operation B, and then the effect of canceling variations and an offset can be obtained.

Next, the operation of canceling "(3) variations in time in which an intermediate voltage is applied to the transfer transistor in the pixel arrangement" and "(4) variations in the residual transfer charge amount in the intermediate voltage transfer" will be explained with reference to FIG. 50.

Figure 51:
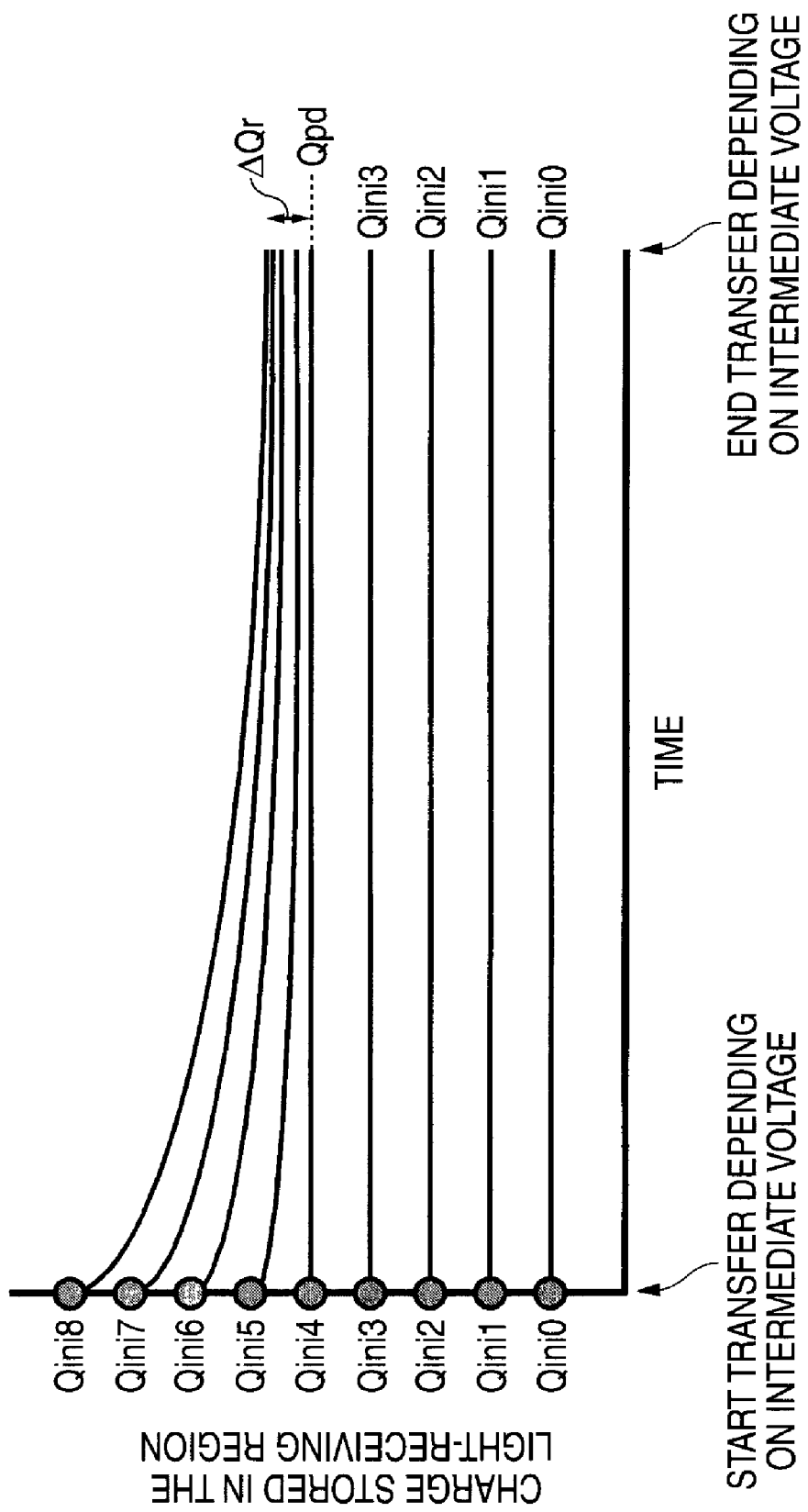
FIG. 51 is a diagram showing characteristics that charges stored in a light-receiving region before starting transfer are transferred over time by applying an intermediate voltage.

In the charge transfer by applying an intermediate voltage to the gate electrode of the transfer transistor 22, the transfer transistor 22 is operated in the subthreshold region. FIG. 51 shows the characteristics in which the charges stored in the photodiode 21 before starting transfer are transferred over-time by applying an intermediate voltage. In the case in which the initial charges stored in the photodiode 21 are charge amounts Qini0 to Qini3, where each of the amounts is smaller than the maximum charge amount Qpd that can be held by the intermediate voltage to be applied, the charges are not transferred and are kept held in the photodiode 21.

On the other hand, in the case of charge amounts Qini4 to Qini8 greater than the maximum charge amount Qpd, the charge amount remaining in the photodiode 21 is gradually decreased by charge transfer, and converged on the maximum charge amount Qpd. However, in the case in which there is a great difference in the initial state and transfer time is not enough, the intermediate voltage transfer is finished before the amount is converged to the maximum charge amount Qpd, and a residual difference is generated by $\Delta$Qr.

Figure 50:
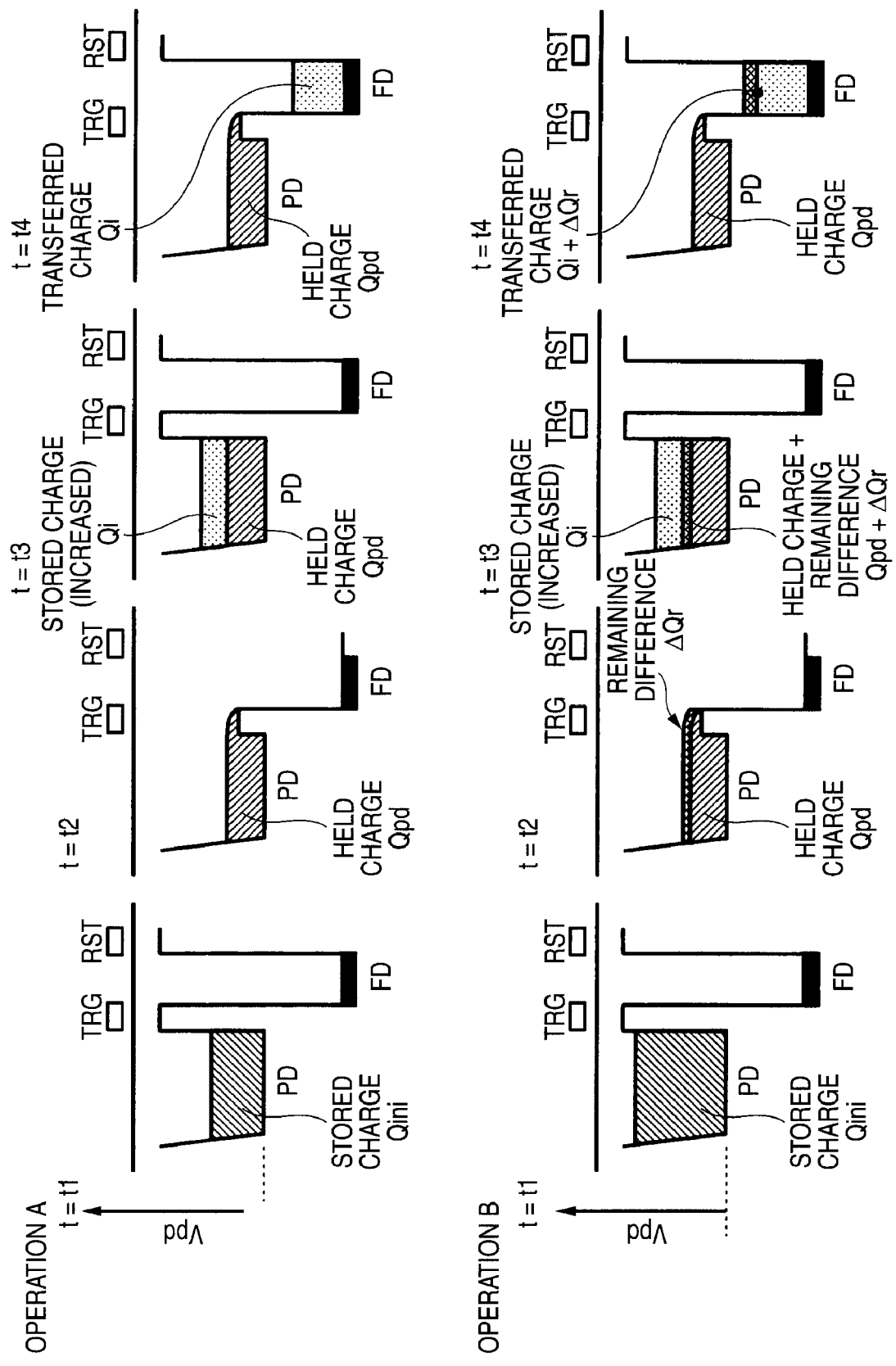
FIG. 50 is an explanatory diagram of the operation of a cancel operation for threshold variations (second process)

In the operation A shown in FIG. 50, the charge Qini is stored at t=t1, storing is continued while the held charge Qpd is left at t=t2, and at t=t3, the charge Qi newly stored in the exposure time Thigh and the held charge Qpd are stored in the photodiode 21. In the intermediate voltage transfer at t=t4, Qi is transferred.

On the other hand, in the operation B in which the initial state is different, the charge Qini' is stored at t=t2, and at t=t2, a residual difference is generated by ΔQr in addition to the held charge Qpd. At t=t3, the charge Qi newly stored in the exposure time Thigh is added thereto, and the charge Qpd+Qi+ΔQr is stored. In the transfer by the intermediate voltage at t=t4, the stored increment Qi as well as the residual difference ΔQr are transferred. However, since the residual difference ΔQr is a small amount, the states in the operation A and the operation B at t=t3 are nearly equal, and the held charge Qpd in the operation A and the operation B at t=t4 also has high correlation, which is a nearly equal value.

Therefore, immediately before the transfer for readout by applying an intermediate voltage, also in the operation A and in the operation B, Qpd+Qi is stored, which is the sum of the held charge Qpd in the photodiode 21 and the charge Qi stored in the exposure time Thigh, and then the increment Qi can be transferred in the same state. More specifically, as shown in FIG. 48, the correlation between the initial state of the intermediate voltage transfer for readout and the initial state of the dummy transfer by applying an intermediate voltage immediately before that transfer is enhanced by the previous dummy transfer, whereby only the increment Qi in the exposure time Thigh can be transferred when read out.

Consequently, since the transfer residual difference ΔQr can be more reduced, which depends on the initial state of the photodiode 21 in the intermediate voltage transfer, the S/N of an image in the high luminance area can be improved particularly. In addition, even though the time to apply the desired intermediate voltage is varied in the pixel arrangement to generate a different transfer residual difference ΔQr, the cancel effect is exerted in every pixel, and the effect on the transfer for readout by applying an intermediate voltage can be suppressed. In addition to this, since plural images in the high luminance area by the intermediate transfer operation can be obtained, the embodiment can be used to correct the blur of a moving object as well as to provide an advantage of improving S/N of an image by image addition.

<Processing for Allowing S/N to be High and for Allowing the Dynamic Range to be Wide>

Figure 52:
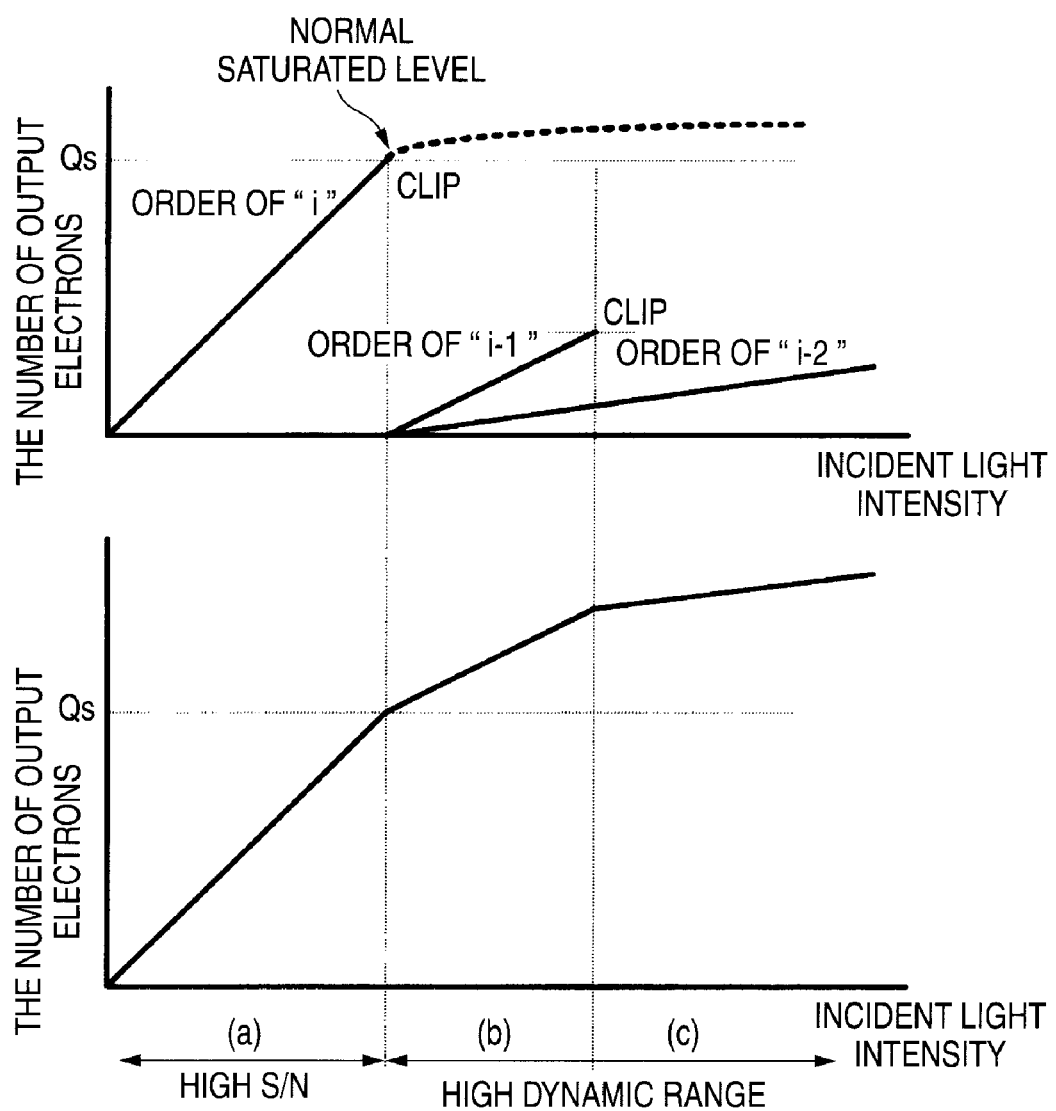
FIG. 52 is an explanatory diagram for making S/N high and making the dynamic range wide.

Here, as shown in FIG. 52, as an example, for signals obtained in intermediate transfers by supplying the intermediate voltage plural times, the signals are clipped at the saturation levels which have been previously set and added to obtain continuous input and output characteristics. For example, in FIG. 52, after the complete transfer in the normal exposure as a readout in the order of "i", the signal is outputted in high S/N until the normal saturation level. In the transfer in the previous order of "i−1", almost doubled dynamic range can be obtained by performing intermediate transfer at ½ of exposure time, and in the transfer in the order of "i−2", almost an eight-times dynamic range can be obtained by performing intermediate transfer at ⅛ of exposure time. It is possible to obtain continuous characteristic by clipping and adding signals at points near the saturation levels.

Processing for allowing S/N to be high and for allowing the dynamic range to be wide by clipping and adding will be performed by using a frame memory which stores an image read out plural times, for example, in a signal processing circuit (not shown) of the CMOS image sensor 10 provided at a subsequent stage.

However, the processing example is only an example, and it is possible to process by using a personal computer if the image read out plural times is stored, and it is also possible to employ a configuration in which processing is performed in the CMOS image sensor 10 and only a final image is outputted by mounting the frame memory on the CMOS image sensor 10.

Advantages of the First Embodiment

As described above, in the CMOS image sensor 10 according to the first embodiment, since the unit pixel 20 is a destructive readout pixel having the transfer transistor 22 that is the transfer gate, an advantage of a high S/N can be exerted because dark current is low, conversion efficiency is high that indicates voltage per electron, and the noise cancel operation referred to as correlated double sampling (CDS) can be performed.

In addition to these, in the CMOS image sensor 10 according to the embodiment in which the unit pixel outputs a high-sensitive first video signal in the exposure time Tlow, such a configuration is adapted to exert the following advantage in which during the period of the first exposure time Tlow, the signal charges are stored in the unit pixel proportional to the second exposure time Thigh determined depending on the time interval to drive the transfer transistor 22, the signal charges are read out, and the signal charge is outputted as a video signal having the sensitivity different from that of the first video signal, that is, outputted as a low-sensitive second video signal, preferably, the signal charges are outputted as video signals having plural sensitivities different from that of the first video signal from the pixel array area 11.

Figure 53:
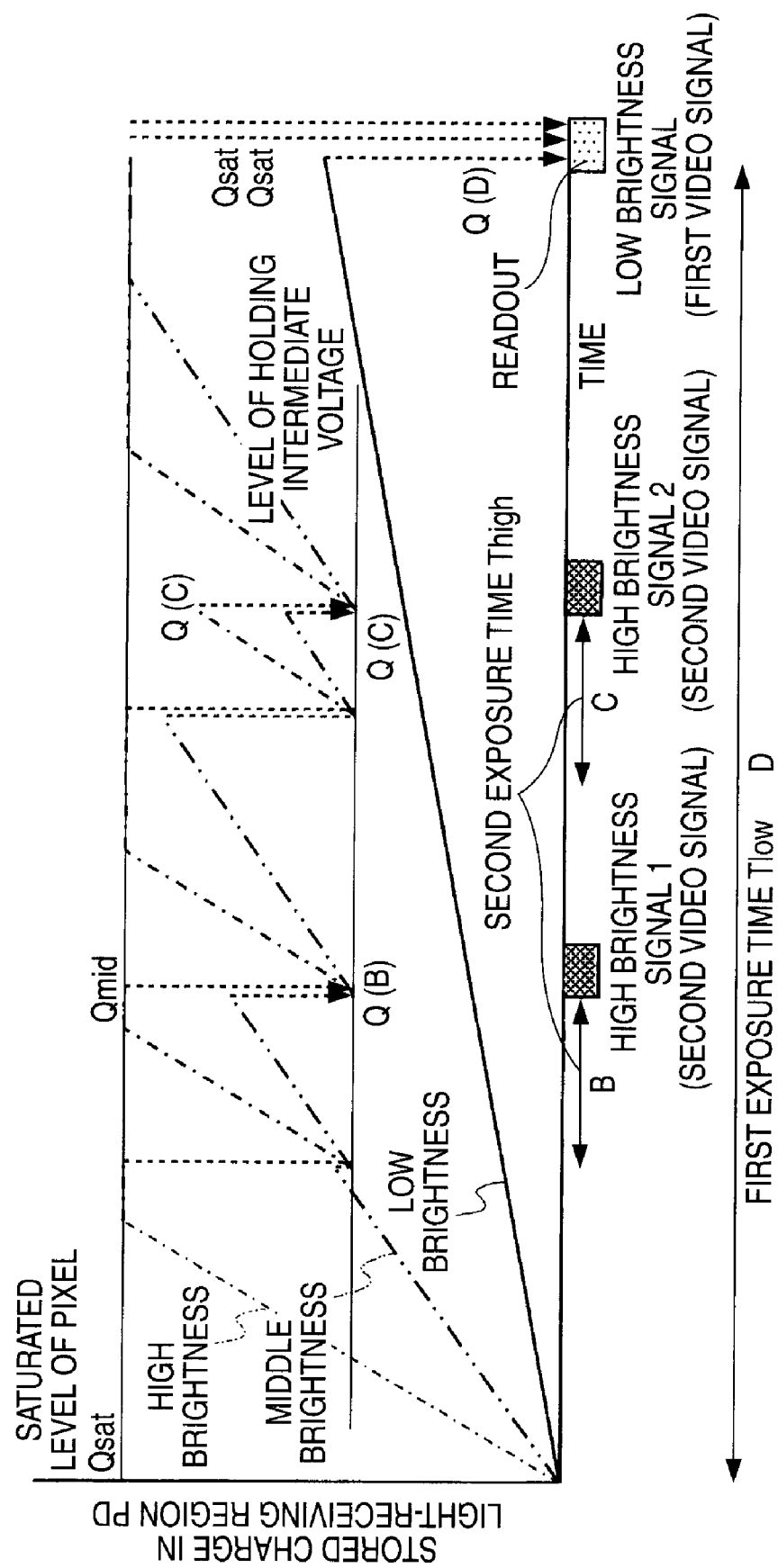
FIG. 53 is a diagram for explaining operation and effect according to the first embodiment.

In other words, as shown in FIG. 53, since the storing operation in the second exposure time Thigh (in the drawing, periods B and C) can be set to a given timing within the first exposure time Tlow (in the drawing, a period D), the timings of reading out second video signals (in the drawing, high brightness signals 1 and 2) can be set freely. Therefore, a high frame rate depending on the shortest exposure time interval is unnecessary, and a video signal in a shorter exposure time can be obtained by the frame rate determined by the number of times of reading out video signals.

In FIG. 53, Qsat indicates the saturation level of the pixel, and Qmid indicates the difference between the saturation level Qsat of the pixel and the level of holding the intermediate voltage. In addition, alternate long and short dashed lines indicate the case of high brightness, chain double-dashed lines indicate the case of middle brightness, and solid line indicate the case of low brightness. Then, in reading out the high brightness signal 1 in the second exposure time B, a signal charge Q(B) stored proportional to the second exposure time B in middle brightness is read out as a second video signal. In reading the high brightness signal 2 in the second exposure time C, a signal charge Q(C) stored proportional to the second exposure time C in high brightness and middle brightness is read out as a second video signal. In addition, in reading the low brightness signal in the first exposure time D, a signal charge Q(D) stored proportional to the first exposure time D in low brightness is read out as a first video signal.

In the case in which the unit pixel 20 is a non-destructive readout pixel, although the video signal can be read out of the pixel at a given timing in the storing period, in order to acquire a video signal in a short second exposure time Thigh, it is necessary to read out the video signal in the frame interval determined by the second exposure time Thigh. In other words, a high frame rate is necessary which reads out a video signal at the shortest exposure time interval.

Particularly, in the CMOS image sensor 10 according to the embodiment, such a configuration is adapted in which prior to supplies of the first control voltage and the second control voltage, the FD region 26 is reset to a predetermined potential (in this example, the power supply voltage VDD), which stores the signal charges transferred from the transfer transistor 22. Thus, the video signal can be acquired which has a sensitivity proportional to the exposure time (B, C, D) determined by the time interval to drive the transfer transistor 22. In addition, the video signal includes no variations as pixel variations such as the threshold variations of the transfer transistor 22, variations in parasitic capacitance of the photodiode 21, that is, variations in the number of the saturated electrons, and variations in the intermediate voltage.

Figure 54:
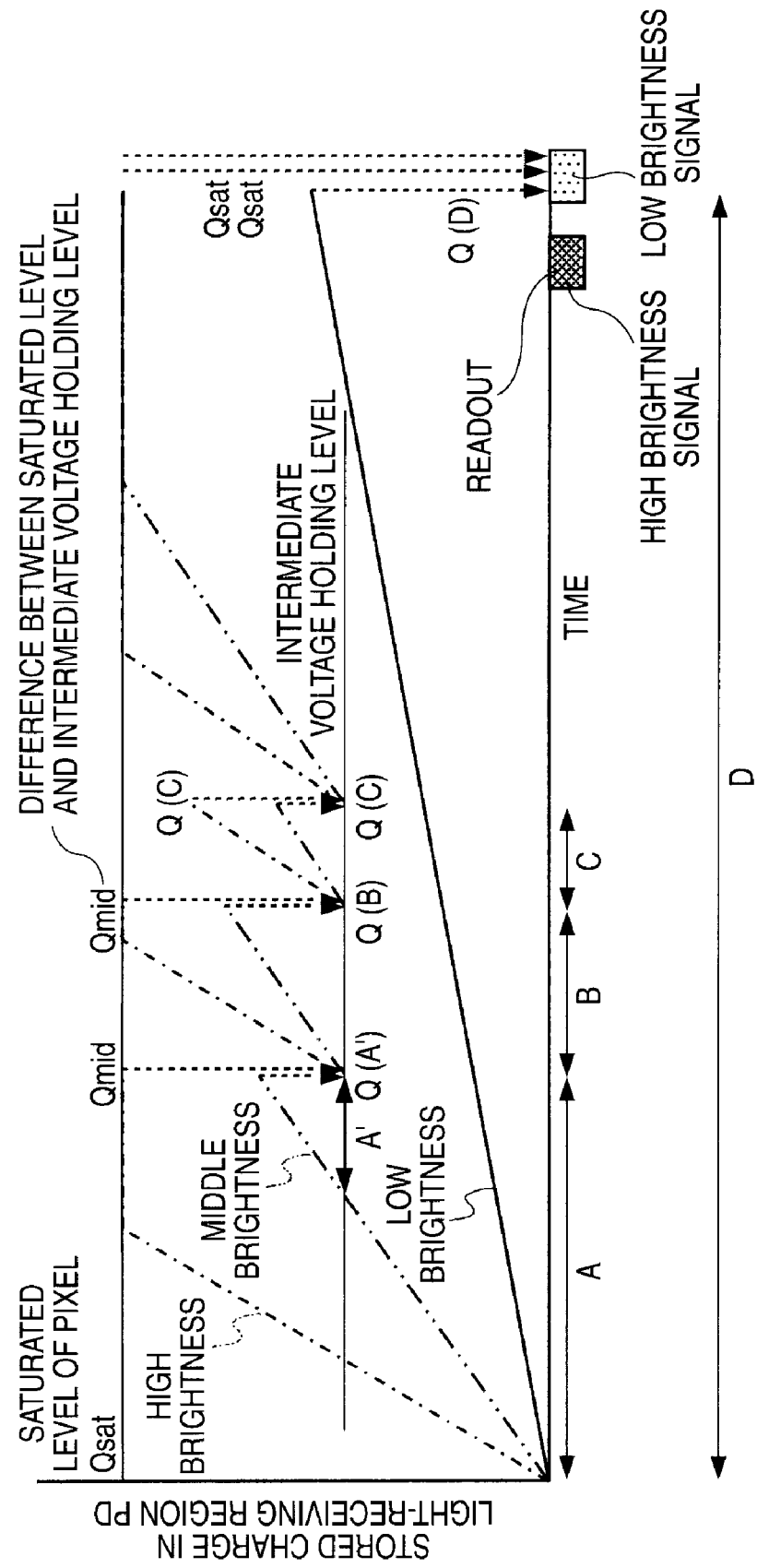
FIG. 54 is a diagram for explaining the operation when such a configuration is not adapted in which the FD region is reset prior to supplies of a first control voltage and a second control voltage.

In the case in which such a configuration is not adapted in which the FD region 26 is reset prior to supplies of the first control voltage and the second control voltage, as shown in FIG. 54, the signal charges obtained in the first transfer are a charge Q(A') that is stored from the timing at which the signal charge exceeds the held amount at the time of supply of the intermediate voltage to a period A' of transfer during the exposure time A, and the charge Q(A') is not proportional to the exposure time A. The timing of the signal charge exceeding the held amount is varied depending on the incident light intensity or the sensitivity of a light receiving device.

In addition, since the charge Q(B) stored in the exposure time B is transferred and added to the charge Q(A'), the video signal becomes Q(A')+Q(B), which is not proportional either to the exposure time A+B or the exposure time B. Moreover, in the case in which the light-receiving region is saturated in the previous exposure time (for example, the exposure time A for the exposure time B, and the exposure time A and the exposure time B for the exposure time C), Qmid, the difference between the saturation level Qsat and the holding level by the intermediate voltage, is included in the video signal. Thus, the video signal having a sensitivity proportional to the exposure time may not be acquired.

In addition, in the case in which supply of the third control voltage (dummy intermediate transfer performed in advance) in the embodiment is not provided and the charges moved by respective transfers are individually read as a video signal, it is necessary to read the video signal out of the pixel array area 11 at the time interval of the shortest exposure time. Thus, it is necessary to read out the video signal at a high frame rate determined by the shortest exposure time (C, for example).

In addition, in the CMOS image sensor 10 according to the embodiment, the event that the unit pixel outputting the high-sensitive first video signal outputs the low sensitive second video signal means that the first and second video signals are read out of the same pixel without spatially splitting the pixel arrangement of the pixel array area 11. As described above, such a configuration is adapted in which the first and second video signals are outputted from the same pixel without spatially splitting the pixel arrangement, whereby the video signals having plural sensitivities (plural exposure times) can be acquired from all the pixels, and thus, the resolution is not deteriorated.

Figure 55:
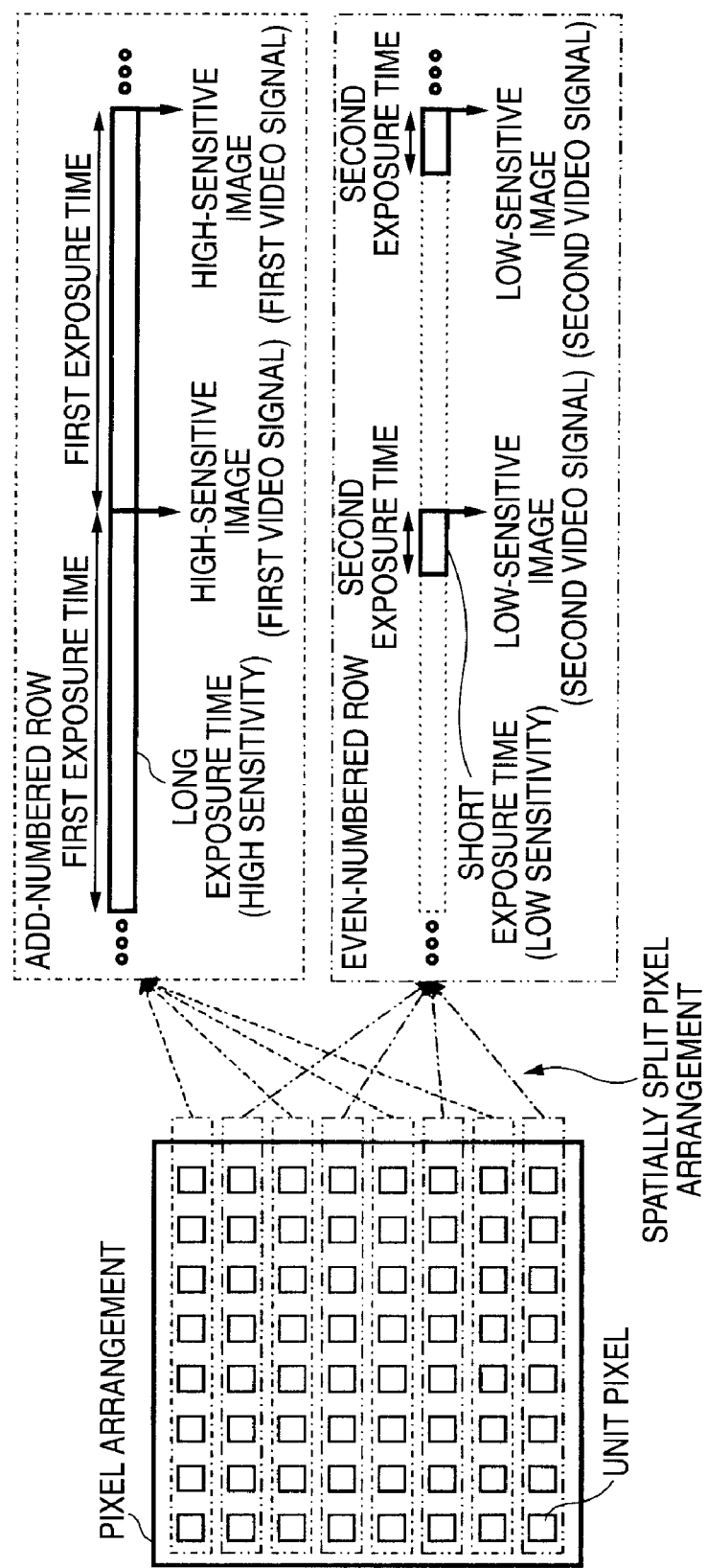
FIG. 55 is a diagram for explaining spatially splitting the pixel arrangement.

For example, as shown in FIG. 55, in the case in which the pixel arrangement is spatially split in such a way that the first exposure time (long exposure time) is set to the unit pixels in add-numbered rows to output a high-sensitive image (first video signals) from the add-numbered rows, whereas the second exposure time (short exposure time) is set to the unit pixels in even-numbered row to output a low sensitive image (second video signals) from the even-numbered rows, information volumes of the high-sensitive and low sensitive images are a half of the number of the pixels, which leads to deteriorated resolution.

In addition, in the CMOS image sensor 10 according to the embodiment, as shown in FIG. 56A, the second exposure time Thigh is set within the first exposure time Tlow, which provides no frame periods temporally split. Therefore, since the same time as the frame period can be secured at the maximum within the first exposure time Tlow, the video signals of a high S/N (high image quality) can be acquired without deteriorating the sensitivity of the first video signal while the dynamic range is widened by the second exposure time Thigh.

In multi-time exposure referred to as a so-called multi-sampling, as shown in FIG. 56B, since the frame period is temporally split to set the long exposure time (first exposure time) and the short exposure time (second exposure time), the first exposure time is always shorter than the frame period to degrade the sensitivity, and consequently, the image quality is deteriorated.

In addition, in the CMOS image sensor 10 according to the embodiment, for more specific driving, in sequential supply of plural first intermediate voltages as the second control voltage to the gate electrode of the transfer transistor 22, the driving is performed under driving by the row selection circuit 212 and the pre-selection circuit 213 in which the signal charges to be transferred to the FD region 26 by the transfer transistor 22 are read out once and more, whereby the threshold variations of the transfer transistors 22 can be cancelled. Accordingly, signals in linear and high S/N can be acquired without narrowing the normal saturation level with low luminance, and enables the expansion of dynamic range while realizing good S/N in the linear region also with respect to incident light which is more than the normal saturation level.

Particularly, in the case in which the second intermediate voltage (third control voltage) before any one or a plurality of first intermediate voltages (second control voltage) is set to the same voltage value as that of any one or a plurality of the respective first intermediate voltages, that is, the first intermediate voltages are set to V1, V2, and so on (these first intermediate voltages may have the same voltage value, or may have different voltage values), the second intermediate voltage before V1 is set to have the same voltage value as V1, the second intermediate voltage before V2 is set to have the same voltage value as V2, and when the voltage values of V1 are V2 are different, the second intermediate voltage is also set to have a different voltage value. Thus, in addition to the threshold variations of the transfer transistors 22, the following can be cancelled such as the offset value of the intermediate voltage Vtrg to be supplied, the offset value of the intermediate voltage Vtrg in the pixel arrangement, variations in time to apply the intermediate voltage Vtrg to the transfer transistor 22 in the pixel arrangement, and variations in the residual transfer charge amount in the intermediate transfer by applying an intermediate voltage Vtrg. Therefore, there is an advantage of particularly improving the S/N of an image in the high luminance area.

In addition, in the embodiment, the time interval of supplying the intermediate voltage having the same voltage value plural times, that is, the time interval between the vertical scanning 2 and the vertical scanning 3 is equal to the time interval between the vertical scanning 3 and the vertical scanning 1b shown in FIG. 47. However, a certain cancel effect can be obtained, as the time interval is not necessarily set equal. However, the equal time intervals can reliably exert the cancel effect on the offset value of the intermediate voltage Vtrg to be supplied, the offset value of the intermediate voltage Vtrg in the pixel arrangement, variations in time to apply the intermediate voltage Vtrg to the transfer transistor 22 in the pixel arrangement, and variations in the residual transfer charge amount in the intermediate transfer by applying an intermediate voltage Vtrg.

As discussed above, it becomes possible to obtain high-quality images having high S/N in a low luminance scene, and to obtain high-quality images with less saturation by linear response in a high luminance scene, with respect to variation of external light in various environments such as indoor and outdoor, daytime and nighttime. Further, even in a high-contrast scene in which both low luminance and high luminance exist, saturation in a high luminance part can be avoided while maintaining high S/N in a low luminance part.

Additionally, in the case in which pixels having high sensibility are arranged in the normal pixel arrangement for the purpose of increasing the sensibility, it is not necessary to lower S/N in the normal pixels to suit exposure time to the high sensibility pixels, and high S/N images of high sensibility pixels can be obtained by suiting the adequate exposure of normal pixels, which will be an advantageous for processing for high image quality in a subsequent stage.

In addition to this, for the unit circuit 20, since a pixel circuit before can be used as it is without increasing component devices, the circuit scale of the unit circuit 20 is not increased. Therefore, a desired CMOS image sensor can be implemented with no reduction in the number of the pixels caused by a larger circuit scale of the unit circuit 20 as well as no reduction in the resolution.

First Modification Example

Figure 57:
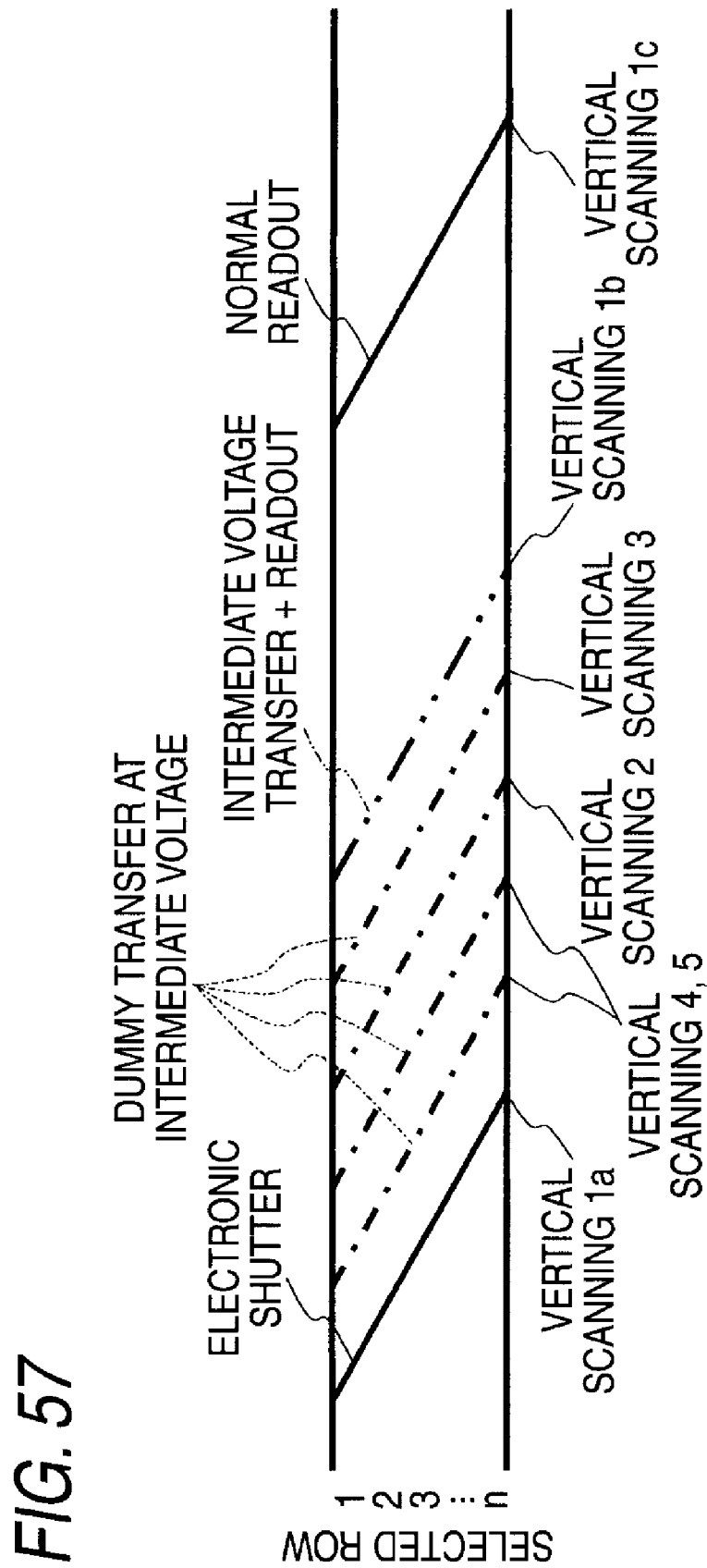
FIG. 57 is a timing chart showing the concept of driving according to a first modification example of the first embodiment (first process)

In addition, in the embodiment, the vertical scanning prior to the readout operation (the vertical scanning 1b shown in FIG. 47) is performed twice (the vertical scannings 2 and 3 shown in FIG. 47). However, the number is not limited to twice. As shown in FIG. 57, the vertical scanning may be performed three times and more, in this example, four times (vertical scannings 2 to 5)). In this case, a row selection circuit may be added, the row selection circuit having finished scanning may be used again, or, such a row selection circuit may be used which can select two rows and more.

Figure 58:
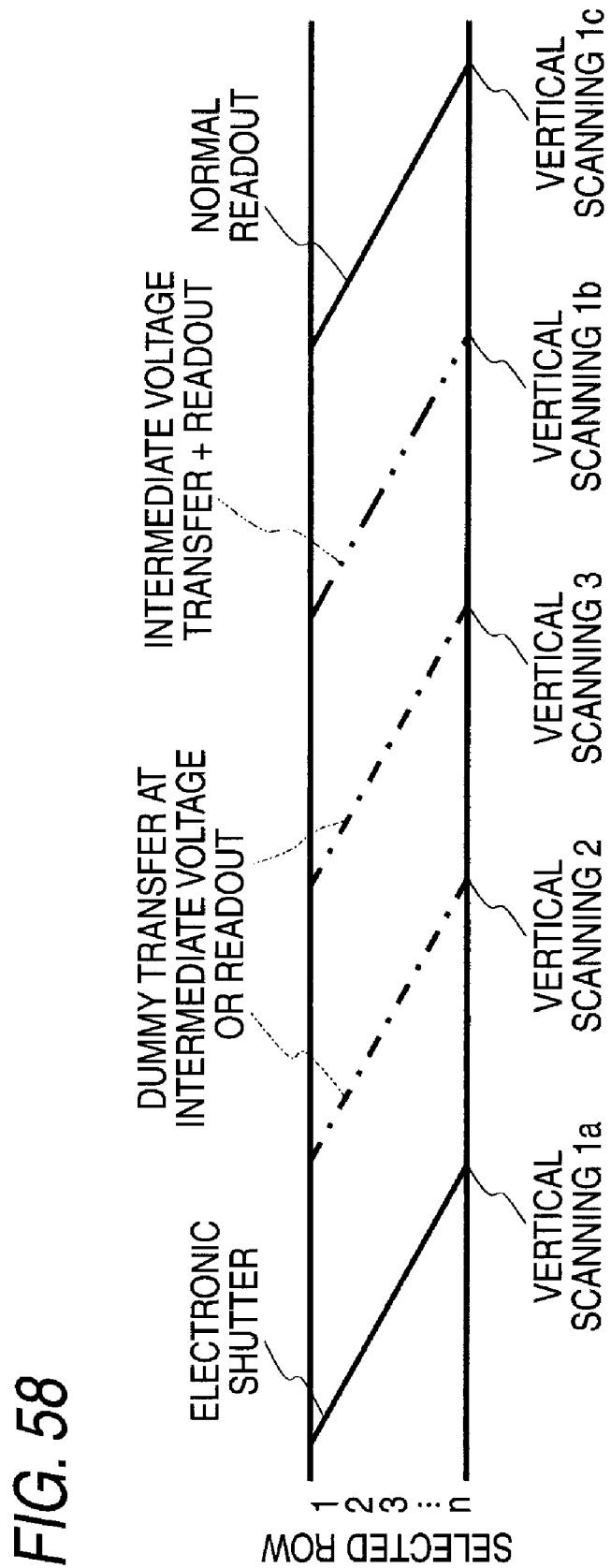
FIG. 58 is a timing chart showing the concept of driving according to the first modification example of the first embodiment (second process)

In addition, as shown in FIG. 58, in the vertical scanning 2 and the vertical scanning 3 prior to the readout operation (the vertical scanning 1b shown in FIG. 47), it may be possible that a part of or entire transfer charges are read and then the FD region 26 is reset.

Second Modification Example

Figure 59:
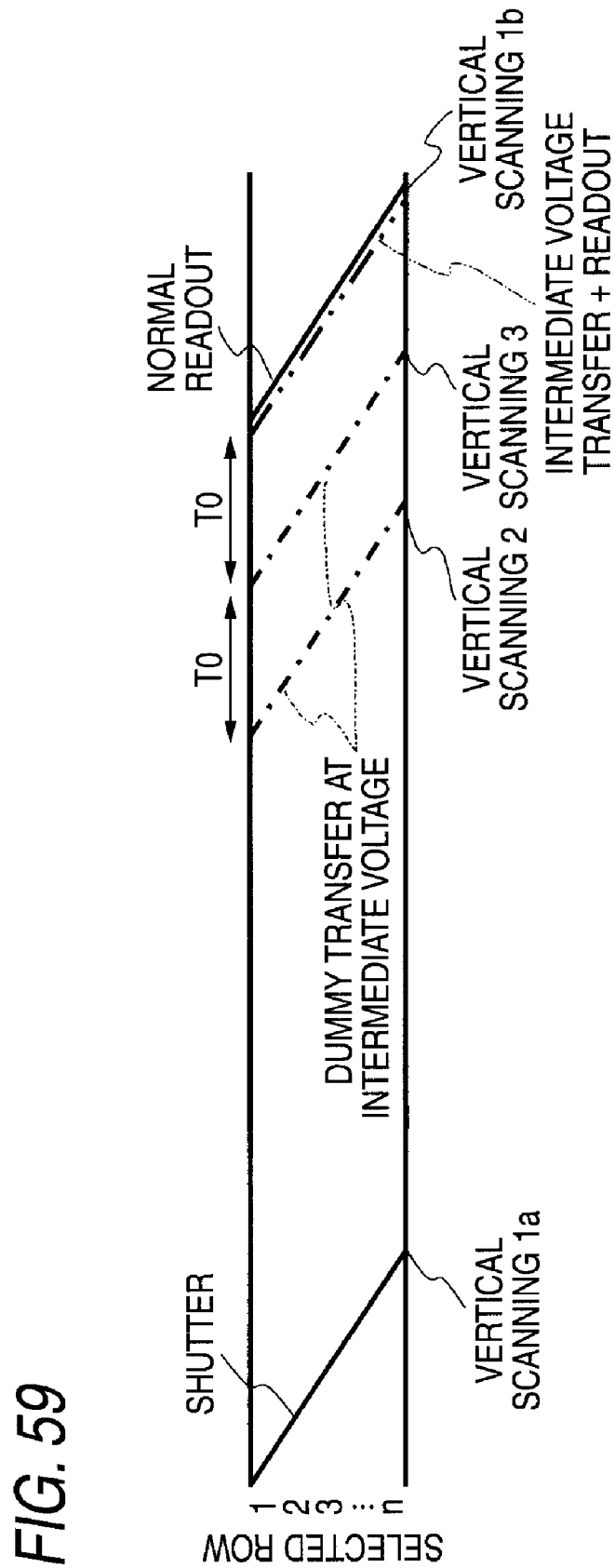
FIG. 59 is a timing chart showing the concept of driving according to a second modification example of the first embodiment (first process)
Figure 60:
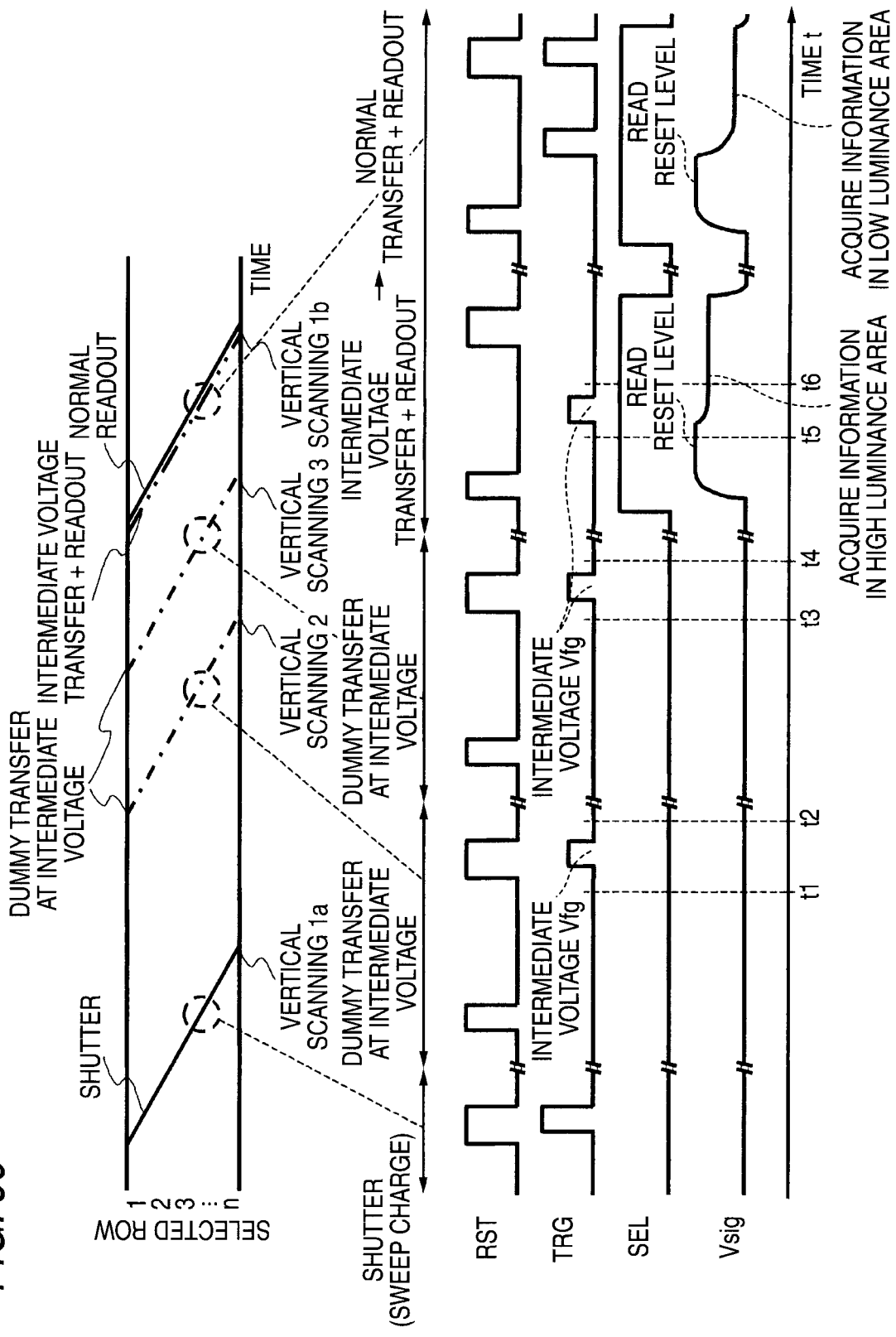
FIG. 60 is a timing chart showing the concept of driving according to the second modification example of the first embodiment (second process)

In addition, in the embodiment, the vertical scanning 1b supplying the first intermediate voltage shown in FIG. 57 and the vertical scanning 1c supplying a voltage different from the supply voltage (intermediate voltage) in order to completely transfer the charges stored in the photodiode 21 to the FD region 26 may be shared as a vertical scanning 1b shown in FIG. 59. Timings of driving in this case are shown in FIG. 60.

In the case of the second modification example, in the same vertical scanning, the reading out of the charge transferred by the first intermediate voltage and the reading out of the entire charge remaining in the photodiode 21 are continuously performed in the same row. In addition, since an image in the high luminance area and an image in the low luminance area are alternately output in every row, a frame memory for one image is not necessary in signal processing in the later stage.

Third Modification Example

Figure 61:
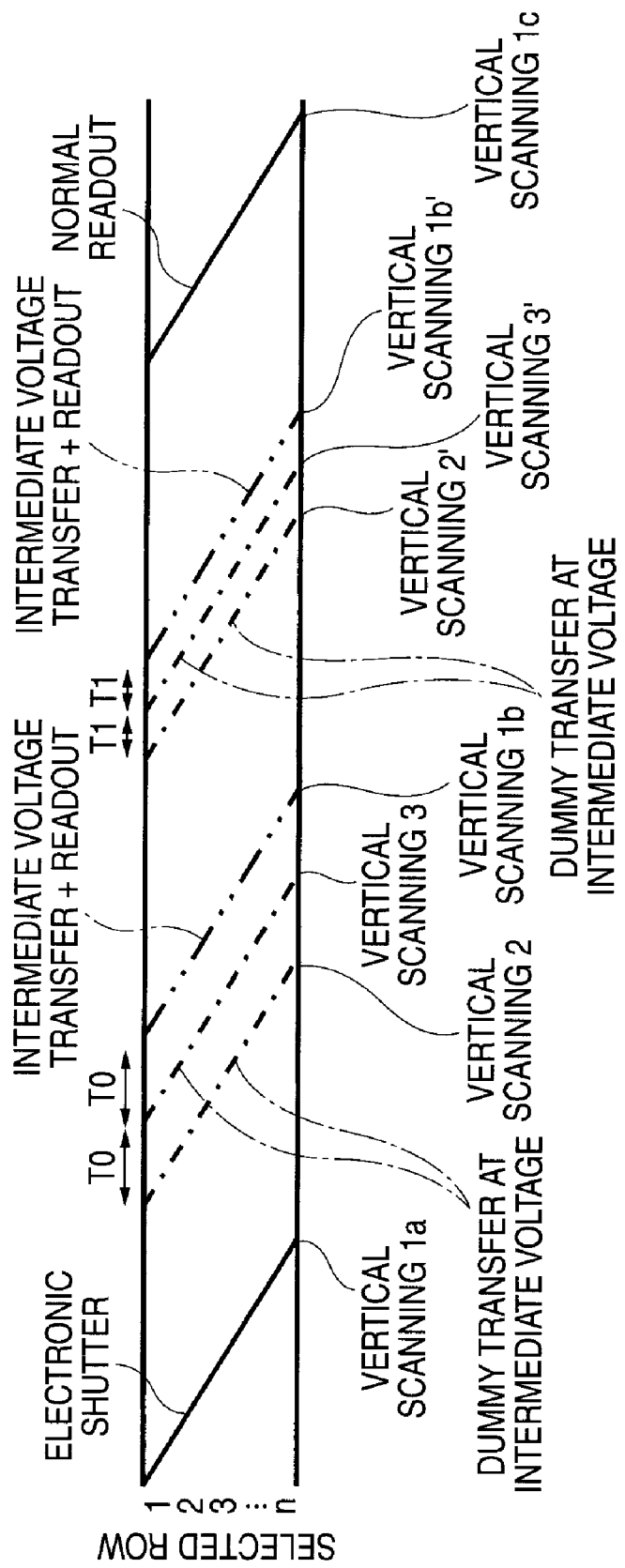
FIG. 61 is a timing chart showing the concept of driving according to a third modification example of the first embodiment.

In addition, as shown in FIG. 61, in the case in which prior to the normal readout operation (vertical scanning 1c) by complete transfer, the readout operation by applying plural intermediate voltages is performed (vertical scannings 1b and 1b'), it may be possible that prior to the respective vertical scannings, the same voltage as the respective supply voltages is supplied in the vertical scanning plural times to perform vertical scannings 2, 3, 2' and 3', for example, shown in FIG. 61.

Preferably, at this time, a time interval T0 between the vertical scanning 2 and the vertical scanning 3 is equal to a time interval T0 between the vertical scanning 3 and the vertical scanning 1b, and a time interval T1 between the vertical scanning 2' and the vertical scanning 3' is equal to a time interval T1 between the vertical scanning 3' and the vertical scanning 1b', but the time interval T0 may be different from the time interval T1.

As described above, in the case in which a set of the intermediate voltage transfer+readout and the dummy transfer at the intermediate voltage is performed plural times, a time interval is set to the time intervals (T0/T1) different from each other, whereby plural exposure times Thigh can be set for obtaining an image in the high luminance area. Thus, plural images in the high luminance area having different sensitivities can be obtained. Consequently, an S/N in a middle luminance area can be improved.

In other words, changing the time interval in performing a set of the intermediate voltage transfer+readout and the dummy transfer at the intermediate voltage plural times is equivalent to changing the sensitivity of an image to be obtained. For example, in the case in which the exposure time Thigh for signal acquisition in low luminance is set to one and time intervals Thigh_1, Thigh_2, and Thigh_3 for the second control voltage before plural first control voltages are set to $1/10$, $1/100$ and $1/1000$, an image at $1/10$ sensitivity, an image at $1/100$ sensitivity, and an image at $1/1000$ sensitivity can be obtained step by step. Generally, since in the image of higher sensitivity, the dynamic range is limited but the image has small noise with high image quality, images of plural sensitivities are obtained step by step and are combined, whereby an image of more excellent image quality can be obtained.

In addition, for the voltages to be supplied to the gate electrode of the transfer transistor 22 in the vertical scannings 2, 3 and 1b and the vertical scannings 2', 3' and 1b', the voltages may have an equal voltage value, or may have different voltage values. However, the intermediate voltages having the different voltage values are supplied to obtain an image in the low luminance area without impairing the stored charges in the low luminance area. In other words, an advantage of maintaining the saturated charge amount in the low luminance area can be obtained.

Second Embodiment

Figure 62:
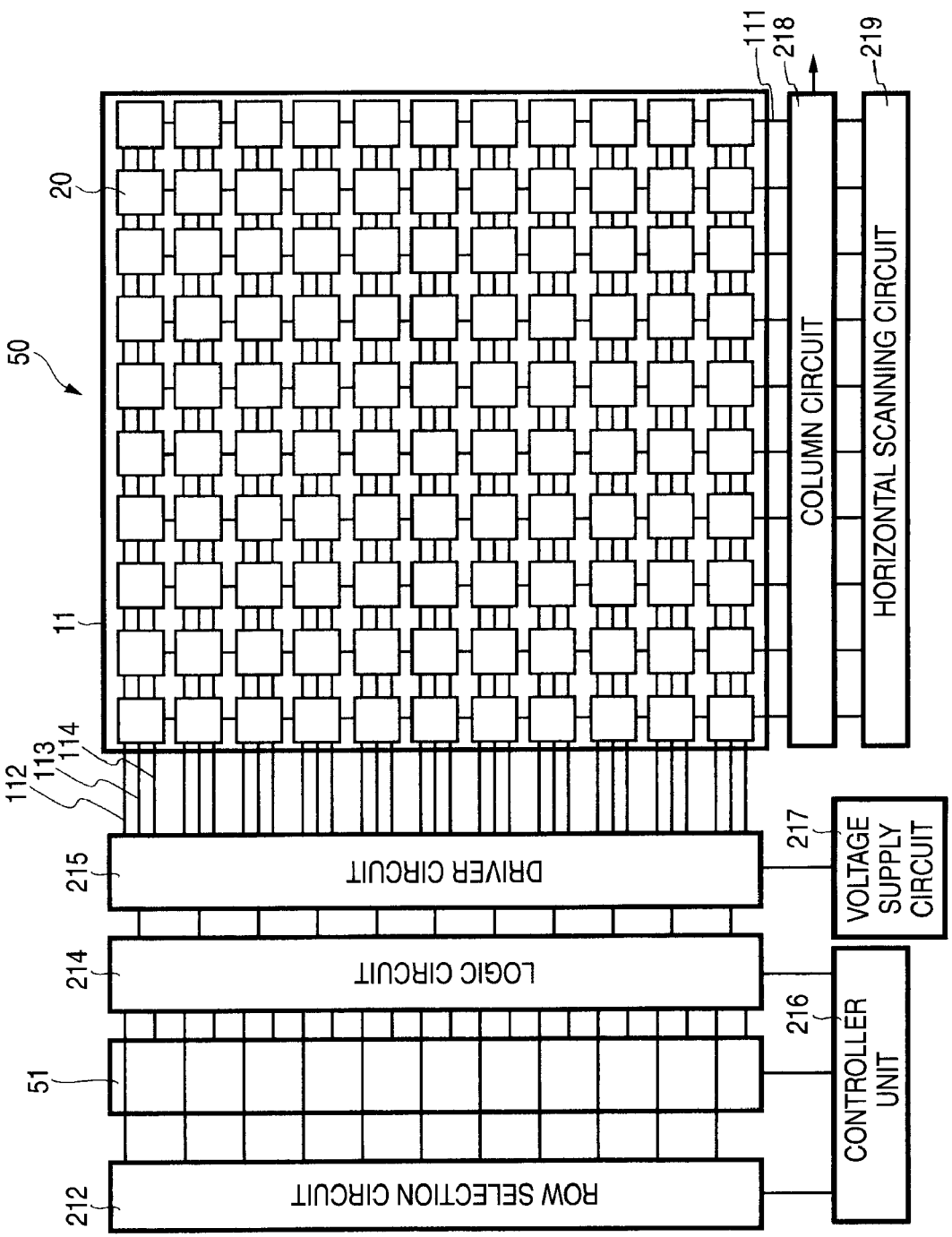
FIG. 62 is a system configuration diagram showing a configuration example of a CMOS image sensor according to a second embodiment of the invention.

FIG. 62 is a system configuration diagram showing a configuration example of a solid-state imaging device according to a second embodiment of the invention, for example, a CMOS image sensor. In the drawing, the same components as those in FIG. 43 are designated by the same numerals and signs.

The CMOS image sensor 10 according to the first embodiment handles imaging by a rolling shutter (focal plane shutter) in which the respective pixels 20 of the pixel array area 11 are sequentially scanned at every pixel row to reset signals. On the other hand, a CMOS image sensor 50 according to the embodiment handles imaging by a global shutter (an electronic shutter for all pixels at the same time) in which all pixels 20 of a pixel array area 11 are exposed at the same timing.

More specifically, in order to implement global shutter imaging, the CMOS image sensor 50 according to the embodiment has a multi-row simultaneous selection circuit 51 that selects plural rows at the same time, instead of the pre-selection circuit 213 shown in FIG. 43. Moreover, not shown in the drawing, in order to handle the global shutter, a mechanical shutter is optically provided before the CMOS image sensor 50. The configurations other than that are basically the same as the CMOS image sensor 10 according to the first embodiment.

Next, the CMOS image sensor 50 according to the embodiment of above configuration will be explained with reference to a timing chart of FIG. 63.

During the period in which the mechanical shutter is opened, plural rows are selected at the same time by the multi-row simultaneous selection circuit 51 to sweep away the charges stored in a photodiode 21. Prior to the timing of closing the mechanical shutter, an intermediate voltage having an equal voltage value is supplied to the gate electrode of a transfer transistor 22 in the plural rows selected at the same time by the multi-row simultaneous selection circuit 51 at equal time intervals T0 once or plural times (in this example, twice).

After the mechanical shutter is closed, an intermediate voltage having the same voltage value as that of the previous intermediate voltage is supplied to the gate electrode of the transfer transistor 22 by the vertical scanning 1b performed by a row selection circuit 212, and the charges transferred from a photodiode 21 to a FD region 20 by the transfer transistor 22 are readout. Moreover, the charges stored in the photodiode 21 are completely transferred to a FD region 26 by the vertical scanning 1c performed by the row selection circuit 212, and the transfer charges are read out.

By the driving described above, also in the CMOS image sensor 50 handling the global shutter, as similar to the case of the CMOS image sensor 10 handling the rolling shutter, an intermediate voltage is supplied to the gate electrode of the transfer transistor 22 as a control voltage plural times, and driving is performed in which the signal charges transferred at this time by the transfer transistor 22 are read twice and more under driving performed by the row selection circuit 212 and the multi-row simultaneous selection circuit 51, whereby the threshold variations of the transfer transistors 22 can be cancelled. In the global shutter, artifacts caused by the rolling shutter (charge sweeping by vertical scanning) do not occur.

Particularly, the intermediate voltage to be supplied to the gate electrode of the transfer transistor 22 plural times is set to have the same voltage value, whereby the following variations can be cancelled such as the offset value of the intermediate voltage to be supplied, the offset value of the intermediate voltage in the pixel arrangement, variations in time to apply the intermediate voltage to the transfer transistor in the pixel arrangement, and variations in the residual transfer charge amount in the intermediate transfer by applying an intermediate voltage. Accordingly, signals in linear and high S/N can be acquired without narrowing the normal saturation level with low luminance, and enables the expansion of dynamic range while realizing good S/N in the linear region also with respect to incident light which is more than the normal saturation level.

Third Embodiment

Figure 64:
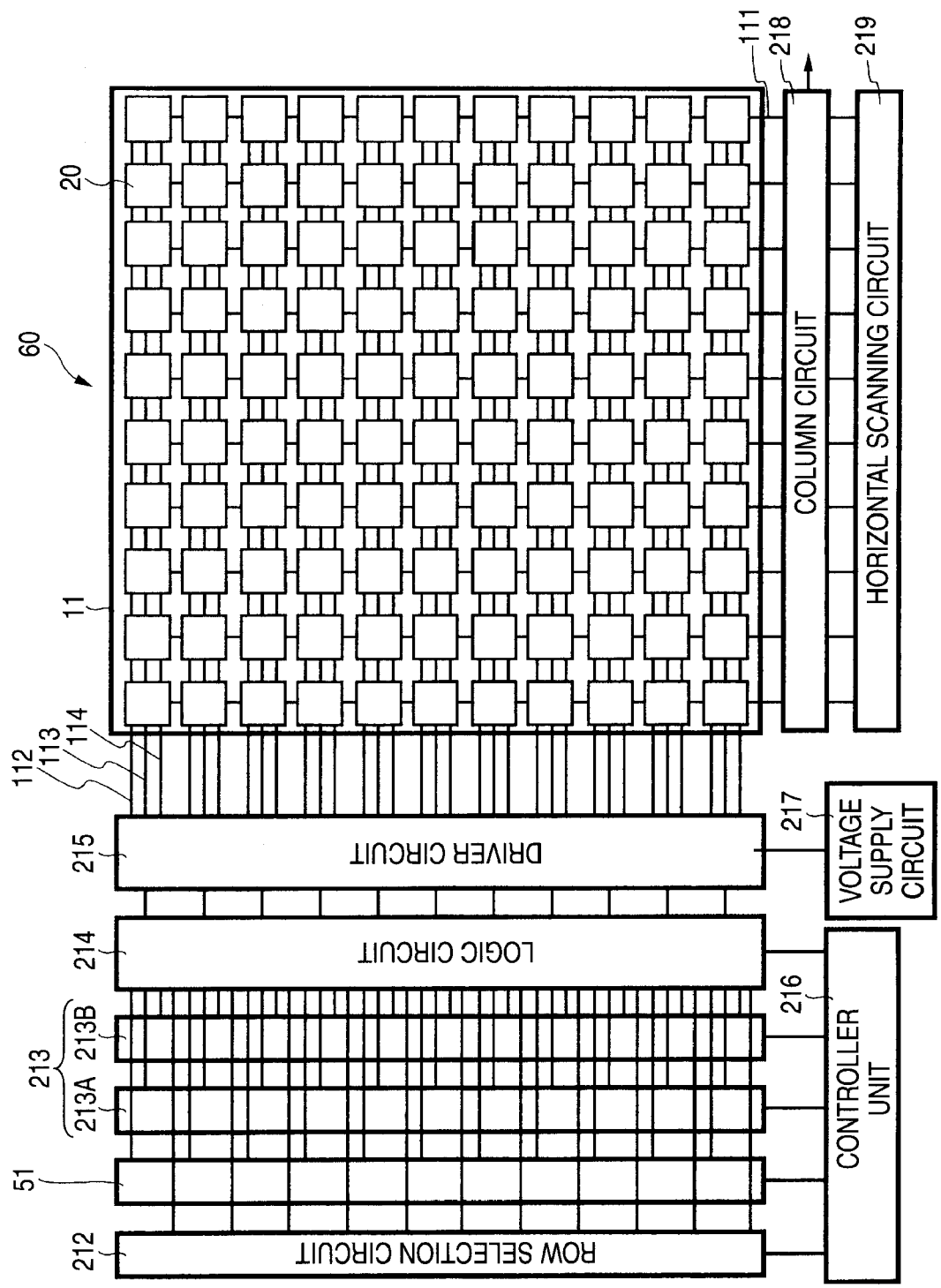
FIG. 64 is a system configuration diagram showing a configuration example of a CMOS image sensor according to a third embodiment of the invention.

FIG. 64 is a system configuration diagram showing a configuration example of a solid-state imaging device according to a third embodiment of the invention, for example, a CMOS image sensor. In the drawing, the same components as those in FIG. 43 and FIG. 62 are designated by the same numerals and signs.

As shown in FIG. 64, a CMOS image sensor 60 according to the embodiment is configured to include the pre-selection circuit 213 shown in FIG. 43, and the multi-row simultaneous selection circuit 51 shown in FIG. 62, in addition to the row selection circuit 212 performing normal row selection. The configurations other than that are basically the same as the CMOS image sensor 10 according to the first embodiment.

As described above, such a configuration is adapted in which the pre-selection circuit 213 and the multi-row simultaneous selection circuit 51 are combined, whereby driving that handles the focal plane shutter and driving that handles the global shutter are switched for operation. In both cases, signals in linear and high S/N can be acquired without narrowing the normal saturation level with low luminance, and enables the expansion of dynamic range while realizing good S/N in the linear region also with respect to incident light which is more than the normal saturation level.

[Application to the CCD Image Sensor]

In the first to third embodiments (including the modification examples) described above, the case is discussed as examples in which the invention is applied to the CMOS image sensor, however, the invention is not limited to application to the CMOS image sensor and relates to the whole amplification-type solid-state imaging device, further, relates to a readout part of signal charges from the photoelectric element, therefore, the invention can be also applied to a charge-transfer type solid-state imaging device which is represented by a CCD image sensor.

Figure 65A:
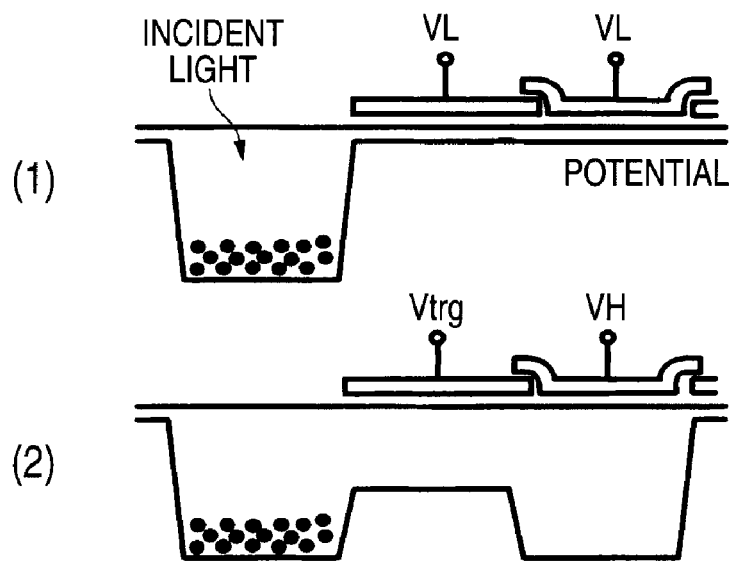
FIGS. 65A and 65B are potential diagrams showing examples when applied to a CCD image sensor.
Figure 65B:
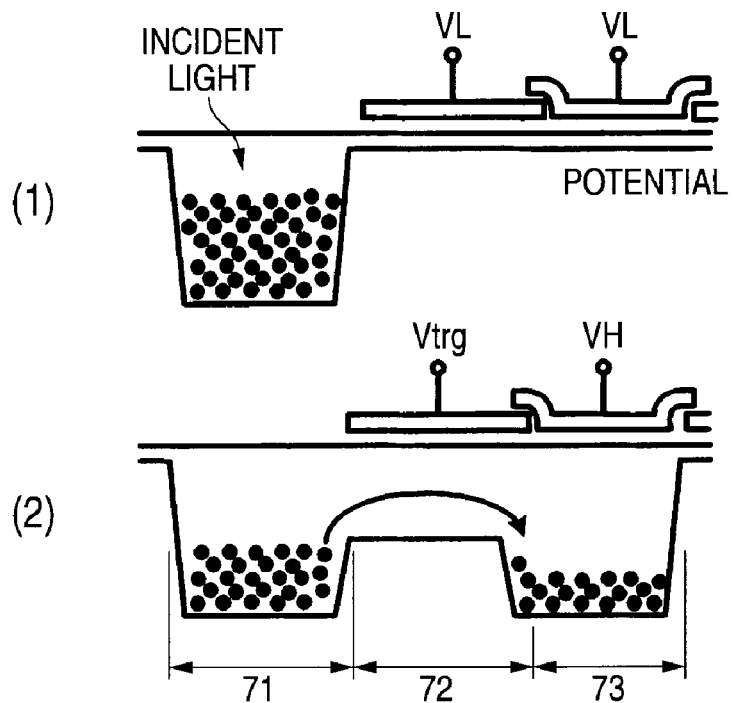

An example in which the invention is applied to the CCD image sensor is shown in FIGS. 65A and 65B. In the CCD image sensor, photoelectric conversion is performed in a photodiode (light-receiving region) 71 which is a photoelectric conversion element, and signal charges stored therein are transferred to a vertical CCD (vertical transfer region) 73 by a transfer gate (readout gate) 72, which are read out according to the vertical transfer by the vertical CCD 73. In the CCD image sensor, the amount of electrons to be transferred to the vertical CCD 73 can be controlled by applying the above-described intermediate voltage Vtrg to the transfer gate 72.

When incident light is weak (FIG. 65A), since the amount of electrons which has been photoelectrically converted is small, it is difficult for stored electrons in the photodiode 71 to exceed a potential under the transfer gate 72 even when the intermediate voltage Vtrg is applied to the transfer gate 72, and the stored electrons are held in the photodiode 71. Whereas when incident light is strong (FIG. 65B), since the amount of electrons which has been photoelectrically converted is large, the stored electrons in the photodiode 71 exceed the potential under the transfer gate 72 and are partially transferred to the vertical CCD 73 by applying an intermediate voltage Vtrg to the transfer gate 72.

Then, by applying the intermediate voltage Vtrg at the same control timing as in the case of the CMOS image sensor, signal acquisition can be executed according to the intermediate transfer at high luminance while holding signal charges at low luminance by applying an intermediate voltage Vtrg to the transfer gate 72, in the same way as the CMOS image sensor.

[Imaging Apparatus]

It is preferable that the CMOS image sensors 10, 50 and 60 according to the first to third embodiments (including the modification examples) described above are used as imaging devices (image input devices) in imaging apparatuses such as a digital still camera and a video camera.

Here, the imaging apparatus indicates a camera module (for example, used mounted on an electronic equipment such as a cellular phone) including a solid-state imaging device as an imaging device, an optical system which focuses image light of a subject on an imaging surface (light-receiving surface) of the solid-state imaging device and a signal processing circuit of the solid-state imaging device, and a camera system on which the camera module is mounted, such as a digital still camera and a video camera.

Figure 66:
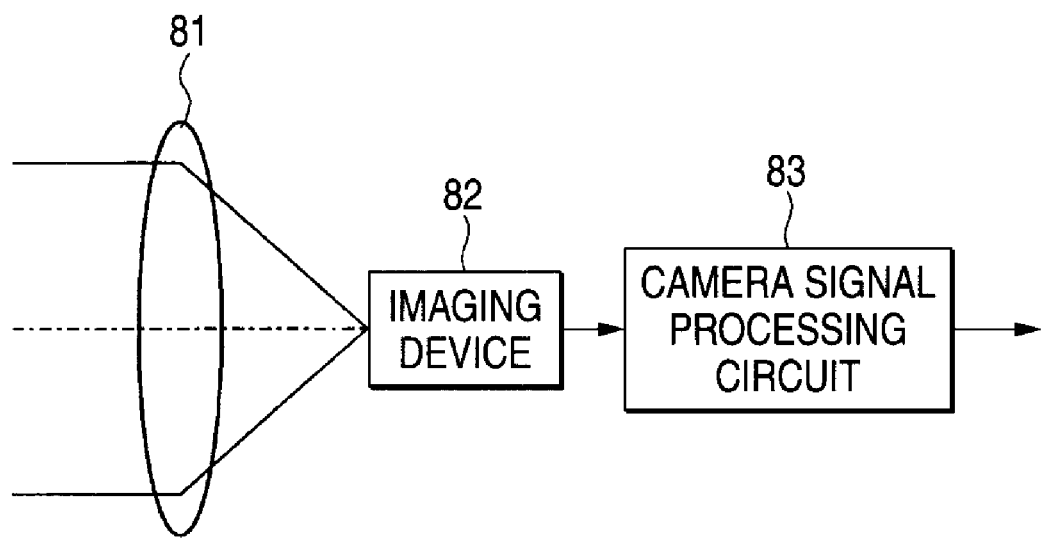
FIG. 66 is a block diagram showing a configuration example of an imaging apparatus according to an embodiment of the invention.
Figure 67:
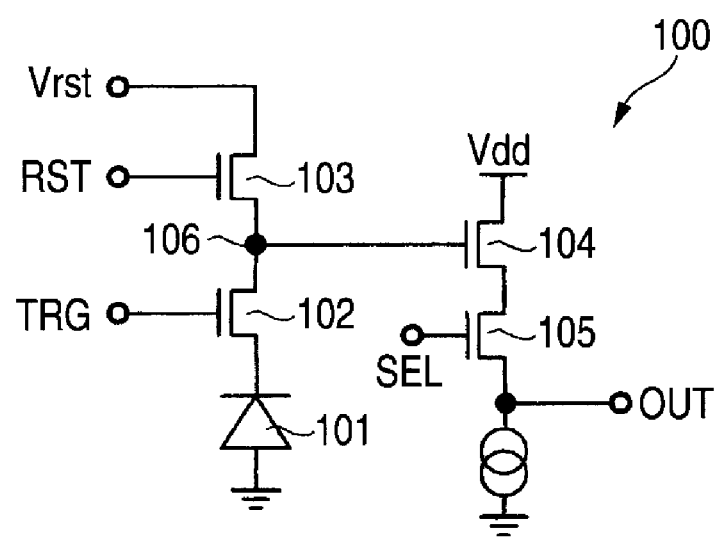
FIG. 67 is a circuit diagram showing an example of circuit configuration of a pixel.

FIG. 66 is a block diagram showing a configuration example of the imaging apparatus according to an embodiment of the invention. As shown in FIG. 67, the imaging apparatus according to the embodiment includes the optical system including a lens 81, an imaging device (imaging part) 82, and a camera signal processing circuit 83.

The lens 81 focuses image light from a subject on an imaging surface of the imaging device 82. The imaging device 82 outputs an image signal obtained by converting image light which is focused on the imaging surface by the lens 81 into an electrical signal in a pixel unit. As the imaging device 82, the CMOS image sensors 10, 50 and 60 according to the first to third embodiments (including the modification examples) described above are used. The camera signal processing unit 83 performs various signal processing to the image signals outputted from the imaging device 82.

As described above, in the imaging apparatus such as the video camera, the digital still camera, and the camera module used for a mobile equipment such as the cellular phone, by using the CMOS image sensors 10, 50 and 60 according to the first to third embodiments described above as the imaging device 82, the CMOS image sensors 10, 50 and 60 enable signal acquisition with linear and high S/N without narrowing the normal saturation level at low luminance, at the same time, the dynamic range can be expanded while realizing good S/N in a linear region also with respect to incident light larger than the normal saturation level, as a result, image quality of the imaging pictures can be further improved.

BRIEF DESCRIPTION OF THE DRAWINGS

Figure 49:
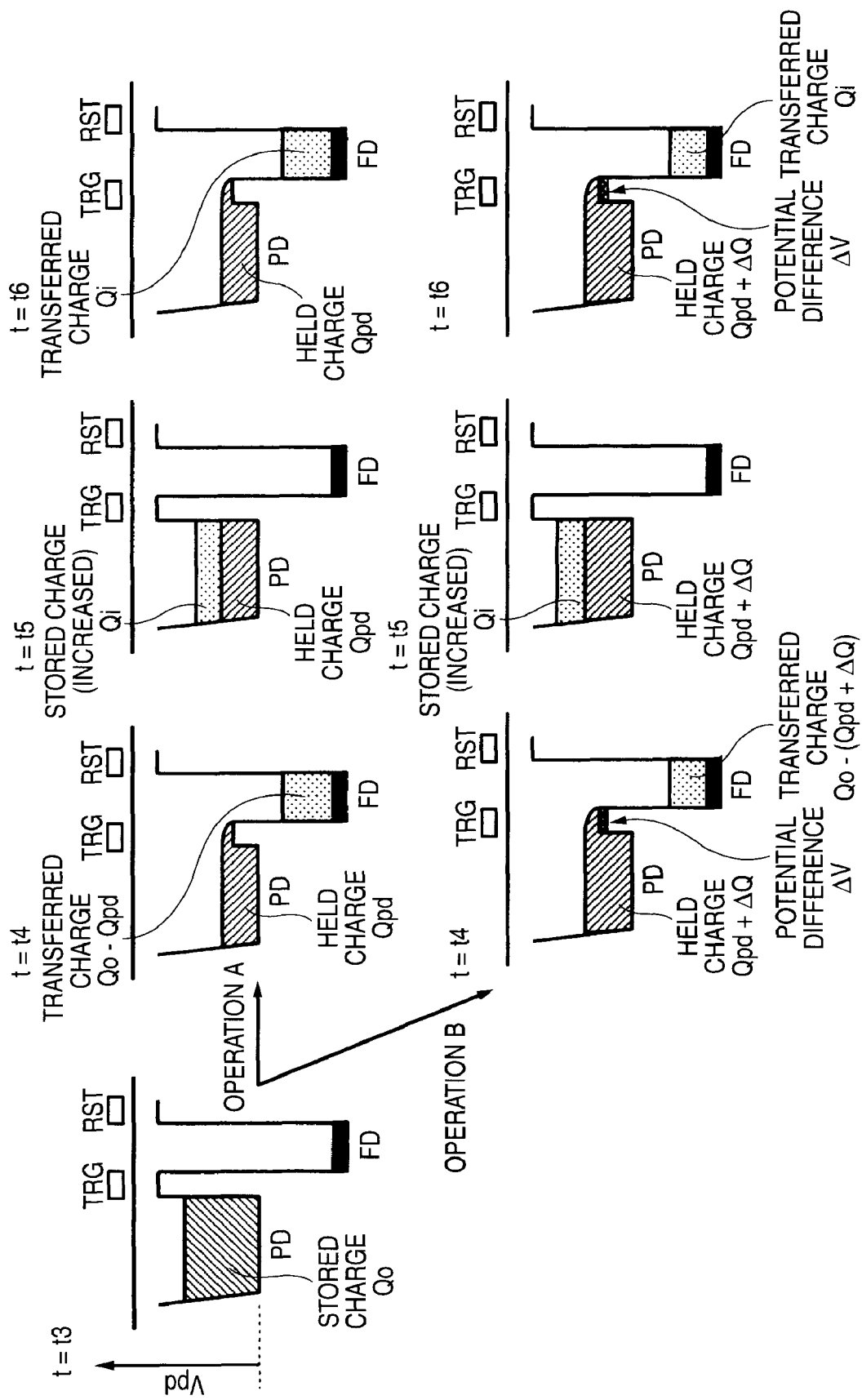
FIG. 49 is an explanatory diagram of the operation of a cancel operation for threshold variations (first process)
Figure 63:
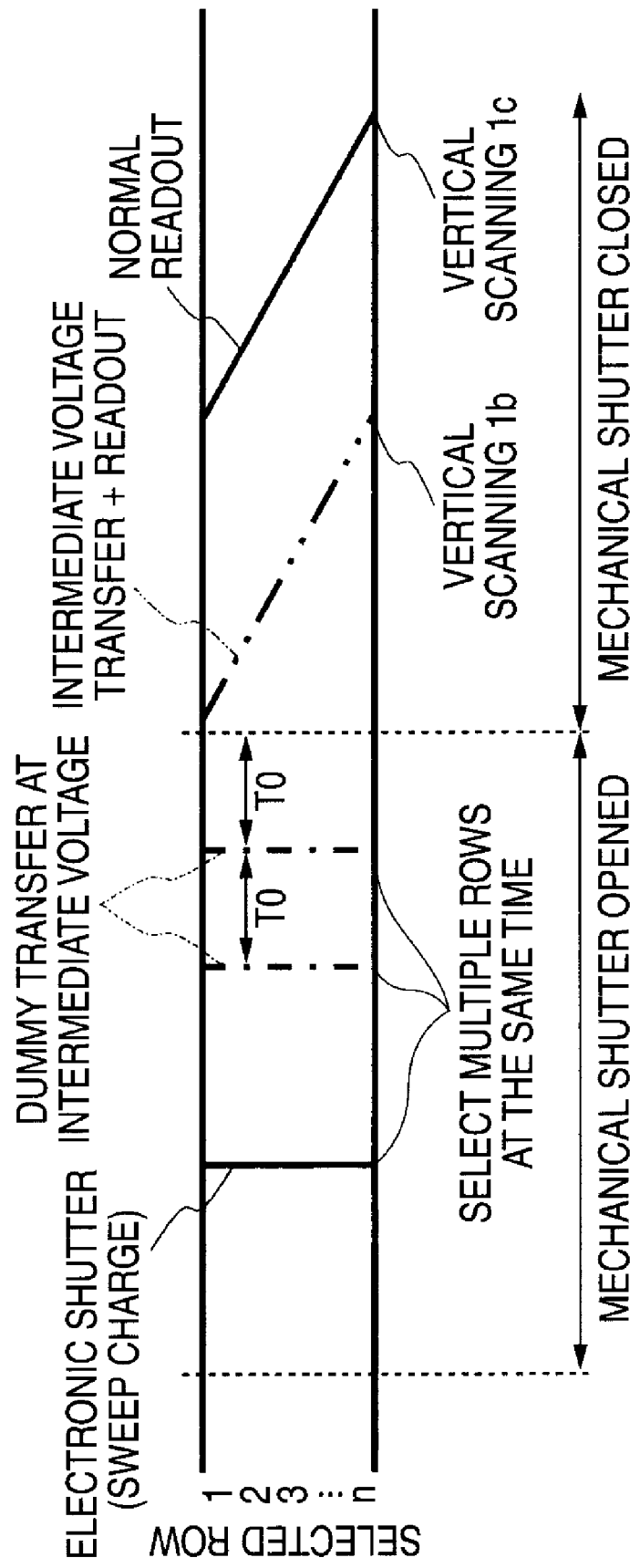
FIG. 63 is a timing chart showing the concept of driving according to the second embodiment.
Figure 68:
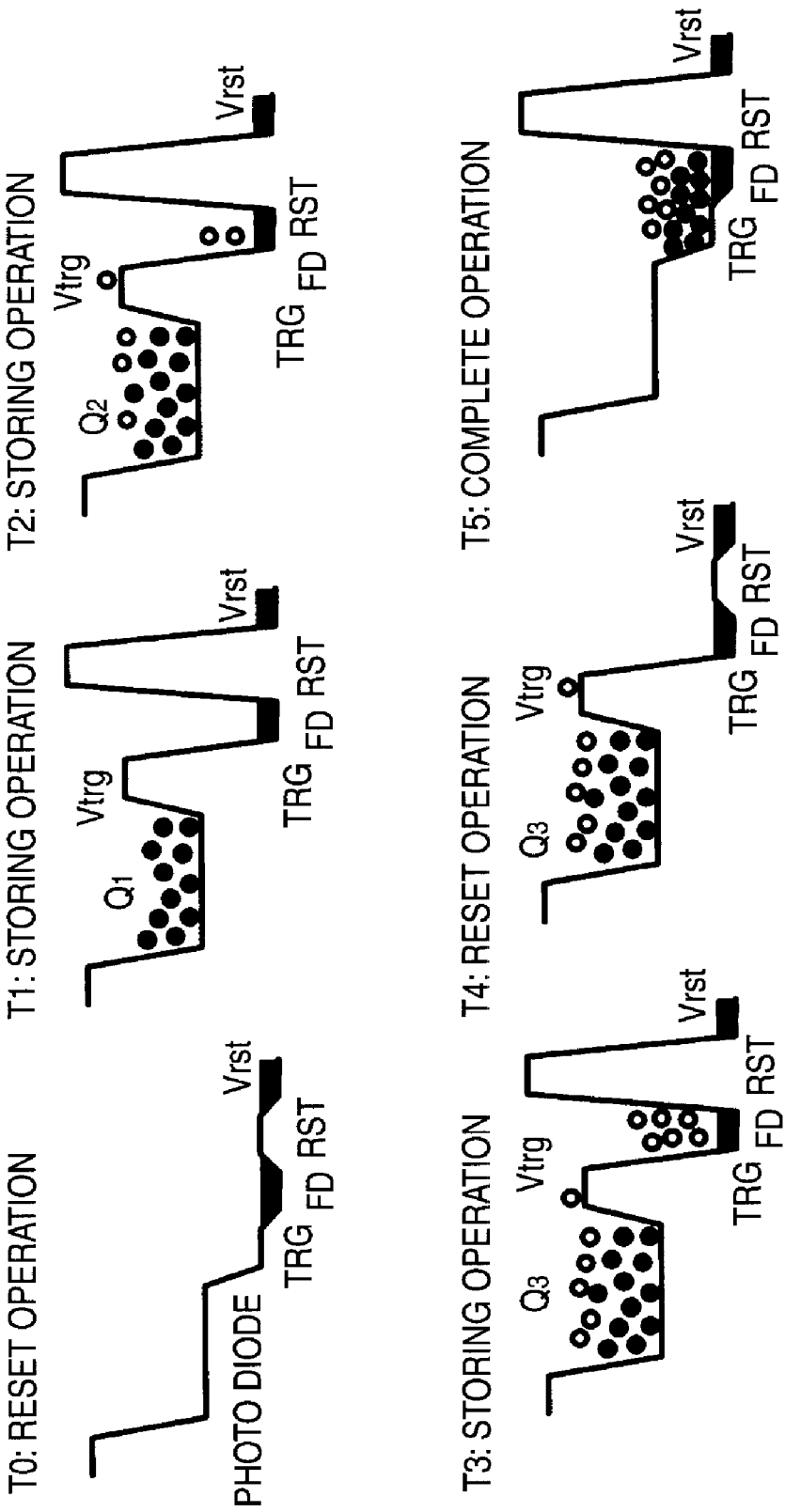
FIG. 68 is a potential diagram in a related art written in non-patent document 1.
Figure 69:
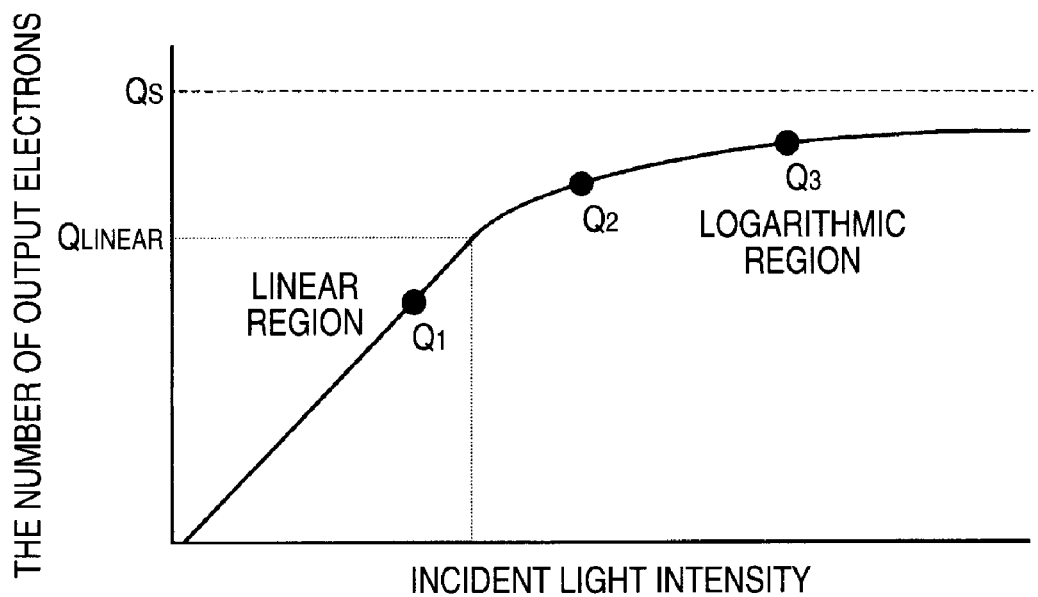
FIG. 69 is a graph showing relation between incident light intensity and the number of output electrons in the related art written in non-patent document 1.

FIG. 43 is a system configuration diagram showing a configuration example of a CMOS image sensor according to a first embodiment of the invention;

FIG. 44 is a circuit diagram showing a configuration example of a driver circuit;

FIGS. 45A and 45B are timing charts for explaining respective operations, wherein FIG. 45A is a case of a normal readout and FIG. 45B is a case of aiming at high S/N and wide dynamic range;

FIG. 46 is a timing chart showing the concept of driving according to the first embodiment;

FIG. 47 is a timing chart showing driving of pixels by applying an intermediate voltage;

FIG. 48 is a potential diagram showing a pixel driven by applying an intermediate voltage;

FIG. 49 is an explanatory diagram of the operation of a cancel operation for threshold variations (first process);

FIG. 50 is an explanatory diagram of the operation of a cancel operation for threshold variations (second process);

FIG. 51 is a diagram showing characteristics that charges stored in a light-receiving region before starting transfer are transferred over time by applying an intermediate voltage;

FIG. 52 is an explanatory diagram for making S/N high and making the dynamic range wide;

FIG. 53 is a diagram for explaining operation and effect according to the first embodiment;

FIG. 54 is a diagram for explaining the operation when such a configuration is not adapted in which the FD region is reset prior to supplies of a first control voltage and a second control voltage;

FIG. 55 is a diagram for explaining spatially splitting the pixel arrangement;

FIGS. 56A and 56B are diagrams for explaining respective operations, FIG. 56A is the case in which exposure time is not temporally split, and FIG. 56B is the case in which exposure time is not temporally split;

FIG. 57 is a timing chart showing the concept of driving according to a first modification example of the first embodiment (first process);

FIG. 58 is a timing chart showing the concept of driving according to the first modification example of the first embodiment (second process);

FIG. 59 is a timing chart showing the concept of driving according to a second modification example of the first embodiment (first process);

FIG. 60 is a timing chart showing the concept of driving according to the second modification example of the first embodiment (second process);

FIG. 61 is a timing chart showing the concept of driving according to a third modification example of the first embodiment;

FIG. 62 is a system configuration diagram showing a configuration example of a CMOS image sensor according to a second embodiment of the invention;

FIG. 63 is a timing chart showing the concept of driving according to the second embodiment;

FIG. 64 is a system configuration diagram showing a configuration example of a CMOS image sensor according to a third embodiment of the invention;

FIGS. 65A and 65B are potential diagrams showing examples when applied to a CCD image sensor;

FIG. 66 is a block diagram showing a configuration example of an imaging apparatus according to an embodiment of the invention;

FIG. 67 is a circuit diagram showing an example of circuit configuration of a pixel;

FIG. 68 is a potential diagram in a related art written in non-patent document 1; and FIG. 69 is a graph showing relation between incident light intensity and the number of output electrons in the related art written in non-patent document 1.

DESCRIPTION OF REFERENCE NUMERALS AND SIGNS 10, 50, 60 CMOS image sensor
11 pixel array area
20 unit pixel
21 photodiode
22 transfer transistor
23 reset transistor
24 amplification transistor
25 selection transistor
26 FD (floating diffusion) region
51 multi-row simultaneous selection circuit
81 photodiode
82 transfer gate
83 vertical CCD
212, 213A, 213B row selection circuit
213 pre-selection circuit
214 voltage supply circuit (logic circuit)
215 driver circuit
216 controller unit
217 voltage supply circuit
218 column circuit
219 horizontal scanning circuit

What is claimed is:

1. A solid-state imaging device, comprising:
a two-dimensional pixel array area in which each unit pixel includes a photoelectric conversion element converting optical signals to signal charges and a transfer gate transferring the signal charges which have been photoelectrically converted in the photoelectric conversion;
a first supply voltage control means for supplying a first control voltage to a control electrode of the transfer gate;
a second supply voltage control means for sequentially supplying one or plural second control voltages having a voltage value different from that of the first control voltage to the control electrode of the transfer gate;
a third supply voltage control means for supplying a third control voltage having the same voltage value as that of any one of or the plural second control voltages once or plural times prior to one supply of any one of the plural second control voltages or plural supplies of the plural second control voltages to the control electrode of the transfer gate;
a first driving means for performing driving of reading out signal charges transferred by the transfer gate when the first control voltage is supplied; and
a second driving means for performing driving of reading out signal charges transferred by the transfer gate once and more when the second control voltage is sequentially applied.

2. The solid-state imaging device according to claim 1, wherein the second control voltage is a voltage which is capable of, while holding a part of charges stored in the photoelectric conversion element, transferring stored charges exceeding the held amount by the transfer gate.

3. The solid-state imaging device according to claim 1, wherein the second supply voltage control means supplies the second control voltage having a voltage value different in the plural supplies.

4. A method of driving a solid-state imaging device in which a plurality of unit pixels are two-dimensionally arranged in a matrix form, each unit pixel including a photoelectric conversion element converting optical signals to signal charges and a transfer gate transferring the signal charges which have been photoelectrically converted in the photoelectric conversion element, the method comprising the steps of:
supplying a first control voltage to a control electrode of the transfer gate; supplying a second control voltage having a voltage value different from that of the first control voltage once or plural times to the control electrode of the transfer gate;
supplying a third control voltage having the same voltage value as that of any one of or the plural second control voltages once or plural times prior to one supply of any one of the plural second control voltages or plural supplies of the plural second control voltages to the control electrode of the transfer gate;
reading out signal charges transferred by the transfer gate when the first control voltage is supplied; and
reading out signal charges transferred by the transfer gate when the second control voltage is sequentially applied once and more.

* * * * *